(12) United States Patent
Liu et al.

(10) Patent No.: US 12,035,349 B2
(45) Date of Patent: Jul. 9, 2024

(54) COMMUNICATION PROCESSING METHOD AND COMMUNICATION PROCESSING APPARATUS

(71) Applicant: HUAWEI TECHNOLOGIES CO., LTD., Shenzhen (CN)

(72) Inventors: Nannan Liu, Beijing (CN); Xiangdong Zhang, Shenzhen (CN); Junren Chang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 225 days.

(21) Appl. No.: 17/669,733

(22) Filed: Feb. 11, 2022

(65) Prior Publication Data
US 2022/0167362 A1 May 26, 2022

Related U.S. Application Data

(63) Continuation of application No. PCT/CN2019/101073, filed on Aug. 16, 2019.

(51) Int. Cl.
H04W 4/00 (2018.01)
H04W 72/542 (2023.01)
H04W 72/56 (2023.01)
H04W 74/08 (2009.01)

(52) U.S. Cl.
CPC ......... H04W 72/542 (2023.01); H04W 72/56 (2023.01); H04W 74/08 (2013.01)

(58) Field of Classification Search
CPC ... H04W 72/542; H04W 72/56; H04W 74/08; H04W 72/0446; H04W 76/14; H04W 72/04

USPC ......................................... 370/329, 330, 328
See application file for complete search history.

(56) References Cited

U.S. PATENT DOCUMENTS

| 2017/0295567 | A1* | 10/2017 | Chen | H04W 4/70 |
| 2017/0325214 | A1* | 11/2017 | Lu | H04W 4/70 |
| 2018/0035427 | A1 | 2/2018 | Gupta et al. | |
| 2018/0206260 | A1 | 7/2018 | Khoryaev et al. | |
| 2019/0037577 | A1* | 1/2019 | Sun | H04W 72/56 |

(Continued)

FOREIGN PATENT DOCUMENTS

| CN | 106464610 A | 2/2017 |
| CN | 108633048 A | 10/2018 |
| CN | 109714824 A | 5/2019 |

OTHER PUBLICATIONS

R1-1707450, CATT, "Discussion on resource pool sharing between mode 3 and mode 4", 3GPP TSG RAN WG1 Meeting #89, Hangzhou, China May 15-19, 2017, total 3 pages.

(Continued)

Primary Examiner — Chuong T Ho
(74) Attorney, Agent, or Firm — Maier & Maier, PLLC

(57) ABSTRACT

A communication processing method, a communication processing apparatus, and a system, to improve resource utilization. A first terminal device generates first information. The first terminal device sends the first information to a network device, where the first information is used to indicate any one or more of the following content: information indicating that the first terminal device releases a first resource; the first resource released by the first terminal device; and information indicating that the first terminal device requests a second resource from the network device.

18 Claims, 16 Drawing Sheets

(56) References Cited

U.S. PATENT DOCUMENTS

| | | | |
|---|---|---|---|
| 2019/0239112 A1 | 8/2019 | Rao et al. | |
| 2019/0329475 A1* | 10/2019 | Nishimura | D07B 1/16 |
| 2019/0350045 A1* | 11/2019 | Lee | H04W 80/02 |
| 2020/0389900 A1* | 12/2020 | Lee | H04W 72/53 |
| 2022/0110095 A1* | 4/2022 | Zhao | H04W 72/56 |

OTHER PUBLICATIONS

3GPP TS 36.212 V15.6.0 (Jun. 2019), "3rd Generation Partnership Project; Technical Specification Group Radio Access Network;Evolved Universal Terrestrial Radio Access (E-UTRA);Multiplexing and channel coding(Release 15)", total 246 pages.

3GPP TS 36.213 V15.6.0 (Jun. 2019), "3rd Generation Partnership Project; Technical Specification Group Radio Access Network;Evolved Universal Terrestrial Radio Access (E-UTRA);Physical layer procedures(Release 15)", total 552 pages.

3GPP TS 36.321 V15.6.0 (Jun. 2019), "3rd Generation Partnership Project;Technical Specification Group Radio Access Network;Evolved Universal Terrestrial Radio Access (E-UTRA);Medium Access Control (MAC) protocol specification (Release 15)", total 133 pages.

3GPP TS 36.331 V15.6.0 (Jun. 2019), "3rd Generation Partnership Project;Technical Specification Group Radio Access Network;Evolved Universal Terrestrial Radio Access (E-UTRA);Radio Resource Control (RRC);Protocol specification (Release 15)", total 960 pages.

3GPP TS 38.300 V15.6.0 (Jun. 2019), "3rd Generation Partnership Project;Technical Specification Group Radio Access Network;NR;NR and NG-RAN Overall Description;Stage 2(Release 15)", total 99 pages.

3GPP TS 38.321 V15.6.0 (Jun. 2019), "3rd Generation Partnership Project; Technical Specification Group Radio Access Network;NR;Medium Access Control (MAC) protocol specification(Release 15)", total 78 pages.

* cited by examiner

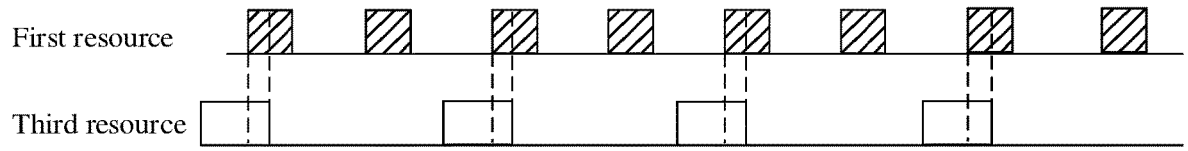
FIG. 2C
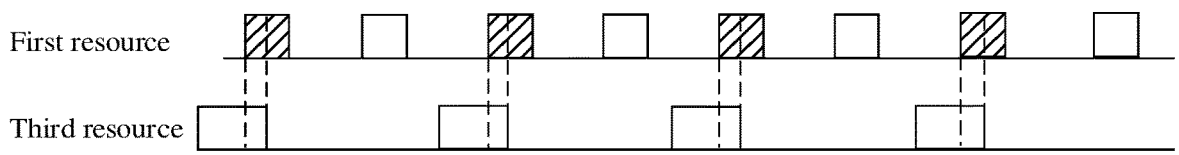
FIG. 2D
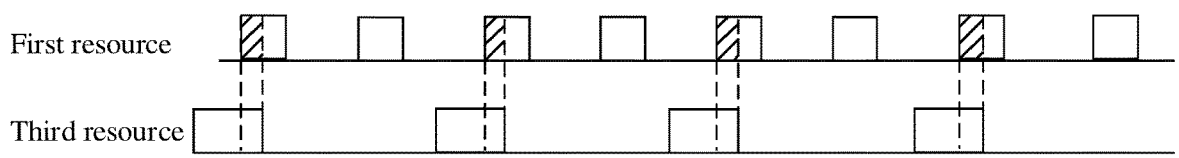
FIG. 2E
| Field 1 | Field 2 | R | R | Information about a first resource | Oct 1 |
FIG. 2F
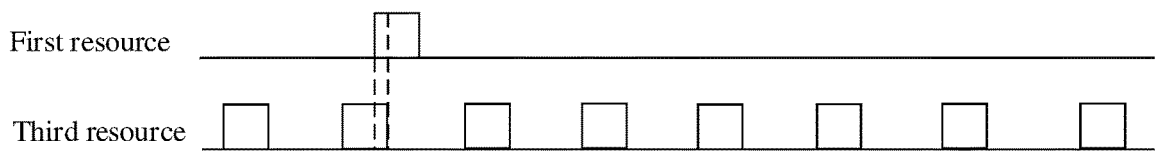
FIG. 2G

| Sequence number of a transmission configuration | Slot number | | | | | | | | | |
|---|---|---|---|---|---|---|---|---|---|---|
| | 0 | 1 | 2 | 3 | 4 | 5 | 6 | 7 | 8 | 9 |
| 1 | A | A | A | A | A | A | A | | | |
| 2 | B | B | | | | B | A | B | | |
| 3 | A | A | B | | B | B | B | A | B | |
| 4 | C | | | A | C | C | | | | |
| 5 | B | B | A | A | | D | B | B | B | A |
| 6 | E | E | A | B | A | B | A | B | | A |
| 7 | A | A | F | F | A | F | B | B | F | F |
| 8 | A | B | B | A | G | G | A | B | B | G |
| 9 | A | H | A | B | A | B | A | B | H | H |
| 10 | I | I | | | | I | | I | | I |
| 11 | | | J | | | J | J | J | | |
| 12 | K | K | | K | K | K | | | | |
| 13 | | L | L | | L | | | | | L |

| A | indicates a dedicated time domain resource for a first mode |
|---|---|
| B | indicates a dedicated time domain resource for a second mode |
|   | indicates a time domain resource that is not configured |
| C | indicates a dedicated time domain resource used for sidelink transmission |
| D | indicates a dedicated time domain resource used for sidelink sending |
| E | indicates a dedicated time domain resource used for sidelink receiving |
| F | indicates a dedicated time domain resource used for uplink transmission |
| G | indicates a dedicated time domain resource used for downlink transmission |
| H | indicates a shared time domain resource |
| I | indicates a dedicated time domain resource used for sidelink sending for the first mode |
| J | indicates a dedicated time domain resource used for sidelink sending for the second mode |
| K | indicates a dedicated time domain resource used for sidelink receiving for the first mode |
| L | indicates a dedicated time domain resource used for sidelink receiving for the second mode |

FIG. 7B

COMMUNICATION PROCESSING METHOD AND COMMUNICATION PROCESSING APPARATUS

CROSS-REFERENCE TO RELATED APPLICATIONS

This application is a continuation of International Application No. PCT/CN2019/101073, filed on Aug. 16, 2019, the disclosure of which is hereby incorporated by reference in its entirety.

FIELD

The embodiments relate to communication technologies, and in particular, to a communication processing method and a communication processing apparatus.

BACKGROUND

A vehicle-to-everything (V2X) wireless communication technology is a next-generation information and communication technology that connects vehicles to everything. V represents vehicles, and X represents any object that exchanges information with vehicles, for example, a vehicle, a person, transportation roadside infrastructure, or a network.

In a 5G new radio (NR) V2X communication system, an SL transmission resource of a sidelink (SL) between a first terminal device and a second terminal device may be scheduled by a base station. This mode in which the base station schedules the SL transmission resource is referred to as a mode 1 in NR V2X. In the NR V2X communication system, the SL transmission resource of the SL between the first terminal device and the second terminal device may be further determined by the first terminal device or the second terminal device (where for example, the first terminal device may independently obtain the SL transmission resource from an SL resource pool configured by the base station for the first terminal device, and send a control signal and/or a data signal to the second terminal device by using the transmission resource). This mode in which a terminal device determines the SL transmission resource is referred to as a mode 2. A current NR V2X communication system supports coexistence of the mode 1 and the mode 2.

The current NR V2X communication system supports coexistence of the mode 1 and the mode 2. In this case, a mode-1 resource and a mode-2 resource that are obtained by the terminal device overlap in time domain. For example, if the terminal device simultaneously sends data on the two resources, a peak to average power ratio (PAPR) may be extremely high.

SUMMARY

Embodiments provide a communication processing method, a communication apparatus, and a system, to improve resource utilization.

A first aspect of the embodiments provides a communication processing method. The method includes:
generating, by a first terminal device, first information; and
sending, by the first terminal device, the first information to a network device, where the first information is used to indicate any one or more of the following content:
information indicating that the first terminal device releases a first resource;
the first resource released by the first terminal device; and
information indicating that the first terminal device requests a second resource from the network device.

In this embodiment, when the first terminal device determines to release the first resource, the first terminal device may send the first information to the network device, so that the network device determines the first resource released by the first terminal device. In this way, the network device may allocate the first resource to another terminal device, to improve resource utilization.

In a possible implementation, the first resource and/or the second resource include/includes any one or more of the following content:
a resource of a sidelink;
a first-mode resource of the sidelink;
a configured grant resource of the sidelink;
a first-type configured grant resource of the sidelink;
a second-type configured grant resource of the sidelink;
a dynamic grant resource of the sidelink;
a resource of an uplink;
a configured grant resource of the uplink;
a first-type configured grant resource of the uplink;
a second-type configured grant resource of the uplink;
a dynamic grant resource of the uplink;
a resource of a downlink;
a semi-persistently allocated resource of the downlink; and
a dynamically allocated resource of the downlink, where the sidelink is a wireless direct communication link between the first terminal device and a second terminal device, the uplink and the downlink are links for communication between the first terminal device and the network device, the first-type configured grant resource includes a sidelink resource and/or an uplink resource that are/is provided by the network device by using radio resource control (RRC) signaling, the second-type configured grant resource means that the network device provides a resource periodicity for the sidelink and/or a resource periodicity for the uplink by using RRC signaling and then activates the sidelink resource and/or the uplink resource by using a physical downlink control channel (PDCCH) or downlink control information (downlink control information, DCI), the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink.

In another possible implementation, the sending, by the first terminal device, the first information to a network device includes:

sending, by the first terminal device, the first information to the network device when a first condition is met, where the first condition includes any one or more of the following content:

the first resource overlaps a third resource in time domain, where the first resource includes any one or more of the following content: the resource of the sidelink, the resource of the uplink, and the resource of the downlink, the third resource includes a second-mode resource of the sidelink, the resource of the uplink includes a resource of an uplink between the first terminal device and the network device, the resource of the downlink includes a resource of a downlink between the first terminal device and the network device, the sidelink is the wireless direct communication link between the first terminal device and the second terminal device, and the second-mode resource of the sidelink includes a sidelink resource selected, contended for, or sensed by the first terminal device;

the first resource periodically overlaps the third resource in time domain;

the first resource overlaps the third resource for N times in time domain, where N is an integer greater than 0;

the first resource is to overlap the third resource in time domain;

the first resource is to periodically overlap the third resource in time domain; the first resource is to overlap the third resource for N times in time domain;

the third resource overrides the first resource or the first resource overrides the third resource;

the third resource periodically overrides the first resource or the first resource periodically overrides the third resource;

the third resource overrides the first resource for N times or the first resource overrides the third resource for N times;

the third resource is to override the first resource or the first resource is to override the third resource;

the third resource is to periodically override the first resource or the first resource is to periodically override the third resource;

the third resource is to override the first resource for N times or the first resource is to override the third resource for N times;

first duration is greater than or equal to a first threshold, where the first duration is a time difference between a time domain position of the first resource and a moment at which the first terminal device releases the first resource, or is a time difference between a time domain position of the first resource and a time domain position at which the first terminal device sends the first information;

the first resource includes a dedicated resource of the first terminal device;

the first resource includes a periodic time-frequency resource; and the first terminal device has a resource of the uplink.

In another possible implementation, the first information includes any one or more of the following content:

an indication that the first terminal device releases the first resource, where the first resource includes any one or more of the following content: the resource of the sidelink, the resource of the uplink, and the resource of the downlink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device;

information about the first resource;

resource type information of the first resource;

time domain information of the first resource;

time domain position information of the first resource;

time domain length information of the first resource;

frequency domain information of the first resource;

frequency domain position information of the first resource;

frequency domain bandwidth information of the first resource;

a periodicity or an interval of the first resource;

duration of the first resource;

time information of releasing the first resource by the first terminal device;

information about releasing the $1^{st}$ time-frequency resource of the first resource by the first terminal device;

time domain information of releasing the $1^{st}$ time-frequency resource of the first resource by the first terminal device;

frequency domain information of releasing the $1^{st}$ time-frequency resource of the first resource by the first terminal device;

a time interval between time at which the first terminal device releases the first resource and time at which the first terminal device sends the first information;

an indication that the first terminal device senses, selects, or obtains, through contention, the third resource, where the third resource includes the second-mode resource of the sidelink, and the third resource includes a resource selected, contended for, or sensed by the first terminal device and/or a resource reserved by the first terminal device;

an indication that the first terminal device reserves the third resource;

an indication that the first resource overlaps the third resource in time domain; information about the third resource;

resource type information of the third resource;

time domain information of the third resource;

time domain length information of the third resource;

time domain position information of the third resource;

frequency domain information of the third resource;

frequency domain bandwidth information of the third resource;

frequency domain position information of the third resource;

a periodicity or a time interval of the third resource;

duration of the third resource;

a periodicity or a time interval of a service or data transmitted on the first resource;

a periodicity or a time interval of a service or data transmitted on the third resource;

a time offset of the time domain position of the first resource relative to the time domain position at which the first terminal device sends the first information;

a time offset of a time domain position of the third resource relative to the time domain position at which the first terminal device sends the first information;

priority information of the service or the data transmitted on the first resource;

priority information of the service or the data transmitted on the third resource;
priority information of the first resource;
priority information of the third resource;
an indication that a priority of the first resource is lower than a priority of the third resource;
information about an overlapping resource in the first resource and the third resource;
time domain information of the first resource overlapping the third resource;
information about a time domain offset of the first resource relative to the third resource;
information about a resource that does not overlap the third resource;
an indication that the first terminal device requests the second resource from the network device;
information about the second resource;
resource type information of the second resource;
time domain information of the second resource;
frequency domain information of the second resource;
a periodicity or an interval of the second resource;
information about a time domain offset of the second resource relative to the third resource;
the information about the frequency domain offset of the first resource relative to the third resource;
an indication that the first terminal device has resource reservation;
information about a resource reserved by the first terminal device;
an indication that the first terminal device may perform retransmission;
a quantity of retransmission times or a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the sending, by the first terminal device, the first information to a network device includes: sending, by the first terminal device, the first information to the network device by using any one of RRC signaling, medium access control (medium access control, MAC) signaling, and physical layer signaling.

In another possible implementation, before the sending, by the first terminal device, the first information to a network device, the method further includes:
determining, by the first terminal device, that the priority of the first resource is lower than the priority of the third resource when a second condition is met, where the first resource includes any one or more of the following content: the resource of the sidelink, the resource of the uplink, and the resource of the downlink, the third resource includes the second-mode resource of the sidelink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device; and
determining, by the first terminal device, to release the first resource.

In another possible implementation, the second condition includes any one or more of the following content:
a priority of sidelink transmission for a first mode is lower than a priority of sidelink transmission for a second mode;
a priority of uplink transmission is lower than the priority of the sidelink transmission for the second mode;
a priority of downlink transmission is lower than the priority of the sidelink transmission for the second mode;
a priority of the service or the data transmitted on the first resource is lower than the priority information of the service or the data transmitted on the third resource;
the priority information of the service or the data transmitted on the first resource is greater than or equal to or is less than or equal to a second threshold;
the priority information of the service or the data transmitted on the third resource is greater than or equal to or is less than or equal to a third threshold;
the priority of the first resource is lower than the priority of the third resource;
a measurement result for the first mode of the sidelink is lower than a measurement result for the second mode of the sidelink;
a measurement result of the uplink is lower than the measurement result for the second mode of the sidelink;
a measurement result of the downlink is lower than the measurement result for the second mode of the sidelink;
the measurement result for the first mode of the sidelink is greater than or equal to or is less than or equal to a fourth threshold;
the measurement result of the uplink is greater than or equal to or is less than or equal to the fourth threshold;
the measurement result of the downlink is greater than or equal to or is less than or equal to the fourth threshold;
the measurement result for the second mode of the sidelink is greater than or equal to or is less than or equal to a fifth threshold;
priority information of the sidelink transmission for the first mode is greater than or equal to or is less than or equal to a sixth threshold;
priority information of the uplink transmission is greater than or equal to or is less than or equal to the sixth threshold;
priority information of the downlink transmission is greater than or equal to or is less than or equal to the sixth threshold;
priority information of the sidelink transmission for the second mode is greater than or equal to or is less than or equal to the sixth threshold;
a measurement result of the first resource is lower than a measurement result of the third resource;
the measurement result of the first resource is greater than or equal to or is less than or equal to the fourth threshold;
the measurement result of the third resource is greater than or equal to or is less than or equal to the fifth threshold;
the first resource includes a resource shared by the first terminal device and another terminal device, where the resource shared by the first terminal device and the another terminal device includes a first-type configured grant resource, and the first-type configured grant includes a sidelink resource and/or an uplink resource provided by the network device by using RRC signaling;

a start time domain position of the first resource is after or before a start time domain position of the third resource;

the first resource includes a periodic first time-frequency resource, the second resource includes a periodic second time-frequency resource, and a periodicity of the first time-frequency resource is greater than or less than a periodicity of the second time-frequency resource;

the first resource includes the periodic first time-frequency resource, the second resource includes the periodic second time-frequency resource, and a time interval between two adjacent first time-frequency resources is greater than or less than a time interval between two adjacent second time-frequency resources;

a size of the first resource is greater than or less than a size of the third resource; and a proportion of an overlapping resource in the first resource to the first resource is greater than or less than a proportion of an overlapping resource in the third resource to the third resource.

In another possible implementation, the method further includes: sending, by the first terminal device, second information to a third terminal device, where the second information is used to indicate that the first terminal device releases the first resource and/or indicate the first resource released by the first terminal device.

A second aspect of the embodiments provides a communication processing method. The method includes:

receiving, by a network device, first information sent by a first terminal device, where the first information is used to indicate any one or more of the following content: information indicating that the first terminal device releases a first resource; the first resource released by the first terminal device; and information indicating that the first terminal device requests a second resource from the network device.

In this embodiment, when the first terminal device determines to release the first resource, the first terminal device may send the first information to the network device, so that the network device determines the first resource released by the first terminal device. In this way, the network device may allocate the first resource to another terminal device, to improve resource utilization.

In a possible implementation, the first resource and/or the second resource include/includes any one or more of the following content:

a resource of a sidelink;
a first-mode resource of the sidelink;
a configured grant resource of the sidelink;
a first-type configured grant resource of the sidelink;
a second-type configured grant resource of the sidelink;
a dynamic grant resource of the sidelink;
a resource of an uplink;
a configured grant resource of the uplink;
a first-type configured grant resource of the uplink;
a second-type configured grant resource of the uplink;
a dynamic grant resource of the uplink;
a resource of a downlink;
a semi-persistently allocated resource of the downlink; and
a dynamically allocated resource of the downlink, where the sidelink is a wireless direct communication link between the first terminal device and a second terminal device, the uplink and the downlink are links for communication between the first terminal device and the network device, the first-type configured grant resource includes a sidelink resource and/or an uplink resource that are/is provided by the network device by using RRC signaling, the second-type configured grant resource means that the network device provides a resource periodicity for the sidelink and/or a resource periodicity for the uplink by using RRC signaling and then activates the sidelink resource and/or the uplink resource by using a PDCCH or DCI, the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink.

In another possible implementation, the first information includes any one or more of the following content:

an indication that the first terminal device releases the first resource, where the first resource includes any one or more of the following content: the resource of the sidelink, the resource of the uplink, and the resource of the downlink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device;

information about the first resource;
resource type information of the first resource;
time domain information of the first resource;
time domain position information of the first resource;
time domain length information of the first resource;
frequency domain information of the first resource;
frequency domain position information of the first resource;
frequency domain bandwidth information of the first resource;
a periodicity or an interval of the first resource;
duration of the first resource;
time information of releasing the first resource by the first terminal device;
information about releasing the $1^{st}$ time-frequency resource of the first resource by the first terminal device;
time domain information of releasing the $1^{st}$ time-frequency resource of the first resource by the first terminal device;
frequency domain information of releasing the $1^{st}$ time-frequency resource of the first resource by the first terminal device;
a time interval between time at which the first terminal device releases the first resource and time at which the first terminal device sends the first information;
an indication that the first terminal device senses, selects, or obtains, through contention, the third resource, where the third resource includes the second-mode resource of the sidelink, and the third resource includes a resource selected, contended for, or sensed by the first terminal device and/or a resource reserved by the first terminal device;
an indication that the first terminal device reserves the third resource;
an indication that the first resource overlaps the third resource in time domain;
information about the third resource;
resource type information of the third resource;
time domain information of the third resource;
time domain length information of the third resource;
time domain position information of the third resource;
frequency domain information of the third resource;
frequency domain bandwidth information of the third resource;
frequency domain position information of the third resource;
a periodicity or a time interval of the third resource;
duration of the third resource;
a periodicity or a time interval of a service or data transmitted on the first resource;
a periodicity or a time interval of a service or data transmitted on the third resource;
a time offset of the time domain position of the first resource relative to the time domain position at which the first terminal device sends the first information;
a time offset of a time domain position of the third resource relative to the time domain position at which the first terminal device sends the first information;
priority information of the service or the data transmitted on the first resource;
priority information of the service or the data transmitted on the third resource;
priority information of the first resource;
priority information of the third resource;
an indication that a priority of the first resource is lower than a priority of the third resource;
information about an overlapping resource in the first resource and the third resource; time domain information of the first resource overlapping the third resource;
information about a time domain offset of the first resource relative to the third resource;
information about a resource that does not overlap the third resource;
an indication that the first terminal device requests the second resource from the network device;
information about the second resource;
resource type information of the second resource;
time domain information of the second resource;
frequency domain information of the second resource;
a periodicity or an interval of the second resource;
information about a time domain offset of the second resource relative to the third resource;
the information about the frequency domain offset of the first resource relative to the third resource;
an indication that the first terminal device has resource reservation;
information about a resource reserved by the first terminal device;
an indication that the first terminal device may perform retransmission;
a quantity of retransmission times or a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the receiving, by a network device, first information sent by a first terminal device includes: receiving, by the network device by using any one of RRC signaling, MAC signaling, and physical layer signaling, the first information sent by the first terminal device.

A third aspect of the embodiments provides a communication processing method. The method includes:
reselecting, by a first terminal device, a fourth resource when a third condition is met, where the fourth resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device. In this embodiment, triggering the first terminal device to reselect the fourth resource used for a second mode for the sidelink is set, for example, when any one or more of a first-mode resource of the sidelink, a resource of an uplink, and a resource of a downlink overlap a selected or reserved sixth resource used for the second mode for the sidelink, the first terminal device may reselect the fourth resource used for the second mode for the sidelink in this case, to improve transmission performance of sidelink transmission for a first mode, uplink transmission, downlink transmission, and sidelink transmission for the second mode.

In a possible implementation, the third condition includes any one or more of the following content:
a fifth resource overlaps a sixth resource in time domain, where the fifth resource includes any one or more of the following content: a resource of the sidelink, a resource of the uplink, and a resource of the downlink, the sixth resource includes a second-mode resource of the sidelink, the resource of the uplink includes a resource of an uplink between the first terminal device and a network device, and the resource of the downlink includes a resource of a downlink between the first terminal device and the network device;
the fifth resource periodically overlaps the sixth resource in time domain;
the fifth resource overlaps the sixth resource for N times in time domain, where N is an integer greater than 0;
the fifth resource is to overlap the sixth resource in time domain;
the fifth resource is to periodically overlap the sixth resource in time domain;
the fifth resource is to overlap the sixth resource for N times in time domain;
the sixth resource overrides the fifth resource or the sixth resource overrides the fifth resource;
the sixth resource periodically overrides the fifth resource or the fifth resource periodically overrides the sixth resource;
the sixth resource overrides the fifth resource for N times or the fifth resource overrides the sixth resource for N times;
the sixth resource is to override the fifth resource or the fifth resource is to override the sixth resource;
the sixth resource is to periodically override the fifth resource or the fifth resource is to periodically override the sixth resource;

the sixth resource is to override the fifth resource for N times or the fifth resource is to override the sixth resource for N times;
second duration is greater than a seventh threshold, where the second duration is a time difference between a time domain position of the sixth resource and a moment at which the first terminal device releases the sixth resource; and
the sixth resource includes a periodic time-frequency resource.

In another possible implementation, the method further includes: sending, by the first terminal device, third information to a third terminal device, where the third information is used to indicate that the first terminal device releases the sixth resource, and the sixth resource includes the second-mode resource of the sidelink.

In another possible implementation, the sending, by the first terminal device, third information to a third terminal device includes: sending, by the first terminal device, the third information to the third terminal device by using any one of sidelink control information (sidelink control information, SCI), RRC signaling, MAC signaling, and physical layer signaling.

In another possible implementation, the third information includes at least one of the following:
an indication that the first terminal device releases the sixth resource, where the sixth resource includes the second-mode resource of the sidelink;
information about the sixth resource;
resource type information of the sixth resource;
time domain information of the sixth resource;
time domain position information of the sixth resource;
time domain length information of the sixth resource;
frequency domain information of the sixth resource;
frequency domain position information of the sixth resource;
frequency domain bandwidth information of the sixth resource;
a periodicity or an interval of the sixth resource;
duration of the sixth resource;
time information of releasing the sixth resource by the first terminal device;
information about releasing the $1^{st}$ time-frequency resource of the sixth resource by the first terminal device;
time domain information of releasing the $1^{st}$ time-frequency resource of the sixth resource by the first terminal device;
frequency domain information of releasing the $1^{st}$ time-frequency resource of the sixth resource by the first terminal device;
a time interval between time at which the first terminal device releases the sixth resource and a moment at which the first terminal device sends the third information;
an indication that the first terminal device senses, selects, or obtains, through contention, the sixth resource, where the sixth resource includes a resource selected, contended for, or sensed by the first terminal device and/or a reserved resource reserved by the first terminal device;
an indication that the first terminal device reserves the sixth resource;
an indication that the fifth resource overlaps the sixth resource in time domain, where the fifth resource includes any one or more of the following content: the resource of the sidelink, the resource of the uplink, and the resource of the downlink, and the sixth resource includes the second-mode resource of the sidelink;
information about the fifth resource;
resource type information of the fifth resource;
time domain information of the fifth resource;
time domain length information of the fifth resource;
time domain position information of the fifth resource;
frequency domain information of the fifth resource;
frequency domain bandwidth information of the fifth resource;
frequency domain position information of the fifth resource;
a periodicity or a time interval of the fifth resource;
duration of the fifth resource;
a periodicity or a time interval of a service transmitted on the fifth resource;
a periodicity or a time interval of a service transmitted on the sixth resource;
a time offset of a time domain position of the fifth resource relative to a time domain position at which the first terminal device sends the third information;
priority information of a service or data transmitted on the fifth resource;
priority information of a service or data transmitted on the sixth resource;
priority information of the fifth resource;
priority information of the sixth resource;
an indication that a priority of the sixth resource is lower than a priority of the fifth resource;
time domain information of the fifth resource overlapping the sixth resource;
information about a time domain offset of the sixth resource relative to the fifth resource;
information about a resource that does not overlap the fifth resource;
an indication that the first terminal device has resource reservation;
information about a resource reserved by the first terminal device;
an indication that the first terminal device may perform retransmission;
a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, before the reselecting, by a first terminal device, a fourth resource used for a second mode for a sidelink when a third condition is met, the method further includes:
determining, by the first terminal device, that a priority of the sixth resource is lower than a priority of the fifth resource when a fourth condition is met, where the fifth resource includes any one or more of the following content: the resource of the sidelink, the resource of the uplink, and the resource of the downlink, and the sixth resource includes the second-mode resource of the sidelink; and
determining, by the first terminal device, to release the sixth resource.

In another possible implementation, the fourth condition includes any one or more of the following content:
a priority of sidelink transmission for the first mode is higher than a priority of sidelink transmission for the second mode;

a priority of uplink transmission is higher than the priority of the sidelink transmission for the second mode;

a priority of downlink transmission is higher than the priority of the sidelink transmission for the second mode;

a priority of a service or data transmitted on the fifth resource is higher than a priority of a service or data transmitted on the sixth resource;

priority information of the service or the data transmitted on the fifth resource is greater than or equal to or is less than or equal to a second threshold;

priority information of the service or the data transmitted on the sixth resource is greater than or equal to or is less than or equal to a third threshold;

a priority of the fifth resource is higher than a priority of the sixth resource;

a measurement result for the first mode of the sidelink is higher than a measurement result for the second mode of the sidelink;

a measurement result of the uplink is higher than the measurement result for the second mode of the sidelink;

a measurement result of the downlink is higher than the measurement result for the second mode of the sidelink;

the measurement result for the first mode of the sidelink is greater than or equal to or is less than or equal to a fourth threshold;

the measurement result of the uplink is greater than or equal to or is less than or equal to the fourth threshold;

the measurement result of the downlink is greater than or equal to or is less than or equal to the fourth threshold;

the measurement result for the second mode of the sidelink is greater than or less than a fifth threshold;

a measurement result of the fifth resource is higher than a measurement result of the sixth resource;

the measurement result of the fifth resource is greater than or equal to or is less than or equal to the fourth threshold;

a measurement result of the sixth resource is greater than or equal to or is less than or equal to the fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

the fifth resource includes a resource shared by the first terminal device and another terminal device, where the resource shared by the first terminal device and the another terminal device includes a first-type configured grant resource and/or a second-mode resource of the sidelink, and the first-type configured grant includes a sidelink resource and/or an uplink resource provided by the network device by using RRC signaling;

the fifth resource includes a dedicated resource of the first terminal device;

a start time domain position of the fifth resource is before a start time domain position of the sixth resource;

the fifth resource includes a periodic third time-frequency resource, the sixth resource includes a periodic fourth time-frequency resource, and a periodicity of the third time-frequency resource is greater than or less than a periodicity of the fourth time-frequency resource;

the fifth resource includes the periodic third time-frequency resource, the sixth resource includes the periodic fourth time-frequency resource, and a time interval between two adjacent third time-frequency resources is greater than or less than a time interval between two adjacent fourth time-frequency resources;

a size of the fifth source is greater than or less than a size of the sixth resource; and a proportion of an overlapping resource in the sixth resource to the sixth resource is greater than or less than a proportion of an overlapping resource in the fifth resource to the fifth resource.

A fourth aspect of the embodiments provides a communication processing method. The method includes:

sending, by a first terminal device, fourth information to a third terminal device, where the fourth information is used to indicate that the first terminal device releases a seventh resource and/or indicate the seventh resource released by the first terminal device, the seventh resource includes a resource of a sidelink, and the sidelink is a wireless direct communication link between the first terminal device and a second terminal device.

In this embodiment, after the first terminal device determines to release the seventh resource of the sidelink, the first terminal device may send the fourth information to a surrounding terminal device, to notify the surrounding terminal device of information about the seventh resource released by the first terminal device. In this way, the surrounding terminal device may select the seventh resource, to avoid or reduce waste of the seventh resource and improve resource utilization.

In a possible implementation, the sending, by a first terminal device, fourth information to a third terminal device includes:

sending, by the first terminal device, the fourth information to the third terminal device when a fifth condition is met, where the fifth condition includes at least one of the following conditions:

the seventh resource overlaps an eighth resource in time domain, where the seventh resource includes a first-mode resource of the sidelink and/or a second-mode resource of the sidelink, the eighth resource includes any one or more of the following content: the first-mode resource of the sidelink, the second-mode resource of the sidelink, a resource of an uplink, and a resource of a downlink, the first-mode resource of the sidelink includes a resource scheduled by a network device for the first terminal device, the second-mode resource of the sidelink includes a resource selected, contended for, or sensed by the first terminal device and/or a resource reserved by the first terminal device, the resource of the uplink includes a resource of an uplink between the first terminal device and the network device, and the resource of the downlink includes a resource of a downlink between the first terminal device and the network device;

the seventh resource periodically overlaps the eighth resource in time domain;

the seventh resource overlaps the eighth resource for N times in time domain, where N is an integer greater than 0;

the seventh resource is to overlap the eighth resource in time domain;

the seventh resource is to periodically overlap the eighth resource in time domain;

the seventh resource is to overlap the eighth resource for N times in time domain;

the seventh resource overrides the eighth resource or the eighth resource overrides the seventh resource;

the eighth resource periodically overrides the seventh resource or the seventh resource periodically overrides the eighth resource;

the eighth resource overrides the seventh resource for N times or the seventh resource overrides the eighth resource for N times;

the eighth resource is to override the seventh resource or the seventh resource is to override the eighth resource;

the eighth resource is to periodically override the seventh resource or the seventh resource is to periodically override the eighth resource;

the eighth resource is to override the seventh resource for N times or the seventh resource is to override the eighth resource for N times;

third duration is greater than an eighth threshold, where the third duration is a time difference between a time domain resource of the seventh resource and a moment at which the first terminal device releases the seventh resource, or is a time difference between a time domain position of the seventh resource and a time domain position at which the first terminal device sends the fourth information to the third terminal device;

the eighth resource includes a dedicated resource of the first terminal device;

the seventh resource includes a periodic time-frequency resource; and the first terminal device has a resource of the sidelink.

In another possible implementation, the sending, by a first terminal device, fourth information to a third terminal device includes:

sending, by the first terminal device, the fourth information to the third terminal device by using any one of SCI, RRC signaling, MAC signaling, and physical layer signaling.

In another possible implementation, the fourth information includes at least one of the following:

an indication that the first terminal device releases the seventh resource;

information about the seventh resource;

resource type information of the seventh resource;

time domain information of the seventh resource;

time domain position information of the seventh resource;

time domain length information of the seventh resource;

frequency domain information of the seventh resource;

frequency domain position information of the seventh resource;

frequency domain bandwidth information of the seventh resource;

a periodicity or an interval of the seventh resource;

duration of the seventh resource;

time information of releasing the seventh resource by the first terminal device;

information about releasing the $1^{st}$ time domain resource of the seventh resource by the first terminal device;

time domain information of releasing the $1^{st}$ time-frequency resource of the first resource by the first terminal device;

frequency domain information of releasing the $1^{st}$ time-frequency resource of the first resource by the first terminal device;

a time interval between time at which the first terminal device releases the seventh resource and a moment at which the first terminal device sends the fourth information;

an indication that the first terminal device senses, selects, or obtains, through contention, the seventh resource;

an indication that the first terminal device reserves the seventh resource;

an indication that the eighth resource overlaps the seventh resource in time domain, where the eighth resource includes any one or more of the following content: the first-mode resource of the sidelink, the second-mode resource of the sidelink, the resource of the uplink, and the resource of the downlink, the resource of the uplink includes the resource of the uplink between the first terminal device and the network device, and the resource of the downlink includes the resource of the downlink between the first terminal device and the network device;

information about the eighth resource;

resource type information of the eighth resource;

time domain information of the eighth resource;

time domain length information of the eighth resource;

time domain position information of the eighth resource;

frequency domain information of the eighth resource;

frequency domain bandwidth information of the eighth resource;

frequency domain position information of the eighth resource;

a periodicity or a time interval of the eighth resource;

duration of the eighth resource;

a periodicity or a time interval of a service transmitted on the seventh resource;

a periodicity or a time interval of a service transmitted on the eighth resource;

a time offset of the time domain position of the seventh resource relative to a time domain position at which the first terminal device sends the fourth information;

a time offset of a time domain position of the eighth resource relative to the time domain position at which the first terminal device sends the fourth information;

priority information of the service transmitted on the seventh resource;

priority information of the service transmitted on the eighth resource;

priority information of the seventh resource;

priority information of the eighth resource;

an indication that a priority of the seventh resource is lower than a priority of the eighth resource;

time domain information of the seventh resource overlapping the eighth resource;

information about a time domain offset of the seventh resource relative to the eighth resource;

information about a resource that does not overlap the eighth resource;

an indication that the first terminal device has resource reservation;

information about a resource reserved by the first terminal device;

an indication that the first terminal device may perform retransmission;

a quantity of retransmission times and/or a maximum quantity of retransmission times of the first terminal device;

a time interval between initial transmission and retransmission of the first terminal device; and frequency domain information of the initial transmission and frequency domain information of the retransmission of the first terminal device.

In another possible implementation, before the sending, by a first terminal device, fourth information to a third terminal device, the method further includes:

determining, by the first terminal device, that the priority of the seventh resource is lower than the priority of the eighth resource when a sixth condition is met, where the seventh resource includes the first-mode resource of the sidelink and/or the second-mode resource of the sidelink, the eighth resource includes any one or more of the following content: the resource of the sidelink, the resource of the uplink, and the resource of the downlink, the resource of the uplink includes the resource of the uplink between the first terminal device and the network device, and the resource of the downlink includes the resource of the downlink between the first terminal device and the network device; and determining, by the first terminal device, to release the seventh resource.

In another possible implementation, the sixth condition includes any one or more of the following content:

a priority of sidelink transmission for a first mode is higher than a priority of sidelink transmission for a second mode;

a priority of uplink transmission is higher than the priority of the sidelink transmission for the second mode;

a priority of downlink transmission is higher than the priority of the sidelink transmission for the second mode;

a priority of a service or data transmitted on the eighth resource is higher than a priority of a service or data transmitted on the seventh resource;

priority information of the service or the data transmitted on the seventh resource is greater than or equal to or is less than or equal to a second threshold;

priority information of the service or the data transmitted on the eighth resource is greater than or equal to or is less than or equal to a third threshold;

the priority of the eighth resource is higher than the priority of the seventh resource;

a measurement result for the first mode of the sidelink is higher than a measurement result for the second mode of the sidelink;

a measurement result of the uplink is higher than the measurement result for the second mode of the sidelink;

a measurement result of the downlink is higher than the measurement result for the second mode of the sidelink;

the measurement result for the first mode of the sidelink is greater than or equal to or is less than or equal to a fourth threshold;

the measurement result of the uplink is greater than or equal to or is less than or equal to the fourth threshold;

the measurement result of the downlink is greater than or equal to or is less than or equal to the fourth threshold;

the measurement result for the second mode of the sidelink is greater than or less than a fifth threshold;

a measurement result of the eighth resource is higher than a measurement result of the seventh resource;

a measurement result of the seventh resource is greater than or equal to or is less than or equal to the fourth threshold;

a measurement result of the eighth resource is greater than or equal to or is less than or equal to the fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

the eighth resource includes a resource shared by the first terminal device and another terminal device, where the resource shared by the first terminal device and the another terminal device includes a first-type configured grant resource and/or the second-mode resource of the sidelink, and the first-type configured grant includes a sidelink resource and/or an uplink resource provided by the network device by using RRC signaling;

a start time domain position of the eighth resource is before or after a start time domain position of the seventh resource;

the eighth resource includes a periodic fifth time-frequency resource, the seventh resource includes a periodic sixth time-frequency resource, and a periodicity of the fifth time-frequency resource is greater than or less than a periodicity of the sixth time-frequency resource;

the eighth resource includes the periodic fifth time-frequency resource, the seventh resource includes the periodic sixth time-frequency resource, and a time interval between two adjacent fifth time-frequency resources is greater than or less than a time interval between two adjacent sixth time-frequency resources;

a size of the eighth resource is less than or greater than a size of the seventh resource;

a proportion of an overlapping resource in the seventh resource to the seventh resource is greater than or less than a proportion of an overlapping resource in the eighth resource to the eighth resource.

A fifth aspect of the embodiments provides a communication processing method. The method includes:

determining, by a first terminal device, a ninth resource, where the ninth resource is used for any one or more of the following content: sidelink transmission, uplink transmission, and downlink transmission, a sidelink is a wireless direct communication link between the first terminal device and a second terminal device, the uplink transmission is transmission of an uplink between the first terminal device and a network device, and the downlink transmission is transmission of a downlink between the first terminal device and the network device; and selecting, by the first terminal device, a tenth resource based on the ninth resource, where the tenth resource includes a second-mode resource of the sidelink, and the second-mode resource of the sidelink includes a resource selected, contended for, or sensed by the first terminal device and/or a resource reserved by the first terminal device.

In this embodiment, the first terminal device selects the tenth resource used for the second mode for the sidelink with reference to a selection status of the scheduled ninth resource, so that a problem that the ninth resource overlaps the second resource in time domain can be avoided or reduced.

In a possible implementation, the tenth resource does not include any one of the following content:
the ninth resource;
all time-frequency resources in time domain in which the ninth resource is located;
a subset of the ninth resource; and
all time-frequency resources in time domain in which the subset of the ninth resource is located.

In another possible implementation, the subset of the ninth resource includes a resource whose priority is higher than that of the tenth resource.

In another possible implementation, the selecting, by the first terminal device, a tenth resource based on the ninth resource includes:
determining, by the first terminal device, that a priority of the ninth resource is higher than the priority of the tenth resource when a seventh condition is met; and
selecting, by the first terminal device, the tenth resource when excluding the ninth resource or any time domain resource in time domain in which the ninth resource is located.

In another possible implementation, the seventh condition includes any one or more of the following content:
a priority of sidelink transmission for the first mode is higher than a priority of sidelink transmission for the second mode;
a priority of the uplink transmission is higher than the priority of the sidelink transmission for the second mode;
a priority of the downlink transmission is higher than the priority of the sidelink transmission for the second mode;
a priority of a service or data transmitted on the ninth resource is higher than a priority of a service or data transmitted on the tenth resource;
priority information of the service or the data transmitted on the ninth resource is greater than or equal to or is less than or equal to a second threshold;
priority information of the service or the data transmitted on the tenth resource is greater than or equal to or is less than or equal to a third threshold;
the priority of the ninth resource is higher than the priority of the tenth resource;
a measurement result for the first mode of the sidelink is higher than a measurement result for the second mode of the sidelink;
a measurement result of the uplink is higher than the measurement result for the second mode of the sidelink;
a measurement result of the downlink is higher than the measurement result for the second mode of the sidelink;
the measurement result for the first mode of the sidelink is greater than or equal to or is less than or equal to a fourth threshold;
the measurement result of the uplink is greater than or equal to or is less than or equal to the fourth threshold;
the measurement result of the downlink is greater than or equal to or is less than or equal to the fourth threshold;
the measurement result for the second mode of the sidelink is greater than or equal to or is less than or equal to a fifth threshold;
priority information of the sidelink transmission for the first mode is greater than or equal to or is less than or equal to a sixth threshold;
priority information of the uplink transmission is greater than or equal to or is less than or equal to the sixth threshold;
priority information of the downlink transmission is greater than or equal to or is less than or equal to the sixth threshold;
priority information of the sidelink transmission for the second mode is greater than or equal to or is less than or equal to the sixth threshold;
a measurement result of the ninth resource is higher than a measurement result of the tenth resource;
the measurement result of the ninth resource is greater than or equal to or is less than or equal to the fourth threshold;
the measurement result of the tenth resource is greater than or equal to or is less than or equal to the fifth threshold;
the ninth resource includes a resource shared by the first terminal device and another terminal device, where the resource shared by the first terminal device and the another terminal device includes a first-type configured grant resource and/or the second-mode resource of the sidelink, and the first-type configured grant includes a sidelink resource and/or an uplink resource provided by the network device by using RRC signaling;
the ninth resource includes a dedicated resource of the first terminal device;
a start time domain position of the ninth resource is before or after a start time domain position of the tenth resource;
the ninth resource includes a periodic seventh time-frequency resource, the tenth resource includes a periodic eighth time-frequency resource, and a periodicity of the seventh time-frequency resource is greater than or less than a periodicity of the eighth time-frequency resource;
the ninth resource includes the periodic seventh time-frequency resource, the tenth resource includes the periodic eighth time-frequency resource, and a time interval between two adjacent seventh time-frequency resources is greater than or less than a time interval between two adjacent eighth time-frequency resources;
a size of the ninth resource is greater than a size of the tenth resource; and
a proportion of an overlapping resource in the ninth resource to the ninth resource is greater than or less than a proportion of an overlapping resource in the tenth resource to the tenth resource.

In another possible implementation, the ninth resource includes any one or more of the following content:
a resource of the sidelink;
a first-mode resource of the sidelink;
a configured grant resource of the sidelink;
a first-type configured grant resource of the sidelink;
a second-type configured grant resource of the sidelink;
a dynamic grant resource of the sidelink;
a resource of the uplink;
a configured grant resource of the uplink;
a first-type configured grant resource of the uplink;
a second-type configured grant resource of the uplink;
a dynamic grant resource of the uplink;
a resource of the downlink;
a semi-persistently allocated resource of the downlink; and a dynamically allocated resource of the downlink, where
the first-type configured grant includes a sidelink resource and/or an uplink resource that are/is provided by the network device by using RRC signaling, the second-type configured grant means that the network device provides a resource periodicity for the sidelink and/or a resource periodicity for the uplink by using RRC signaling and then activates the sidelink resource and/or the uplink resource by using a PDCCH or DCI, the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink; and the tenth resource includes a resource selected, contended for, or sensed by the first terminal device and/or a resource reserved by the first terminal device.

In another possible implementation, the determining, by a first terminal device, a ninth resource includes:

receiving, by the first terminal device before a sensing window ends, scheduling information sent by the network device, where a resource scheduled by the network device by using the scheduling information exists in a selection window; and determining, by the first terminal device based on the scheduling information, the ninth resource scheduled by the network device for the first terminal device.

A sixth aspect of the embodiments provides a communication processing method. The method includes:

sending, by a first terminal device, fifth information to a network device, where the fifth information is used to indicate information about an eleventh resource and/or indicate that the first terminal device requests a twelfth resource from the network device, the eleventh resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device.

In this embodiment, the first terminal device may send the fifth information to the network device. In this way, when scheduling a resource for the first terminal device, the network device may schedule the resource for the first terminal device with reference to a selection status of the eleventh resource used for the second mode for the sidelink, to avoid or reduce overlap between the resource scheduled by the network device for the first terminal device and the eleventh resource.

In a possible implementation, the sending, by a first terminal device, fifth information to a network device includes:

sending, by the first terminal device, the fifth information to the network device when a ninth condition is met, where the ninth condition includes any one or more of the following content:

the first terminal device is in a connected state;
the first terminal device determines that a priority of the eleventh resource is higher than a priority of the twelfth resource, where the twelfth resource includes any one or more of the following content: a first-mode resource of the sidelink, a resource of an uplink, and a resource of a downlink, the first-mode resource of the sidelink includes a resource scheduled by the network device for the first terminal device, the resource of the uplink includes a resource of an uplink between the first terminal device and the network device, and the resource of the downlink includes a resource of a downlink between the first terminal device and the network device;
the first terminal device sends a resource request message to the network device, where the resource request message is used to request the twelfth resource from the network device;
the first terminal device senses, selects, or obtains, through contention, the eleventh resource and/or reserves the eleventh resource; and
the first terminal device has a resource of the uplink.

In another possible implementation, the fifth information includes any one or more of the following information:

an indication that the first terminal device senses, selects, or obtains, through contention, the eleventh resource;
an indication that the first terminal device reserves the eleventh resource;
the information about the eleventh resource;
resource type information of the eleventh resource;
time domain information of the eleventh resource;
time domain length information of the eleventh resource;
time domain position information of the eleventh resource;
frequency domain information of the eleventh resource;
frequency domain bandwidth information of the eleventh resource;
frequency domain position information of the eleventh resource;
a periodicity or a time interval of the eleventh resource;
duration of the eleventh resource;
a periodicity or a time interval of a service or data transmitted on the eleventh resource;
a time offset of a time domain position of the eleventh resource relative to a time domain position at which the first terminal device sends the fifth information;
a time offset of a time domain position of the twelfth resource relative to the time domain position at which the first terminal device sends the fifth information;
priority information of the service or the data transmitted on the eleventh resource;
priority information of the eleventh resource;
information about a resource that does not overlap the eleventh resource;
an indication that the first terminal device requests the twelfth resource from the network device;
information about the twelfth resource;
resource type information of the twelfth resource;
time domain information of the twelfth resource;
time domain length information of the twelfth resource;

time domain position information of the twelfth resource;
frequency domain information of the twelfth resource;
frequency domain bandwidth information of the twelfth resource;
frequency domain position information of the twelfth resource;
a periodicity or an interval of the twelfth resource;
information about a time domain offset of the twelfth resource relative to the eleventh resource;
an indication that the first terminal device has resource reservation;
information about a resource reserved by the first terminal device;
an indication that the first terminal device may perform retransmission;
a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the sending, by a first terminal device, fifth information to a network device includes:
sending, by the first terminal device, the fifth information to the network device by using RRC signaling, MAC signaling, and physical layer signaling.

In another possible implementation, the sending, by a first terminal device, fifth information to a network device includes:
determining, by the first terminal device, that the priority of the eleventh resource is higher than the priority of the twelfth resource when a tenth condition is met; and
sending, by the first terminal device, the fifth information to the network device, where the ninth condition includes any one or more of the following content:
a priority of sidelink transmission for the first mode is lower than a priority of sidelink transmission for the second mode;
a priority of uplink transmission is lower than the priority of the sidelink transmission for the second mode;
a priority of downlink transmission is lower than the priority of the sidelink transmission for the second mode;
a priority of the service or the data transmitted on the eleventh resource is higher than a priority of the service or the data transmitted on the twelfth resource;
priority information of the service or the data transmitted on the eleventh resource is greater than or less than a second threshold;
priority information of the service or the data transmitted on the twelfth resource is greater than or less than a third threshold;
the priority of the eleventh resource is higher than the priority of the sixth resource;
a measurement result for the second mode of the sidelink is higher than a measurement result for the first mode of the sidelink;
a measurement result of the uplink is lower than the measurement result for the second mode of the sidelink;
a measurement result of the downlink is lower than the measurement result for the second mode of the sidelink;
the measurement result for the second mode of the sidelink is greater than or equal to or is less than or equal to a fourth threshold;
the measurement result of the uplink is greater than or equal to or is less than or equal to the fourth threshold;
the measurement result of the downlink is greater than or equal to or is less than or equal to the fourth threshold;
the measurement result for the first mode of the sidelink is greater than or less than a fifth threshold;
priority information of the sidelink transmission for the first mode is greater than or equal to or is less than or equal to a sixth threshold;
priority information of the uplink transmission is greater than or equal to or is less than or equal to the sixth threshold;
priority information of the downlink transmission is greater than or equal to or is less than or equal to the sixth threshold;
priority information of the sidelink transmission for the second mode is greater than or equal to or is less than or equal to the sixth threshold;
a measurement result of the eleventh resource is higher than a measurement result of the twelfth resource;
the measurement result of the eleventh resource is greater than or equal to or is less than or equal to the fourth threshold;
the measurement result of the eleventh resource is greater than or equal to or is less than or equal to the fifth threshold;
a start time domain position of the eleventh resource is before or after a start time domain position of the twelfth resource;
the eleventh resource includes a periodic ninth time-frequency resource, the twelfth resource includes a periodic tenth time-frequency resource, and a periodicity of the ninth time-frequency resource is greater than or less than a periodicity of the tenth time-frequency resource;
the eleventh resource includes the periodic ninth time-frequency resource, the twelfth resource includes the periodic tenth time-frequency resource, and a time interval between two adjacent ninth time-frequency resources is greater than or less than a time interval between two adjacent tenth time-frequency resources;
a size of the eleventh resource is less than a size of the twelfth resource; and
a proportion of an overlapping resource in the eleventh resource to the eleventh resource is greater than or less than a proportion of an overlapping resource in the twelfth resource to the twelfth resource.

A seventh aspect of the embodiments provides a communication processing method. The method includes:
receiving, by a network device, fifth information sent by a first terminal device, where the fifth information is used to indicate information about an eleventh resource and/or indicate that the first terminal device requests a twelfth resource from the network device, the eleventh resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device.

In this embodiment, the network device may receive the fifth information sent by the first terminal device. In this way, when scheduling a resource for the first terminal device, the network device may schedule the resource for the first terminal device with reference to a selection status of the eleventh resource used for the second mode for the sidelink, to avoid or reduce overlap between the resource scheduled by the network device for the first terminal device and the eleventh resource.

In a possible implementation, the network device schedules the twelfth resource for the first terminal device based on the fifth information, where the twelfth resource includes any one or more of the following content: a first-mode resource of the sidelink, a resource of an uplink, and a resource of a downlink, the resource of the uplink includes a resource of an uplink between the first terminal device and the network device, and the resource of the downlink includes a resource of a downlink between the first terminal device and the network device.

In another possible implementation, the twelfth resource does not include any one of the following content:
the eleventh resource;
all time-frequency resources in time domain in which the eleventh resource is located;
a subset of the eleventh resource; and
all time-frequency resources in time domain in which the subset of the eleventh resource is located.

In another possible implementation, the subset of the eleventh resource includes a resource whose priority is higher than that of the twelfth resource.

In another possible implementation, the scheduling, by the network device, the twelfth resource for the first terminal device based on the fifth information includes:
determining, by the network device, that a priority of the eleventh resource is higher than the priority of the twelfth resource when an eighth condition is met; and
scheduling, by the network device, the twelfth resource for the first terminal device when excluding the eleventh resource or any time-frequency resource in time domain in which the eleventh resource is located.

In another possible implementation, the eighth condition includes any one or more of the following content:
a priority of sidelink transmission for the first mode is lower than a priority of sidelink transmission for the second mode;
a priority of uplink transmission is lower than the priority of the sidelink transmission for the second mode;
a priority of downlink transmission is lower than the priority of the sidelink transmission for the second mode;
a priority of a service or data transmitted on the eleventh resource is higher than a priority of a service or data transmitted on the twelfth resource;
priority information of the service or the data transmitted on the eleventh resource is greater than or less than a second threshold;
priority information of the service or the data transmitted on the twelfth resource is greater than or less than a third threshold;
the priority of the eleventh resource is higher than the priority of the sixth resource;
a measurement result for the second mode of the sidelink is higher than a measurement result for the first mode of the sidelink;
a measurement result of the uplink is lower than the measurement result for the second mode of the sidelink;
a measurement result of the downlink is lower than the measurement result for the second mode of the sidelink;
the measurement result for the second mode of the sidelink is greater than or equal to or is less than or equal to a fourth threshold;
the measurement result of the uplink is greater than or equal to or is less than or equal to the fourth threshold;
the measurement result of the downlink is greater than or equal to or is less than or equal to the fourth threshold;
the measurement result for the first mode of the sidelink is greater than or less than a fifth threshold;
priority information of the sidelink transmission for the first mode is greater than or equal to or is less than or equal to a sixth threshold;
priority information of the uplink transmission is greater than or equal to or is less than or equal to the sixth threshold;
priority information of the downlink transmission is greater than or equal to or is less than or equal to the sixth threshold;
priority information of the sidelink transmission for the second mode is greater than or equal to or is less than or equal to the sixth threshold;
a measurement result of the eleventh resource is higher than a measurement result of the twelfth resource;
the measurement result of the eleventh resource is greater than or equal to or is less than or equal to the fourth threshold;
the measurement result of the eleventh resource is greater than or equal to or is less than or equal to the fifth threshold;
a start time domain position of the eleventh resource is before or after a start time domain position of the twelfth resource;
the eleventh resource includes a periodic ninth time-frequency resource, the twelfth resource includes a periodic tenth time-frequency resource, and a periodicity of the ninth time-frequency resource is greater than or less than a periodicity of the tenth time-frequency resource;
the eleventh resource includes the periodic ninth time-frequency resource, the twelfth resource includes the periodic tenth time-frequency resource, and a time interval between two adjacent ninth time-frequency resources is greater than or less than a time interval between two adjacent tenth time-frequency resources;
a size of the eleventh resource is less than a size of the twelfth resource; and
a proportion of an overlapping resource in the eleventh resource to the eleventh resource is greater than or less than a proportion of an overlapping resource in the twelfth resource to the twelfth resource.

In another possible implementation, the fifth information includes any one or more of the following information:
an indication that the first terminal device senses, selects, or obtains, through contention, the eleventh resource;
an indication that the first terminal device reserves the eleventh resource;
the information about the eleventh resource;
resource type information of the eleventh resource;
time domain information of the eleventh resource;
time domain length information of the eleventh resource;
time domain position information of the eleventh resource;
frequency domain information of the eleventh resource;
frequency domain bandwidth information of the eleventh resource;
frequency domain position information of the eleventh resource;

a periodicity or a time interval of the eleventh resource;
duration of the eleventh resource;
a periodicity or a time interval of a service or data transmitted on the eleventh resource;
a time offset of a time domain position of the eleventh resource relative to a time domain position at which the first terminal device sends the fifth information;
a time offset of a time domain position of the twelfth resource relative to the time domain position at which the first terminal device sends the fifth information;
priority information of the service or the data transmitted on the eleventh resource;
priority information of the eleventh resource;
information about a resource that does not overlap the eleventh resource;
an indication that the first terminal device requests the twelfth resource from the network device;
information about the twelfth resource;
resource type information of the twelfth resource;
time domain information of the twelfth resource;
time domain length information of the twelfth resource;
time domain position information of the twelfth resource;
frequency domain information of the twelfth resource;
frequency domain bandwidth information of the twelfth resource;
frequency domain position information of the twelfth resource;
a periodicity or an interval of the twelfth resource;
information about a time domain offset of the twelfth resource relative to the eleventh resource;
an indication that the first terminal device has resource reservation;
information about a resource reserved by the first terminal device;
an indication that the first terminal device may perform retransmission;
a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the receiving, by a network device, fifth information sent by a first terminal device includes:
receiving, by the network device by using any one of RRC signaling, MAC signaling, and physical layer signaling, the fifth information sent by the terminal device.

An eighth aspect of the embodiments provides a communication processing method. The method includes:
obtaining, by a first terminal device, a transmission configuration, where the transmission configuration includes any one or more of a first dedicated time domain resource configuration, a second dedicated time domain resource configuration, an eighth dedicated time domain resource configuration, a ninth dedicated time domain resource configuration, a tenth dedicated time domain resource configuration, and an eleventh dedicated time domain resource configuration, the first dedicated time domain resource configuration includes a time domain resource configuration dedicated to a first mode for a sidelink, the second dedicated time domain resource configuration includes a time domain resource configuration dedicated to a second mode for the sidelink, the eighth dedicated time domain resource configuration includes a time domain resource configuration dedicated to sidelink sending for the first mode, the ninth dedicated time domain resource configuration includes a time domain resource configuration dedicated to sidelink sending for the second mode, the tenth dedicated time domain resource configuration includes a time domain resource configuration dedicated to sidelink receiving for the first mode, the eleventh dedicated time domain resource configuration includes a time domain resource configuration dedicated to sidelink receiving for the second mode, and the sidelink is a wireless direct communication link between the first terminal device and a second terminal device; and
selecting, by the first terminal device, a thirteenth resource based on the transmission configuration, where the thirteenth resource includes a second-mode resource of the sidelink, and the second-mode resource of the sidelink includes a resource selected, contended for, or sensed by the first terminal device and/or a resource reserved by the first terminal device.

According to the solution in this embodiment, a schedulable resource of the first terminal device and a schedulable resource of a network device may be staggered as much as possible in time domain, so that a probability of overlap between the thirteenth resource selected by the first terminal device and a resource scheduled by the network device for the first terminal device can be avoided or reduced.

In a possible implementation, the transmission configuration further includes any one or more of a third dedicated time domain resource configuration, a fourth dedicated time domain resource configuration, a fifth dedicated time domain resource configuration, a sixth dedicated time domain resource configuration, and a seventh dedicated time domain resource configuration;
the third dedicated time domain resource configuration is used for transmission of the sidelink;
the fourth dedicated time domain resource configuration is used for sending of the sidelink;
the fifth dedicated time domain resource configuration is used for receiving of the sidelink;
the sixth dedicated time domain resource configuration is used for uplink transmission; and
the seventh dedicated time domain resource configuration is used for downlink transmission, where the uplink transmission is uplink transmission for communication between the first terminal device and a network device, and the downlink transmission is downlink transmission for communication between the first terminal device and the network device.

In another possible implementation, the transmission configuration further includes a shared time domain resource configuration, and the shared time domain resource configuration is used for any one or more of the following content:
sidelink transmission for the first mode;
sidelink transmission for the second mode;
sidelink sending for the first mode;
sidelink sending for the second mode;
sidelink receiving for the first mode;
sidelink receiving for the second mode;
transmission of the sidelink;
sending of the sidelink;
receiving of the sidelink;
the uplink transmission; and
the downlink transmission, where the uplink transmission is the uplink transmission for communication between the first terminal device and the network device, and the downlink transmission is the downlink transmission for communication between the first terminal device and the network device.

In another possible implementation, the transmission configuration is specified in a communication protocol, or the obtaining, by a first terminal device, a transmission configuration includes:
  receiving, by the first terminal device, the transmission configuration sent by the network device;
  receiving, by the first terminal device, sixth information sent by the network device, where the sixth information carries information about the transmission configuration; or
  determining, by the first terminal device, the transmission configuration according to a preset rule.

A ninth aspect of the embodiments provides a communication processing method. The method includes:
  obtaining, by a network device, a transmission configuration, where the transmission configuration includes any one or more of a first dedicated time domain resource configuration, a second dedicated time domain resource configuration, an eighth dedicated time domain resource configuration, a ninth dedicated time domain resource configuration, a tenth dedicated time domain resource configuration, and an eleventh dedicated time domain resource configuration, the first dedicated time domain resource configuration includes a time domain resource configuration dedicated to a first mode for a sidelink, the second dedicated time domain resource configuration includes a time domain resource configuration dedicated to a second mode for the sidelink, the eighth dedicated time domain resource configuration includes a time domain resource configuration dedicated to sidelink sending for the first mode, the ninth dedicated time domain resource configuration includes a time domain resource configuration dedicated to sidelink sending for the second mode, the tenth dedicated time domain resource configuration includes a time domain resource configuration dedicated to sidelink receiving for the first mode, the eleventh dedicated time domain resource configuration includes a time domain resource configuration dedicated to sidelink receiving for the second mode, and the sidelink is a wireless direct communication link between a first terminal device and a second terminal device; and
  selecting, by the network device, a fourteenth resource for the first terminal device based on the transmission configuration. A schedulable resource of the network device and a schedulable resource of the first terminal device may be staggered as much as possible in time domain, so that a probability of overlap between the fourteenth resource scheduled by the network device for the first terminal device and a resource selected by the first terminal device can be avoided or reduced.

In a possible implementation, the transmission configuration further includes any one or more of a third dedicated time domain resource configuration, a fourth dedicated time domain resource configuration, a fifth dedicated time domain resource configuration, a sixth dedicated time domain resource configuration, and a seventh dedicated time domain resource configuration;
  the third dedicated time domain resource configuration is used for transmission of the sidelink;
  the fourth dedicated time domain resource configuration is used for sending of the sidelink;
  the fifth dedicated time domain resource configuration is used for receiving of the sidelink;
  the sixth dedicated time domain resource configuration is used for uplink transmission; and
  the seventh dedicated time domain resource configuration is used for downlink transmission, where the uplink transmission is uplink transmission for communication between the first terminal device and a network device, and the downlink transmission is downlink transmission for communication between the first terminal device and the network device.

In another possible implementation, the transmission configuration further includes a shared time domain resource configuration, and the shared time domain resource configuration is used for any one or more of the following content:
  sidelink transmission for the first mode;
  sidelink transmission for the second mode;
  sidelink sending for the first mode;
  sidelink sending for the second mode;
  sidelink receiving for the first mode;
  sidelink receiving for the second mode;
  transmission of the sidelink;
  sending of the sidelink;
  receiving of the sidelink;
  the uplink transmission; and
  the downlink transmission, where the uplink transmission is the uplink transmission for communication between the first terminal device and the network device, and the downlink transmission is the downlink transmission for communication between the first terminal device and the network device.

In another possible implementation, the transmission configuration is specified in a communication protocol, or the obtaining, by a network device, a transmission configuration includes:
  determining, by the network device, the transmission configuration according to a preset rule.

In another possible implementation, the method further includes:
  sending, by the network device, sixth information to the first terminal device, where the sixth information is used to carry information about the transmission configuration.

A tenth aspect of the embodiments provides a communication processing apparatus. The communication processing apparatus includes:
  a processing module, configured to generate first information; and
  a transceiver module, configured to send the first information to a network device, where the first information is used to indicate any one or more of the following content:
  information indicating that the first terminal device releases a first resource;
  the first resource released by the first terminal device; and
  information indicating that the first terminal device requests a second resource from the network device.

In a possible implementation, the first resource and/or the second resource include/includes any one or more of the following content:
  a resource of a sidelink;
  a first-mode resource of the sidelink;
  a configured grant resource of the sidelink;
  a first-type configured grant resource of the sidelink;
  a second-type configured grant resource of the sidelink;
  a dynamic grant resource of the sidelink;
  a resource of an uplink;
  a configured grant resource of the uplink;
  a first-type configured grant resource of the uplink;

a second-type configured grant resource of the uplink;
a dynamic grant resource of the uplink;
a resource of a downlink;
a semi-persistently allocated resource of the downlink; and
a dynamically allocated resource of the downlink, where the sidelink is a wireless direct communication link between the first terminal device and a second terminal device, the uplink and the downlink are links for communication between the first terminal device and the network device, the first-type configured grant resource includes a sidelink resource and/or an uplink resource that are/is provided by the network device by using RRC signaling, the second-type configured grant resource means that the network device provides a resource periodicity for the sidelink and/or a resource periodicity for the uplink by using RRC signaling and then activates the sidelink resource and/or the uplink resource by using a PDCCH or DCI, the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink.

In another possible implementation, the transceiver module is configured to:
send the first information to the network device when a first condition is met, where the first condition includes any one or more of the following content:
the first resource overlaps a third resource in time domain, where the first resource includes any one or more of the following content: the resource of the sidelink, the resource of the uplink, and the resource of the downlink, the third resource includes a second-mode resource of the sidelink, the resource of the uplink includes a resource of an uplink between the first terminal device and the network device, the resource of the downlink includes a resource of a downlink between the first terminal device and the network device, the sidelink is the wireless direct communication link between the first terminal device and the second terminal device, and the second-mode resource of the sidelink includes a sidelink resource selected, contended for, or sensed by the first terminal device;
the first resource periodically overlaps the third resource in time domain;
the first resource overlaps the third resource for N times in time domain, where N is an integer greater than 0;
the first resource is to overlap the third resource in time domain;
the first resource is to periodically overlap the third resource in time domain;
the first resource is to overlap the third resource for N times in time domain;
the third resource overrides the first resource or the first resource overrides the third resource;
the third resource periodically overrides the first resource or the first resource periodically overrides the third resource;
the third resource overrides the first resource for N times or the first resource overrides the third resource for N times;
the third resource is to override the first resource or the first resource is to override the third resource;
the third resource is to periodically override the first resource or the first resource is to periodically override the third resource;
the third resource is to override the first resource for N times or the first resource is to override the third resource for N times;
first duration is greater than or equal to a first threshold, where the first duration is a time difference between a time domain position of the first resource and a moment at which the first terminal device releases the first resource, or is a time difference between a time domain position of the first resource and a time domain position at which the first terminal device sends the first information;
the first resource includes a dedicated resource of the first terminal device;
the first resource includes a periodic time-frequency resource; and
the first terminal device has a resource of the uplink.

In another possible implementation, the first information includes any one or more of the following content:
an indication that the first terminal device releases the first resource, where the first resource includes any one or more of the following content: the resource of the sidelink, the resource of the uplink, and the resource of the downlink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device;
information about the first resource;
resource type information of the first resource;
time domain information of the first resource;
time domain position information of the first resource;
time domain length information of the first resource;
frequency domain information of the first resource;
frequency domain position information of the first resource;
frequency domain bandwidth information of the first resource;
a periodicity or an interval of the first resource;
duration of the first resource;
time information of releasing the first resource by the first terminal device;
information about releasing the $1^{st}$ time-frequency resource of the first resource by the first terminal device;
time domain information of releasing the $1^{st}$ time-frequency resource of the first resource by the first terminal device;
frequency domain information of releasing the $1^{st}$ time-frequency resource of the first resource by the first terminal device;

a time interval between time at which the first terminal device releases the first resource and time at which the first terminal device sends the first information;
an indication that the first terminal device senses, selects, or obtains, through contention, the third resource, where the third resource includes the second-mode resource of the sidelink, and the third resource includes a resource selected, contended for, or sensed by the first terminal device and/or a resource reserved by the first terminal device;
an indication that the first terminal device reserves the third resource;
an indication that the first resource overlaps the third resource in time domain;
information about the third resource;
resource type information of the third resource;
time domain information of the third resource;
time domain length information of the third resource;
time domain position information of the third resource;
frequency domain information of the third resource;
frequency domain bandwidth information of the third resource;
frequency domain position information of the third resource;
a periodicity or a time interval of the third resource;
duration of the third resource;
a periodicity or a time interval of a service or data transmitted on the first resource;
a periodicity or a time interval of a service or data transmitted on the third resource;
a time offset of the time domain position of the first resource relative to the time domain position at which the first terminal device sends the first information;
a time offset of a time domain position of the third resource relative to the time domain position at which the first terminal device sends the first information;
priority information of the service or the data transmitted on the first resource;
priority information of the service or the data transmitted on the third resource;
priority information of the first resource;
priority information of the third resource;
an indication that a priority of the first resource is lower than a priority of the third resource;
information about an overlapping resource in the first resource and the third resource; time domain information of the first resource overlapping the third resource;
information about a time domain offset of the first resource relative to the third resource;
information about a resource that does not overlap the third resource;
an indication that the first terminal device requests the second resource from the network device;
information about the second resource;
resource type information of the second resource;
time domain information of the second resource;
frequency domain information of the second resource;
a periodicity or an interval of the second resource;
information about a time domain offset of the second resource relative to the third resource;
the information about the frequency domain offset of the first resource relative to the third resource;
an indication that the first terminal device has resource reservation;
information about a resource reserved by the first terminal device;

an indication that the first terminal device may perform retransmission;
a quantity of retransmission times or a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the transceiver module is configured to:
send the first information to the network device by using any one of RRC signaling, MAC signaling, and physical layer signaling.

In another possible implementation, the processing module is further configured to:
determine that the priority of the first resource is lower than the priority of the third resource when a second condition is met, where the first resource includes any one or more of the following content: the resource of the sidelink, the resource of the uplink, and the resource of the downlink, the third resource includes the second-mode resource of the sidelink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device; and
determine to release the first resource.

In another possible implementation, the second condition includes any one or more of the following content:
a priority of sidelink transmission for the first mode is lower than a priority of sidelink transmission for the second mode;
a priority of uplink transmission is lower than the priority of the sidelink transmission for the second mode;
a priority of downlink transmission is lower than the priority of the sidelink transmission for the second mode;
a priority of the service or the data transmitted on the first resource is lower than the priority information of the service or the data transmitted on the third resource;
the priority information of the service or the data transmitted on the first resource is greater than or equal to or is less than or equal to a second threshold;
the priority information of the service or the data transmitted on the third resource is greater than or equal to or is less than or equal to a third threshold;
the priority of the first resource is lower than the priority of the third resource;
a measurement result for the first mode of the sidelink is lower than a measurement result for the second mode of the sidelink;
a measurement result of the uplink is lower than the measurement result for the second mode of the sidelink;
a measurement result of the downlink is lower than the measurement result for the second mode of the sidelink;
the measurement result for the first mode of the sidelink is greater than or equal to or is less than or equal to a fourth threshold;
the measurement result of the uplink is greater than or equal to or is less than or equal to the fourth threshold;

the measurement result of the downlink is greater than or equal to or is less than or equal to the fourth threshold;

the measurement result for the second mode of the sidelink is greater than or equal to or is less than or equal to a fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

a measurement result of the first resource is lower than a measurement result of the third resource;

the measurement result of the first resource is greater than or equal to or is less than or equal to the fourth threshold;

the measurement result of the third resource is greater than or equal to or is less than or equal to the fifth threshold;

the first resource includes a resource shared by the first terminal device and another terminal device, where the resource shared by the first terminal device and the another terminal device includes a first-type configured grant resource, and the first-type configured grant includes a sidelink resource and/or an uplink resource provided by the network device by using RRC signaling;

a start time domain position of the first resource is after or before a start time domain position of the third resource;

the first resource includes a periodic first time-frequency resource, the second resource includes a periodic second time-frequency resource, and a periodicity of the first time-frequency resource is greater than or less than a periodicity of the second time-frequency resource;

the first resource includes the periodic first time-frequency resource, the second resource includes the periodic second time-frequency resource, and a time interval between two adjacent first time-frequency resources is greater than or less than a time interval between two adjacent second time-frequency resources;

a size of the first resource is greater than or less than a size of the third resource; and a proportion of an overlapping resource in the first resource to the first resource is greater than or less than a proportion of an overlapping resource in the third resource to the third resource.

In another possible implementation, the transceiver module is further configured to:

send second information to a third terminal device, where the second information is used to indicate that the first terminal device releases the first resource and/or indicate the first resource released by the first terminal device.

An eleventh aspect of the embodiments provides a communication processing apparatus. The communication processing apparatus includes:

a transceiver module, configured to receive first information sent by first terminal device, where the first information is used to indicate any one or more of the following content: information indicating that the first terminal device releases a first resource; the first resource released by the first terminal device; and information indicating that the first terminal device requests a second resource from the network device.

In a possible implementation, the first resource and/or the second resource include/includes any one or more of the following content:

a resource of a sidelink;
a first-mode resource of the sidelink;
a configured grant resource of the sidelink;
a first-type configured grant resource of the sidelink;
a second-type configured grant resource of the sidelink;
a dynamic grant resource of the sidelink;
a resource of an uplink;
a configured grant resource of the uplink;
a first-type configured grant resource of the uplink;
a second-type configured grant resource of the uplink;
a dynamic grant resource of the uplink;
a resource of a downlink;
a semi-persistently allocated resource of the downlink; and
a dynamically allocated resource of the downlink, where the sidelink is a wireless direct communication link between the first terminal device and a second terminal device, the uplink and the downlink are links for communication between the first terminal device and the network device, the first-type configured grant resource includes a sidelink resource and/or an uplink resource that are/is provided by the network device by using RRC signaling, the second-type configured grant resource means that the network device provides a resource periodicity for the sidelink and/or a resource periodicity for the uplink by using RRC signaling and then activates the sidelink resource and/or the uplink resource by using a PDCCH or DCI, the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink.

In another possible implementation, the first information includes any one or more of the following content:

an indication that the first terminal device releases the first resource, where the first resource includes any one or more of the following content: the resource of the sidelink, the resource of the uplink, and the resource of the downlink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device;

information about the first resource;
resource type information of the first resource;
time domain information of the first resource;
time domain position information of the first resource;
time domain length information of the first resource;
frequency domain information of the first resource;
frequency domain position information of the first resource;
frequency domain bandwidth information of the first resource;
a periodicity or an interval of the first resource;
duration of the first resource;
time information of releasing the first resource by the first terminal device;
information about releasing the $1^{st}$ time-frequency resource of the first resource by the first terminal device;
time domain information of releasing the $1^{st}$ time-frequency resource of the first resource by the first terminal device;
frequency domain information of releasing the $1^{st}$ time-frequency resource of the first resource by the first terminal device;
a time interval between time at which the first terminal device releases the first resource and time at which the first terminal device sends the first information;
an indication that the first terminal device senses, selects, or obtains, through contention, the third resource, where the third resource includes the second-mode resource of the sidelink, and the third resource includes a resource selected, contended for, or sensed by the first terminal device and/or a resource reserved by the first terminal device;
an indication that the first terminal device reserves the third resource;
an indication that the first resource overlaps the third resource in time domain;
information about the third resource;
resource type information of the third resource;
time domain information of the third resource;
time domain length information of the third resource;
time domain position information of the third resource;
frequency domain information of the third resource;
frequency domain bandwidth information of the third resource;
frequency domain position information of the third resource;
a periodicity or a time interval of the third resource;
duration of the third resource;
a periodicity or a time interval of a service or data transmitted on the first resource;
a periodicity or a time interval of a service or data transmitted on the third resource;
a time offset of the time domain position of the first resource relative to the time domain position at which the first terminal device sends the first information;
a time offset of a time domain position of the third resource relative to the time domain position at which the first terminal device sends the first information;
priority information of the service or the data transmitted on the first resource;
priority information of the service or the data transmitted on the third resource;
priority information of the first resource;
priority information of the third resource;
an indication that a priority of the first resource is lower than a priority of the third resource;
information about an overlapping resource in the first resource and the third resource; time domain information of the first resource overlapping the third resource;
information about a time domain offset of the first resource relative to the third resource;
information about a resource that does not overlap the third resource;
an indication that the first terminal device requests the second resource from the network device;
information about the second resource;
resource type information of the second resource;
time domain information of the second resource;
frequency domain information of the second resource;
a periodicity or an interval of the second resource;
information about a time domain offset of the second resource relative to the third resource;
the information about the frequency domain offset of the first resource relative to the third resource;
an indication that the first terminal device has resource reservation;
information about a resource reserved by the first terminal device;
an indication that the first terminal device may perform retransmission;
a quantity of retransmission times or a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the transceiver module is configured to:

receive, by using any one of RRC signaling, MAC signaling, and physical layer signaling, the first information sent by the first terminal device.

A twelfth aspect of the embodiments provides a communication processing apparatus. The communication processing apparatus includes:

a processing module, configured to reselect a fourth resource when a third condition is met, where the fourth resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device.

In a possible implementation, the third condition includes any one or more of the following content:

a fifth resource overlaps a sixth resource in time domain, where the fifth resource includes any one or more of the following content: a resource of the sidelink, a resource of an uplink, and a resource of a downlink, the sixth resource includes a second-mode resource of the sidelink, the resource of the uplink includes a resource of an uplink between the first terminal device and a network device, and the resource of the downlink includes a resource of a downlink between the first terminal device and the network device;

the fifth resource periodically overlaps the sixth resource in time domain;

the fifth resource overlaps the sixth resource for N times in time domain, where N is an integer greater than 0;

the fifth resource is to overlap the sixth resource in time domain;

the fifth resource is to periodically overlap the sixth resource in time domain;
the fifth resource is to overlap the sixth resource for N times in time domain;
the sixth resource overrides the fifth resource or the sixth resource overrides the fifth resource;
the sixth resource periodically overrides the fifth resource or the fifth resource periodically overrides the sixth resource;
the sixth resource overrides the fifth resource for N times or the fifth resource overrides the sixth resource for N times;
the sixth resource is to override the fifth resource or the fifth resource is to override the sixth resource;
the sixth resource is to periodically override the fifth resource or the fifth resource is to periodically override the sixth resource;
the sixth resource is to override the fifth resource for N times or the fifth resource is to override the sixth resource for N times;
second duration is greater than a seventh threshold, where the second duration is a time difference between a time domain position of the sixth resource and a moment at which the first terminal device releases the sixth resource; and
the sixth resource includes a periodic time-frequency resource.

In another possible implementation, the communication processing apparatus further includes a transceiver module, where the transceiver module is configured to:
send third information to a third terminal device, where the third information is used to indicate that the first terminal device releases a sixth resource, and the sixth resource includes the second-mode resource of the sidelink.

In another possible implementation, the transceiver module is configured to:
send the third information to the third terminal device by using any one of sidelink control information (SCI), RRC signaling, MAC signaling, and physical layer signaling.

In another possible implementation, the third information includes at least one of the following:
an indication that the first terminal device releases the sixth resource, where the sixth resource includes the second-mode resource of the sidelink;
information about the sixth resource;
resource type information of the sixth resource;
time domain information of the sixth resource;
time domain position information of the sixth resource;
time domain length information of the sixth resource;
frequency domain information of the sixth resource;
frequency domain position information of the sixth resource;
frequency domain bandwidth information of the sixth resource;
a periodicity or an interval of the sixth resource;
duration of the sixth resource;
time information of releasing the sixth resource by the first terminal device;
information about releasing the $1^{st}$ time-frequency resource of the sixth resource by the first terminal device;
time domain information of releasing the $1^{st}$ time-frequency resource of the sixth resource by the first terminal device;
frequency domain information of releasing the $1^{st}$ time-frequency resource of the sixth resource by the first terminal device;
a time interval between time at which the first terminal device releases the sixth resource and a moment at which the first terminal device sends the third information;
an indication that the first terminal device senses, selects, or obtains, through contention, the sixth resource, where the sixth resource includes a resource selected, contended for, or sensed by the first terminal device and/or a reserved resource;
an indication that the first terminal device reserves the sixth resource;
an indication that the fifth resource overlaps the sixth resource in time domain, where the fifth resource includes any one or more of the following content: the resource of the sidelink, the resource of the uplink, and the resource of the downlink, and the sixth resource includes the second-mode resource of the sidelink;
information about the fifth resource;
resource type information of the fifth resource;
time domain information of the fifth resource;
time domain length information of the fifth resource;
time domain position information of the fifth resource;
frequency domain information of the fifth resource;
frequency domain bandwidth information of the fifth resource;
frequency domain position information of the fifth resource;
a periodicity or a time interval of the fifth resource;
duration of the fifth resource;
a periodicity or a time interval of a service transmitted on the fifth resource;
a periodicity or a time interval of a service transmitted on the sixth resource;
a time offset of a time domain position of the fifth resource relative to a time domain position at which the first terminal device sends the third information;
priority information of a service or data transmitted on the fifth resource;
priority information of a service or data transmitted on the sixth resource;
priority information of the fifth resource;
priority information of the sixth resource;
an indication that a priority of the sixth resource is lower than a priority of the fifth resource;
time domain information of the fifth resource overlapping the sixth resource;
information about a time domain offset of the sixth resource relative to the fifth resource;
information about a resource that does not overlap the fifth resource;
an indication that the first terminal device has resource reservation;
information about a resource reserved by the first terminal device;
an indication that the first terminal device may perform retransmission;
a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the processing module is further configured to:
- determine that a priority of the sixth resource is lower than a priority of the fifth resource when a fourth condition is met, where the fifth resource includes any one or more of the following content: the resource of the sidelink, the resource of the uplink, and the resource of the downlink, and the sixth resource includes the second-mode resource of the sidelink; and
- determine to release the sixth resource.

In another possible implementation, the fourth condition includes any one or more of the following content:
- a priority of sidelink transmission for the first mode is higher than a priority of sidelink transmission for the second mode;
- a priority of uplink transmission is higher than the priority of the sidelink transmission for the second mode;
- a priority of downlink transmission is higher than the priority of the sidelink transmission for the second mode;
- a priority of a service or data transmitted on the fifth resource is higher than a priority of a service or data transmitted on the sixth resource;
- priority information of the service or the data transmitted on the fifth resource is greater than or equal to or is less than or equal to a second threshold;
- priority information of the service or the data transmitted on the sixth resource is greater than or equal to or is less than or equal to a third threshold;
- a priority of the fifth resource is higher than a priority of the sixth resource;
- a measurement result for the first mode of the sidelink is higher than a measurement result for the second mode of the sidelink;
- a measurement result of the uplink is higher than the measurement result for the second mode of the sidelink;
- a measurement result of the downlink is higher than the measurement result for the second mode of the sidelink;
- the measurement result for the first mode of the sidelink is greater than or equal to or is less than or equal to a fourth threshold;
- the measurement result of the uplink is greater than or equal to or is less than or equal to the fourth threshold;
- the measurement result of the downlink is greater than or equal to or is less than or equal to the fourth threshold;
- the measurement result for the second mode of the sidelink is greater than or less than a fifth threshold;
- a measurement result of the fifth resource is higher than a measurement result of the sixth resource;
- the measurement result of the fifth resource is greater than or equal to or is less than or equal to the fourth threshold;
- a measurement result of the sixth resource is greater than or equal to or is less than or equal to the fifth threshold;
- priority information of the sidelink transmission for the first mode is greater than or equal to or is less than or equal to a sixth threshold;
- priority information of the uplink transmission is greater than or equal to or is less than or equal to the sixth threshold;
- priority information of the downlink transmission is greater than or equal to or is less than or equal to the sixth threshold;
- priority information of the sidelink transmission for the second mode is greater than or equal to or is less than or equal to the sixth threshold;
- the fifth resource includes a resource shared by the first terminal device and another terminal device, where the resource shared by the first terminal device and the another terminal device includes a first-type configured grant resource and/or a second-mode resource of the sidelink, and the first-type configured grant includes a sidelink resource and/or an uplink resource provided by the network device by using RRC signaling;
- the fifth resource includes a dedicated resource of the first terminal device;
- a start time domain position of the fifth resource is before a start time domain position of the sixth resource;
- the fifth resource includes a periodic third time-frequency resource, the sixth resource includes a periodic fourth time-frequency resource, and a periodicity of the third time-frequency resource is greater than or less than a periodicity of the fourth time-frequency resource;
- the fifth resource includes the periodic third time-frequency resource, the sixth resource includes the periodic fourth time-frequency resource, and a time interval between two adjacent third time-frequency resources is greater than or less than a time interval between two adjacent fourth time-frequency resources;
- a size of the fifth source is greater than or less than a size of the sixth resource; and
- a proportion of an overlapping resource in the sixth resource to the sixth resource is greater than or less than a proportion of an overlapping resource in the fifth resource to the fifth resource.

A thirteenth aspect of the embodiments provides a communication processing apparatus. The communication processing apparatus includes:
- a transceiver module, configured to send fourth information to a third terminal device, where the fourth information is used to indicate that the first terminal device releases a seventh resource and/or indicate the seventh resource released by the first terminal device, the seventh resource includes a resource of a sidelink, and the sidelink is a wireless direct communication link between the first terminal device and a second terminal device.

In a possible implementation, the transceiver module is configured to:
- send the fourth information to the third terminal device when a fifth condition is met, where
- the fifth condition includes at least one of the following conditions:
- the seventh resource overlaps an eighth resource in time domain, where the seventh resource includes a first-mode resource of the sidelink and/or a second-mode resource of the sidelink, the eighth resource includes any one or more of the following content: the first-mode resource of the sidelink, the second-mode resource of the sidelink, a resource of an uplink, and a resource of a downlink, the first-mode resource of the sidelink includes a resource scheduled by a network device for the first terminal device, the second-mode resource of the sidelink includes a resource selected, contended for, or sensed by the first terminal device and/or a resource reserved by the first terminal device, the resource of the uplink includes a resource of an uplink between the first terminal device and the network device, and the resource of the downlink includes a resource of a downlink between the first terminal device and the network device;
the seventh resource periodically overlaps the eighth resource in time domain;
the seventh resource overlaps the eighth resource for N times in time domain, where N is an integer greater than 0;
the seventh resource is to overlap the eighth resource in time domain;
the seventh resource is to periodically overlap the eighth resource in time domain;
the seventh resource is to overlap the eighth resource for N times in time domain;
the seventh resource overrides the eighth resource or the eighth resource overrides the seventh resource;
the eighth resource periodically overrides the seventh resource or the seventh resource periodically overrides the eighth resource;
the eighth resource overrides the seventh resource for N times or the seventh resource overrides the eighth resource for N times;
the eighth resource is to override the seventh resource or the seventh resource is to override the eighth resource;
the eighth resource is to periodically override the seventh resource or the seventh resource is to periodically override the eighth resource;
the eighth resource is to override the seventh resource for N times or the seventh resource is to override the eighth resource for N times;
third duration is greater than an eighth threshold, where the third duration is a time difference between a time domain resource of the seventh resource and a moment at which the first terminal device releases the seventh resource, or is a time difference between a time domain position of the seventh resource and a time domain position at which the first terminal device sends the fourth information to the third terminal device;
the eighth resource includes a dedicated resource of the first terminal device;
the seventh resource includes a periodic time-frequency resource; and
the first terminal device has a resource of the sidelink.

In another possible implementation, the transceiver module is configured to:
send the fourth information to the third terminal device by using any one of SCI, RRC signaling, MAC signaling, and physical layer signaling.

In another possible implementation, the fourth information includes at least one of the following:
an indication that the first terminal device releases the seventh resource;
information about the seventh resource;
resource type information of the seventh resource;
time domain information of the seventh resource;
time domain position information of the seventh resource;
time domain length information of the seventh resource;
frequency domain information of the seventh resource;
frequency domain position information of the seventh resource;
frequency domain bandwidth information of the seventh resource;
a periodicity or an interval of the seventh resource;
duration of the seventh resource;
time information of releasing the seventh resource by the first terminal device;
information about releasing the $1^{st}$ time domain resource of the seventh resource by the first terminal device;
time domain information of releasing the $1^{st}$ time-frequency resource of the first resource by the first terminal device;
frequency domain information of releasing the $1^{st}$ time-frequency resource of the first resource by the first terminal device;
a time interval between time at which the first terminal device releases the seventh resource and a moment at which the first terminal device sends the fourth information;
an indication that the first terminal device senses, selects, or obtains, through contention, the seventh resource;
an indication that the first terminal device reserves the seventh resource;
an indication that the eighth resource overlaps the seventh resource in time domain, where the eighth resource includes any one or more of the following content: the first-mode resource of the sidelink, the second-mode resource of the sidelink, the resource of the uplink, and the resource of the downlink, the resource of the uplink includes the resource of the uplink between the first terminal device and the network device, and the resource of the downlink includes the resource of the downlink between the first terminal device and the network device;
information about the eighth resource;
resource type information of the eighth resource;
time domain information of the eighth resource;
time domain length information of the eighth resource;
time domain position information of the eighth resource;
frequency domain information of the eighth resource;
frequency domain bandwidth information of the eighth resource;
frequency domain position information of the eighth resource;
a periodicity or a time interval of the eighth resource;
duration of the eighth resource;
a periodicity or a time interval of a service transmitted on the seventh resource;
a periodicity or a time interval of a service transmitted on the eighth resource;
a time offset of the time domain position of the seventh resource relative to a time domain position at which the first terminal device sends the fourth information;
a time offset of a time domain position of the eighth resource relative to the time domain position at which the first terminal device sends the fourth information;
priority information of the service transmitted on the seventh resource;
priority information of the service transmitted on the eighth resource;
priority information of the seventh resource;
priority information of the eighth resource;
an indication that a priority of the seventh resource is lower than a priority of the eighth resource;
time domain information of the seventh resource overlapping the eighth resource;
information about a time domain offset of the seventh resource relative to the eighth resource;
information about a resource that does not overlap the eighth resource;
an indication that the first terminal device has resource reservation;
information about a resource reserved by the first terminal device;
an indication that the first terminal device may perform retransmission;

a quantity of retransmission times and/or a maximum quantity of retransmission times of the first terminal device;

a time interval between initial transmission and retransmission of the first terminal device; and frequency domain information of the initial transmission and frequency domain information of the retransmission of the first terminal device.

In another possible implementation, the communication processing apparatus further includes a processing module, where the processing module is configured to:

determine that the priority of the seventh resource is lower than the priority of the eighth resource when a sixth condition is met, where the seventh resource includes the first-mode resource of the sidelink and/or the second-mode resource of the sidelink, the eighth resource includes any one or more of the following content: the resource of the sidelink, the resource of the uplink, and the resource of the downlink, the resource of the uplink includes the resource of the uplink between the first terminal device and the network device, and the resource of the downlink includes the resource of the downlink between the first terminal device and the network device; and determine to release the seventh resource.

In another possible implementation, the sixth condition includes any one or more of the following content:

a priority of sidelink transmission for the first mode is higher than a priority of sidelink transmission for the second mode;

a priority of uplink transmission is higher than the priority of the sidelink transmission for the second mode;

a priority of downlink transmission is higher than the priority of the sidelink transmission for the second mode;

a priority of a service or data transmitted on the eighth resource is higher than a priority of a service or data transmitted on the seventh resource;

priority information of the service or the data transmitted on the seventh resource is greater than or equal to or is less than or equal to a second threshold;

priority information of the service or the data transmitted on the eighth resource is greater than or equal to or is less than or equal to a third threshold;

the priority of the eighth resource is higher than the priority of the seventh resource;

a measurement result for the first mode of the sidelink is higher than a measurement result for the second mode of the sidelink;

a measurement result of the uplink is higher than the measurement result for the second mode of the sidelink;

a measurement result of the downlink is higher than the measurement result for the second mode of the sidelink;

the measurement result for the first mode of the sidelink is greater than or equal to or is less than or equal to a fourth threshold;

the measurement result of the uplink is greater than or equal to or is less than or equal to the fourth threshold;

the measurement result of the downlink is greater than or equal to or is less than or equal to the fourth threshold;

the measurement result for the second mode of the sidelink is greater than or less than a fifth threshold;

a measurement result of the eighth resource is higher than a measurement result of the seventh resource;

a measurement result of the seventh resource is greater than or equal to or is less than or equal to the fourth threshold;

a measurement result of the eighth resource is greater than or equal to or is less than or equal to the fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

the eighth resource includes a resource shared by the first terminal device and another terminal device, where the resource shared by the first terminal device and the another terminal device includes a first-type configured grant resource and/or the second-mode resource of the sidelink, and the first-type configured grant includes a sidelink resource and/or an uplink resource provided by the network device by using RRC signaling;

a start time domain position of the eighth resource is before or after a start time domain position of the seventh resource;

the eighth resource includes a periodic fifth time-frequency resource, the seventh resource includes a periodic sixth time-frequency resource, and a periodicity of the fifth time-frequency resource is greater than or less than a periodicity of the sixth time-frequency resource;

the eighth resource includes the periodic fifth time-frequency resource, the seventh resource includes the periodic sixth time-frequency resource, and a time interval between two adjacent fifth time-frequency resources is greater than or less than a time interval between two adjacent sixth time-frequency resources;

a size of the eighth resource is less than or greater than a size of the seventh resource;

a proportion of an overlapping resource in the seventh resource to the seventh resource is greater than or less than a proportion of an overlapping resource in the eighth resource to the eighth resource.

A fourteenth aspect of the embodiments provides a communication processing apparatus. The communication processing apparatus includes:

a processing module, configured to: determine a ninth resource, where the ninth resource is used for any one or more of the following content: sidelink transmission, uplink transmission, and downlink transmission, a sidelink is a wireless direct communication link between the first terminal device and a second terminal device, the uplink transmission is transmission of an uplink between the first terminal device and a network device, and the downlink transmission is transmission of a downlink between the first terminal device and the network device; and select a tenth resource based on the ninth resource, where the tenth resource includes a second-mode resource of the sidelink, and the second-mode resource of the sidelink includes a resource selected, contended for, or sensed by the first terminal device and/or a resource reserved by the first terminal device.

In a possible implementation, the tenth resource does not include any one of the following content:
   the ninth resource;
   all time-frequency resources in time domain in which the ninth resource is located;
   a subset of the ninth resource; and
   all time-frequency resources in time domain in which the subset of the ninth resource is located.

In another possible implementation, the subset of the ninth resource includes a resource whose priority is higher than that of the tenth resource.

In another possible implementation, the processing module is configured to:
   determine that a priority of the ninth resource is higher than the priority of the tenth resource when a seventh condition is met; and
   select the tenth resource when excluding the ninth resource or any time domain resource in time domain in which the ninth resource is located.

In another possible implementation, the seventh condition includes any one or more of the following content:
   a priority of sidelink transmission for the first mode is higher than a priority of sidelink transmission for the second mode;
   a priority of the uplink transmission is higher than the priority of the sidelink transmission for the second mode;
   a priority of the downlink transmission is higher than the priority of the sidelink transmission for the second mode;
   a priority of a service or data transmitted on the ninth resource is higher than a priority of a service or data transmitted on the tenth resource;
   priority information of the service or the data transmitted on the ninth resource is greater than or equal to or is less than or equal to a second threshold;
   priority information of the service or the data transmitted on the tenth resource is greater than or equal to or is less than or equal to a third threshold;
   the priority of the ninth resource is higher than the priority of the tenth resource;
   a measurement result for the first mode of the sidelink is higher than a measurement result for the second mode of the sidelink;
   a measurement result of the uplink is higher than the measurement result for the second mode of the sidelink;
   a measurement result of the downlink is higher than the measurement result for the second mode of the sidelink;
   the measurement result for the first mode of the sidelink is greater than or equal to or is less than or equal to a fourth threshold;
   the measurement result of the uplink is greater than or equal to or is less than or equal to the fourth threshold;
   the measurement result of the downlink is greater than or equal to or is less than or equal to the fourth threshold;
   the measurement result for the second mode of the sidelink is greater than or equal to or is less than or equal to a fifth threshold;
   priority information of the sidelink transmission for the first mode is greater than or equal to or is less than or equal to a sixth threshold;
   priority information of the uplink transmission is greater than or equal to or is less than or equal to the sixth threshold;
   priority information of the downlink transmission is greater than or equal to or is less than or equal to the sixth threshold;
   priority information of the sidelink transmission for the second mode is greater than or equal to or is less than or equal to the sixth threshold;
   a measurement result of the ninth resource is higher than a measurement result of the tenth resource;
   the measurement result of the ninth resource is greater than or equal to or is less than or equal to the fourth threshold;
   the measurement result of the tenth resource is greater than or equal to or is less than or equal to the fifth threshold;
   the ninth resource includes a resource shared by the first terminal device and another terminal device, where the resource shared by the first terminal device and the another terminal device includes a first-type configured grant resource and/or the second-mode resource of the sidelink, and the first-type configured grant includes a sidelink resource and/or an uplink resource provided by the network device by using RRC signaling;
   the ninth resource includes a dedicated resource of the first terminal device;
   a start time domain position of the ninth resource is before or after a start time domain position of the tenth resource;
   the ninth resource includes a periodic seventh time-frequency resource, the tenth resource includes a periodic eighth time-frequency resource, and a periodicity of the seventh time-frequency resource is greater than or less than a periodicity of the eighth time-frequency resource;
   the ninth resource includes the periodic seventh time-frequency resource, the tenth resource includes the periodic eighth time-frequency resource, and a time interval between two adjacent seventh time-frequency resources is greater than or less than a time interval between two adjacent eighth time-frequency resources;
   a size of the ninth resource is greater than a size of the tenth resource; and
   a proportion of an overlapping resource in the ninth resource to the ninth resource is greater than or less than a proportion of an overlapping resource in the tenth resource to the tenth resource.

In another possible implementation, the ninth resource includes any one or more of the following content:
   a resource of the sidelink;
   a first-mode resource of the sidelink;
   a configured grant resource of the sidelink;
   a first-type configured grant resource of the sidelink;
   a second-type configured grant resource of the sidelink;
   a dynamic grant resource of the sidelink;
   a resource of the uplink;
   a configured grant resource of the uplink;
   a first-type configured grant resource of the uplink;
   a second-type configured grant resource of the uplink;
   a dynamic grant resource of the uplink;
   a resource of the downlink;
   a semi-persistently allocated resource of the downlink; and
   a dynamically allocated resource of the downlink, where the first-type configured grant includes a sidelink resource and/or an uplink resource that are/is provided by the network device by using RRC signaling, the second-type configured grant means that the network device provides a resource periodicity for the sidelink and/or a resource periodicity for the uplink by using RRC signaling and then activates the sidelink resource and/or the uplink resource by using a PDCCH or DCI, the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink; and the tenth resource includes a resource selected, contended for, or sensed by the first terminal device and/or a resource reserved by the first terminal device.

In another possible implementation, the processing module is configured to:

receive, before a sensing window ends, scheduling information sent by the network device, where a resource scheduled by the network device by using the scheduling information exists in a selection window; and determine, based on the scheduling information, the ninth resource scheduled by the network device for the first terminal device.

A fifteenth aspect of the embodiments provides a communication processing apparatus. The communication processing apparatus includes:

a transceiver module, configured to send fifth information to a network device, where the fifth information is used to indicate information about an eleventh resource and/or indicate that the first terminal device requests a twelfth resource from the network device, the eleventh resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device.

In a possible implementation, the transceiver module is configured to:

send the fifth information to the network device when a ninth condition is met, where the ninth condition includes any one or more of the following content:
the first terminal device is in a connected state;
the first terminal device determines that a priority of the eleventh resource is higher than a priority of the twelfth resource, where the twelfth resource includes any one or more of the following content: a first-mode resource of the sidelink, a resource of an uplink, and a resource of a downlink, the first-mode resource of the sidelink includes a resource scheduled by the network device for the first terminal device, the resource of the uplink includes a resource of an uplink between the first terminal device and the network device, and the resource of the downlink includes a resource of a downlink between the first terminal device and the network device;
the first terminal device sends a resource request message to the network device, where the resource request message is used to request the twelfth resource from the network device;
the first terminal device senses, selects, or obtains, through contention, the eleventh resource and/or reserves the eleventh resource; and
the first terminal device has a resource of the uplink.

In another possible implementation, the fifth information includes any one or more of the following information:
an indication that the first terminal device senses, selects, or obtains, through contention, the eleventh resource;
an indication that the first terminal device reserves the eleventh resource;
the information about the eleventh resource;
resource type information of the eleventh resource;
time domain information of the eleventh resource;
time domain length information of the eleventh resource;
time domain position information of the eleventh resource;
frequency domain information of the eleventh resource;
frequency domain bandwidth information of the eleventh resource;
frequency domain position information of the eleventh resource;
a periodicity or a time interval of the eleventh resource;
duration of the eleventh resource;
a periodicity or a time interval of a service or data transmitted on the eleventh resource;
a time offset of a time domain position of the eleventh resource relative to a time domain position at which the first terminal device sends the fifth information;
a time offset of a time domain position of the twelfth resource relative to the time domain position at which the first terminal device sends the fifth information;
priority information of the service or the data transmitted on the eleventh resource;
priority information of the eleventh resource;
information about a resource that does not overlap the eleventh resource;
an indication that the first terminal device requests the twelfth resource from the network device;
information about the twelfth resource;
resource type information of the twelfth resource;
time domain information of the twelfth resource;
time domain length information of the twelfth resource;
time domain position information of the twelfth resource;
frequency domain information of the twelfth resource;
frequency domain bandwidth information of the twelfth resource;
frequency domain position information of the twelfth resource;
a periodicity or an interval of the twelfth resource;
information about a time domain offset of the twelfth resource relative to the eleventh resource;
an indication that the first terminal device has resource reservation;
information about a resource reserved by the first terminal device;
an indication that the first terminal device may perform retransmission;
a maximum quantity of retransmission times of the first terminal device;
a time interval between initial transmission and retransmission of the first terminal device; and frequency domain information of the initial transmission and frequency domain information of the retransmission of the first terminal device.

In another possible implementation, the transceiver module is configured to:
send the fifth information to the network device by using RRC signaling, MAC signaling, and physical layer signaling.

In another possible implementation, the transceiver module is configured to:
determine that the priority of the eleventh resource is higher than the priority of the twelfth resource when a tenth condition is met; and
send the fifth information to the network device, where the ninth condition includes any one or more of the following content:
a priority of sidelink transmission for the first mode is lower than a priority of sidelink transmission for the second mode;
a priority of uplink transmission is lower than the priority of the sidelink transmission for the second mode;
a priority of downlink transmission is lower than the priority of the sidelink transmission for the second mode;
a priority of the service or the data transmitted on the eleventh resource is higher than a priority of the service or the data transmitted on the twelfth resource;
priority information of the service or the data transmitted on the eleventh resource is greater than or less than a second threshold;
priority information of the service or the data transmitted on the twelfth resource is greater than or less than a third threshold;
the priority of the eleventh resource is higher than the priority of the sixth resource;
a measurement result for the second mode of the sidelink is higher than a measurement result for the first mode of the sidelink;
a measurement result of the uplink is lower than the measurement result for the second mode of the sidelink;
a measurement result of the downlink is lower than the measurement result for the second mode of the sidelink;
the measurement result for the second mode of the sidelink is greater than or equal to or is less than or equal to a fourth threshold;
the measurement result of the uplink is greater than or equal to or is less than or equal to the fourth threshold;
the measurement result of the downlink is greater than or equal to or is less than or equal to the fourth threshold;
the measurement result for the first mode of the sidelink is greater than or less than a fifth threshold;
priority information of the sidelink transmission for the first mode is greater than or equal to or is less than or equal to a sixth threshold;
priority information of the uplink transmission is greater than or equal to or is less than or equal to the sixth threshold;
priority information of the downlink transmission is greater than or equal to or is less than or equal to the sixth threshold;
priority information of the sidelink transmission for the second mode is greater than or equal to or is less than or equal to the sixth threshold;
a measurement result of the eleventh resource is higher than a measurement result of the twelfth resource;
the measurement result of the eleventh resource is greater than or equal to or is less than or equal to the fourth threshold;
the measurement result of the eleventh resource is greater than or equal to or is less than or equal to the fifth threshold;
a start time domain position of the eleventh resource is before or after a start time domain position of the twelfth resource;
the eleventh resource includes a periodic ninth time-frequency resource, the twelfth resource includes a periodic tenth time-frequency resource, and a periodicity of the ninth time-frequency resource is greater than or less than a periodicity of the tenth time-frequency resource;
the eleventh resource includes the periodic ninth time-frequency resource, the twelfth resource includes the periodic tenth time-frequency resource, and a time interval between two adjacent ninth time-frequency resources is greater than or less than a time interval between two adjacent tenth time-frequency resources;
a size of the eleventh resource is less than a size of the twelfth resource; and
a proportion of an overlapping resource in the eleventh resource to the eleventh resource is greater than or less than a proportion of an overlapping resource in the twelfth resource to the twelfth resource.

A sixteenth aspect of the embodiments provides a communication processing apparatus. The communication processing apparatus includes:
a transceiver module, configured to receive fifth information sent by a first terminal device, where the fifth information is used to indicate information about an eleventh resource and/or indicate that the first terminal device requests a twelfth resource from the network device, the eleventh resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device.

In a possible implementation, the communication processing apparatus further includes a processing module, where the processing module is configured to:
schedule the twelfth resource for the first terminal device based on the fifth information, where the twelfth resource includes any one or more of the following content: a first-mode resource of the sidelink, a resource of an uplink, and a resource of a downlink, the resource of the uplink includes a resource of an uplink between the first terminal device and the network device, and the resource of the downlink includes a resource of a downlink between the first terminal device and the network device.

In another possible implementation, the twelfth resource does not include any one of the following content:
the eleventh resource;
all time-frequency resources in time domain in which the eleventh resource is located;
a subset of the eleventh resource; and
all time-frequency resources in time domain in which the subset of the eleventh resource is located.

In another possible implementation, the subset of the eleventh resource includes a resource whose priority is higher than that of the twelfth resource.

In another possible implementation, the processing module is configured to:
- determine that a priority of the eleventh resource is higher than the priority of the twelfth resource when an eighth condition is met; and
- schedule the twelfth resource for the first terminal device when excluding the eleventh resource or any time-frequency resource in time domain in which the eleventh resource is located.

In another possible implementation, the eighth condition includes any one or more of the following content:
- a priority of sidelink transmission for the first mode is lower than a priority of sidelink transmission for the second mode;
- a priority of uplink transmission is lower than the priority of the sidelink transmission for the second mode;
- a priority of downlink transmission is lower than the priority of the sidelink transmission for the second mode;
- a priority of a service or data transmitted on the eleventh resource is higher than a priority of a service or data transmitted on the twelfth resource;
- priority information of the service or the data transmitted on the eleventh resource is greater than or less than a second threshold;
- priority information of the service or the data transmitted on the twelfth resource is greater than or less than a third threshold;
- the priority of the eleventh resource is higher than the priority of the sixth resource;
- a measurement result for the second mode of the sidelink is higher than a measurement result for the first mode of the sidelink;
- a measurement result of the uplink is lower than the measurement result for the second mode of the sidelink;
- a measurement result of the downlink is lower than the measurement result for the second mode of the sidelink;
- the measurement result for the second mode of the sidelink is greater than or equal to or is less than or equal to a fourth threshold;
- the measurement result of the uplink is greater than or equal to or is less than or equal to the fourth threshold;
- the measurement result of the downlink is greater than or equal to or is less than or equal to the fourth threshold;
- the measurement result for the first mode of the sidelink is greater than or less than a fifth threshold;
- priority information of the sidelink transmission for the first mode is greater than or equal to or is less than or equal to a sixth threshold;
- priority information of the uplink transmission is greater than or equal to or is less than or equal to the sixth threshold;
- priority information of the downlink transmission is greater than or equal to or is less than or equal to the sixth threshold;
- priority information of the sidelink transmission for the second mode is greater than or equal to or is less than or equal to the sixth threshold;
- a measurement result of the eleventh resource is higher than a measurement result of the twelfth resource;
- the measurement result of the eleventh resource is greater than or equal to or is less than or equal to the fourth threshold;
- the measurement result of the eleventh resource is greater than or equal to or is less than or equal to the fifth threshold;
- a start time domain position of the eleventh resource is before or after a start time domain position of the twelfth resource;
- the eleventh resource includes a periodic ninth time-frequency resource, the twelfth resource includes a periodic tenth time-frequency resource, and a periodicity of the ninth time-frequency resource is greater than or less than a periodicity of the tenth time-frequency resource;
- the eleventh resource includes the periodic ninth time-frequency resource, the twelfth resource includes the periodic tenth time-frequency resource, and a time interval between two adjacent ninth time-frequency resources is greater than or less than a time interval between two adjacent tenth time-frequency resources;
- a size of the eleventh resource is less than a size of the twelfth resource; and
- a proportion of an overlapping resource in the eleventh resource to the eleventh resource is greater than or less than a proportion of an overlapping resource in the twelfth resource to the twelfth resource.

In another possible implementation, the fifth information includes any one or more of the following information:
- an indication that the first terminal device senses, selects, or obtains, through contention, the eleventh resource;
- an indication that the first terminal device reserves the eleventh resource;
- the information about the eleventh resource;
- resource type information of the eleventh resource;
- time domain information of the eleventh resource;
- time domain length information of the eleventh resource;
- time domain position information of the eleventh resource;
- frequency domain information of the eleventh resource;
- frequency domain bandwidth information of the eleventh resource;
- frequency domain position information of the eleventh resource;
- a periodicity or a time interval of the eleventh resource;
- duration of the eleventh resource;
- a periodicity or a time interval of a service or data transmitted on the eleventh resource;
- a time offset of a time domain position of the eleventh resource relative to a time domain position at which the first terminal device sends the fifth information;
- a time offset of a time domain position of the twelfth resource relative to the time domain position at which the first terminal device sends the fifth information;
- priority information of the service or the data transmitted on the eleventh resource;
- priority information of the eleventh resource;
- information about a resource that does not overlap the eleventh resource;
- an indication that the first terminal device requests the twelfth resource from the network device;
- information about the twelfth resource;
- resource type information of the twelfth resource;
- time domain information of the twelfth resource;
- time domain length information of the twelfth resource;
- time domain position information of the twelfth resource;
- frequency domain information of the twelfth resource;
- frequency domain bandwidth information of the twelfth resource;

frequency domain position information of the twelfth resource;
a periodicity or an interval of the twelfth resource;
information about a time domain offset of the twelfth resource relative to the eleventh resource;
an indication that the first terminal device has resource reservation;
information about a resource reserved by the first terminal device;
an indication that the first terminal device may perform retransmission;
a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the receiving, by a network device, fifth information sent by a first terminal device includes:
receiving, by the network device by using any one of RRC signaling, MAC signaling, and physical layer signaling, the fifth information sent by the terminal device.

In another possible implementation, the transceiver module is configured to:
receive, by using any one of RRC signaling, MAC signaling, and physical layer signaling, the fifth information sent by the first terminal device.

A seventeenth aspect of the embodiments provides a communication processing apparatus. The communication processing apparatus includes:
a processing module, configured to: obtain a transmission configuration, where the transmission configuration includes any one or more of a first dedicated time domain resource configuration, a second dedicated time domain resource configuration, an eighth dedicated time domain resource configuration, a ninth dedicated time domain resource configuration, a tenth dedicated time domain resource configuration, and an eleventh dedicated time domain resource configuration, the first dedicated time domain resource configuration includes a time domain resource configuration dedicated to a first mode for a sidelink, the second dedicated time domain resource configuration includes a time domain resource configuration dedicated to a second mode for the sidelink, the eighth dedicated time domain resource configuration includes a time domain resource configuration dedicated to sidelink sending for the first mode, the ninth dedicated time domain resource configuration includes a time domain resource configuration dedicated to sidelink sending for the second mode, the tenth dedicated time domain resource configuration includes a time domain resource configuration dedicated to sidelink receiving for the first mode, the eleventh dedicated time domain resource configuration includes a time domain resource configuration dedicated to sidelink receiving for the second mode, and the sidelink is a wireless direct communication link between the first terminal device and a second terminal device; and
select a thirteenth resource based on the transmission configuration, where the thirteenth resource includes a second-mode resource of the sidelink, and the second-mode resource of the sidelink includes a resource selected, contended for, or sensed by the first terminal device and/or a resource reserved by the first terminal device.

In a possible implementation, the transmission configuration further includes any one or more of a third dedicated time domain resource configuration, a fourth dedicated time domain resource configuration, a fifth dedicated time domain resource configuration, a sixth dedicated time domain resource configuration, and a seventh dedicated time domain resource configuration;
the third dedicated time domain resource configuration is used for transmission of the sidelink;
the fourth dedicated time domain resource configuration is used for sending of the sidelink;
the fifth dedicated time domain resource configuration is used for receiving of the sidelink;
the sixth dedicated time domain resource configuration is used for uplink transmission; and
the seventh dedicated time domain resource configuration is used for downlink transmission, where the uplink transmission is uplink transmission for communication between the first terminal device and a network device, and the downlink transmission is downlink transmission for communication between the first terminal device and the network device.

In another possible implementation, the transmission configuration further includes a shared time domain resource configuration, and the shared time domain resource configuration is used for any one or more of the following content:
sidelink transmission for the first mode;
sidelink transmission for the second mode;
sidelink sending for the first mode;
sidelink sending for the second mode;
sidelink receiving for the first mode;
sidelink receiving for the second mode;
transmission of the sidelink;
sending of the sidelink;
receiving of the sidelink;
the uplink transmission; and
the downlink transmission, where the uplink transmission is the uplink transmission for communication between the first terminal device and the network device, and the downlink transmission is the downlink transmission for communication between the first terminal device and the network device.

In another possible implementation, the transmission configuration is specified in a communication protocol, or the processing module is configured to:
receive the transmission configuration sent by the network device;
receive sixth information sent by the network device, where the sixth information carries information about the transmission configuration; or
determine the transmission configuration according to a preset rule.

An eighteenth aspect of the embodiments provides a communication processing apparatus. The communication processing apparatus includes:
a processing module, configured to: obtain a transmission configuration, where the transmission configuration includes any one or more of a first dedicated time domain resource configuration, a second dedicated time domain resource configuration, an eighth dedicated time domain resource configuration, a ninth dedicated time domain resource configuration, a tenth dedicated time domain resource configuration, and an eleventh dedicated time domain resource configuration, the first dedicated time domain resource configuration includes a time domain resource configuration dedicated to a first mode for a sidelink, the second dedicated time domain resource configuration includes a time domain resource configuration dedicated to a second mode for the sidelink, the eighth dedicated time domain resource configuration includes a time domain resource configuration dedicated to sidelink sending for the first mode, the ninth dedicated time domain resource configuration includes a time domain resource configuration dedicated to sidelink sending for the second mode, the tenth dedicated time domain resource configuration includes a time domain resource configuration dedicated to sidelink receiving for the first mode, the eleventh dedicated time domain resource configuration includes a time domain resource configuration dedicated to sidelink receiving for the second mode, and the sidelink is a wireless direct communication link between a first terminal device and a second terminal device; and select a fourteenth resource for the first terminal device based on the transmission configuration.

In a possible implementation, the transmission configuration further includes any one or more of a third dedicated time domain resource configuration, a fourth dedicated time domain resource configuration, a fifth dedicated time domain resource configuration, a sixth dedicated time domain resource configuration, and a seventh dedicated time domain resource configuration;
- the third dedicated time domain resource configuration is used for transmission of the sidelink;
- the fourth dedicated time domain resource configuration is used for sending of the sidelink;
- the fifth dedicated time domain resource configuration is used for receiving of the sidelink;
- the sixth dedicated time domain resource configuration is used for uplink transmission; and
- the seventh dedicated time domain resource configuration is used for downlink transmission, where the uplink transmission is uplink transmission for communication between the first terminal device and a network device, and the downlink transmission is downlink transmission for communication between the first terminal device and the network device.

In another possible implementation, the transmission configuration further includes a shared time domain resource configuration, and the shared time domain resource configuration is used for any one or more of the following content:
- sidelink transmission for the first mode;
- sidelink transmission for the second mode;
- sidelink sending for the first mode;
- sidelink sending for the second mode;
- sidelink receiving for the first mode;
- sidelink receiving for the second mode;
- transmission of the sidelink;
- sending of the sidelink;
- receiving of the sidelink;
- the uplink transmission; and
- the downlink transmission, where the uplink transmission is the uplink transmission for communication between the first terminal device and the network device, and the downlink transmission is the downlink transmission for communication between the first terminal device and the network device.

In another possible implementation, the transmission configuration is specified in a communication protocol, or the processing module is configured to:
- determine the transmission configuration according to a preset rule.

In another possible implementation, the communication processing apparatus further includes a transceiver module, where the transceiver module is configured to:
- send sixth information to the first terminal device, where the sixth information is used to carry information about the transmission configuration.

A nineteenth aspect of the embodiments provides a communication processing apparatus. The communication processing apparatus includes a processor and a memory. The memory is configured to store computer instructions. When the processor executes the instructions, the communication processing apparatus is enabled to perform the communication processing method according to any one of the first aspect, the third aspect, the fourth aspect, the fifth aspect, the sixth aspect, and the eighth aspect. The communication processing apparatus may be the first terminal device according to any one of the first aspect, the third aspect, the fourth aspect, the fifth aspect, the sixth aspect, and the eighth aspect, for example, a vehicle-mounted communication apparatus, an apparatus including the first terminal device, for example, various types of vehicles, or an apparatus or a component included in the first terminal device, for example, a system chip.

A twentieth aspect of the embodiments provides a communication processing apparatus. The communication processing apparatus includes a processor and a memory. The memory is configured to store computer instructions. When the processor executes the instructions, the communication processing apparatus is enabled to perform the communication processing method according to any one of the second aspect, the seventh aspect, and the ninth aspect. The communication apparatus may be the network device according to any one of the second aspect, the seventh aspect, and the ninth aspect, for example, a base station, an apparatus including the network device, or an apparatus or a component included in the network device, for example, a system chip.

A twenty-first aspect of the embodiments provides a chip system. The chip system includes a processor and an input/output port. The processor is configured to implement a processing function in the communication processing method according to any one of the first aspect, the third aspect, the fourth aspect, the fifth aspect, the sixth aspect, and the eighth aspect. The input/output port is configured to implement a transceiver function in the communication processing method according to any one of the first aspect, the third aspect, the fourth aspect, the fifth aspect, the sixth aspect, and the eighth aspect.

In a possible design, the chip system further includes a memory. The memory is configured to store program instructions and data that are used to implement the functions in the communication processing method according to the first aspect.

The chip system may include a chip, or may include a chip and another discrete component.

A twenty-second aspect of the embodiments provides a chip system. The chip system includes a processor and an input/output port. The processor is configured to implement a processing function in the communication processing method according to any one of the second aspect, the seventh aspect, and the ninth aspect. The input/output port is configured to implement a transceiver function in the communication processing method according to any one of the second aspect, the seventh aspect, and the ninth aspect.

In a possible design, the chip system further includes a memory. The memory is configured to store program instructions and data that are used to implement the functions in the communication processing method according to the second aspect.

The chip system may include a chip or may include a chip and another discrete component.

A twenty-third aspect of the embodiments provides a communication processing system. The communication processing system includes the first terminal device according to any one of the first aspect, the third aspect, the fourth aspect, the fifth aspect, the sixth aspect, and the eighth aspect and the second terminal device according to any one of the second aspect, the seventh aspect, and the ninth aspect.

A twenty-fourth aspect of the embodiments provides a computer-readable storage medium. The computer-readable storage medium stores computer instructions. When the computer instructions are run on a computer, the computer is enabled to perform the communication processing method according to any one of the possible implementations of the first aspect to the ninth aspect.

A twenty-fifth aspect of the embodiments provides a computer program product. The computer program product includes a computer program or instructions. When the computer program or the instructions is/are run on a computer, the computer is enabled to perform the communication processing method according to any one of the possible implementations of the first aspect to the ninth aspect.

The first terminal device may generate the first information. Then, the first terminal device sends the first information to the network device, where the first information is used to indicate the first resource released by the first terminal device and/or indicate that the first terminal device requests the second resource from the network device. Therefore, when the first terminal device determines to release the first resource, the first terminal device may send the first information to the network device, so that the network device determines the first resource released by the first terminal device. In this way, the network device may allocate the first resource to another terminal device, to improve resource utilization.

BRIEF DESCRIPTION OF DRAWINGS

FIG. 2C is a schematic diagram of another scenario of a communication processing method according to an embodiment;

FIG. 2D is a schematic diagram of another scenario of a communication processing method according to an embodiment;

FIG. 2E is a schematic diagram of another scenario of a communication processing method according to an embodiment;

FIG. 2F is a schematic diagram of a sending format of a MAC CE according to an embodiment;

FIG. 2G is a schematic diagram of another scenario of a communication processing method according to an embodiment;

FIG. 7B is a schematic diagram of another scenario of a communication processing method according to an embodiment;

DETAILED DESCRIPTION OF THE EMBODIMENTS

Figure 1A:
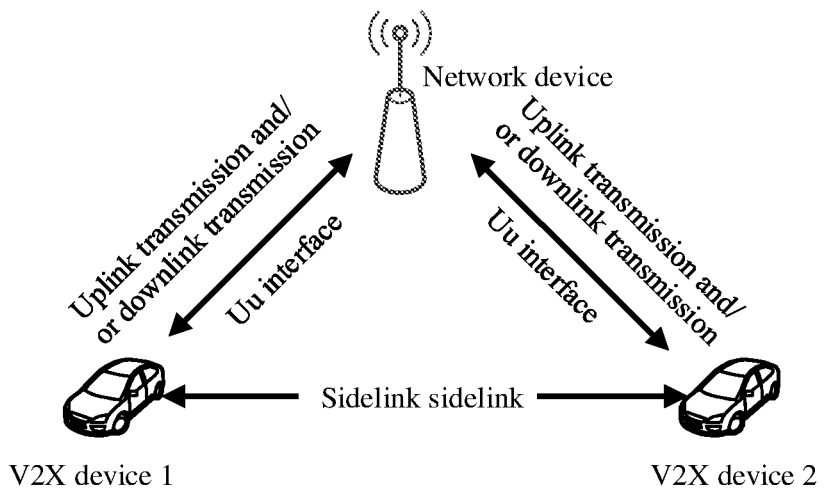
FIG. 1A is a schematic diagram of a system architecture according to an embodiment.

Embodiments provide a communication processing method, a communication processing apparatus, and a system, to improve resource utilization.

The solutions in the embodiments may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, a new radio (NR) system, or a future communication system (for example, a 6G communication system or a 7G communication system).

A terminal device in the embodiments may be user equipment, an access terminal, a subscriber unit, a subscriber station, a mobile station, a mobile station, a remote station, a remote terminal, a mobile device, a user terminal, a terminal, a wireless communication apparatus, a user agent, or a user apparatus. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), an in-vehicle communication device, an in-vehicle communication chip, or the like.

A network device in the embodiments may be a device configured to communicate with the terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like.

In the embodiments, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). An operating system may be any one or more of computer operating systems implementing service processing through a process, for example, a Linux operating system, a Unix operating system, an Android operating system, an iOS operating system, and a Windows operating system. The application layer includes applications such as a browser, an address book, word processing software, and instant messaging software. In addition, a structure of an execution body of a method provided in the embodiments is not limited provided that a program that records code for the method can be run to perform communication. For example, the execution body of the method provided in the embodiments may be the terminal device, the network device, or a functional module that is in the terminal device or the network device and that can invoke and execute the program.

In addition, aspects or features may be implemented as a method, an apparatus, or a product that uses standard programming and/or engineering technologies. The term "product" overrides a computer program that can be accessed from any computer-readable device, carrier or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described may indicate one or more devices and/or other machine-readable media that are configured to store information. The term "machine-readable media" may include but is not limited to radio channels and various other media that can store, include, and/or carry instructions and/or data.

Currently, V2X is a key technology of intelligent transportation systems and is considered as one of the fields with the most industrial potential and the clearest market demand in an internet of things system. V2X is characterized by wide application space, great industrial potential, and strong social benefits, and has great significance for promoting innovation and development of car and information communication industries, building new modes and new business forms of car and transportation services, promoting innovation and application of technologies such as self driving, assisted driving, smart driving, connected driving, intelligent connected driving, autonomous driving, and car sharing, and improving transportation efficiency and a level of safety. The internet of vehicles generally refers to a communication network providing vehicle information by using a sensor, a vehicle-mounted terminal device, or the like that is loaded on a vehicle, to implement vehicle to vehicle (V2V), vehicle to infrastructure (V2I), vehicle to network (V2N), and vehicle to pedestrian (V2P) communication.

FIG. 1A is a schematic diagram of a system architecture according to an embodiment. In FIG. 1A, in a V2X scenario, a communication link for performing direct communication between terminal devices may be referred to as a sidelink or a sidelink (SL). A wireless communication link between a terminal device and a network device may be referred to as an uplink (UL) or a downlink (DL). Because a UL or DL interface may be referred to as a Uu interface, the UL or the DL may be referred to as a Uu interface link.

An SL communication resource for wireless direct communication between the terminal devices may be scheduled by the network device. For example, the terminal device falls within a coverage area of the network device, a wireless direct communication process between the terminal devices may be controlled by the network device, and a terminal device that serves as a data transmit end may send, on the SL communication resource configured by the network device, a control signal and a data signal to a terminal device that serves as a data receive end. This mode in which a base station schedules an SL transmission resource may be referred to as a first mode. Optionally, the first mode may be a mode1 resource configuration mode or a mode3 resource configuration mode specified in a current standard formulated by the 3rd generation partnership project (3GPP).

For example, scheduling the SL transmission resource by the base station may include two different types of transmission resources: a dynamic grant and a configured grant. The dynamic grant means that the network device needs to separately allocate a resource for each time of data transmission of the terminal device, which is characterized by "one-time allocation, one-time use". For example, the network device may dynamically allocate a sidelink transmission resource to the terminal device by using downlink control information (downlink control information, DCI). The DCI may be carried on a physical downlink control channel. The configured grant may be that the network device does not always need to separately allocate a resource for each time of data transmission of the terminal device, and after the network device allocates a resource to the terminal device at a time, the terminal device may use the allocated resource within a future period of time, which is characterized by "one-time allocation, multi-time use". For example, a SL configured grant type-1, a SL configured grant type-2, a SL grant free, and semi-persistent scheduling (SL SPS) may be included. The type1 configured grant may be a sidelink configured grant directly configured by the network device for the terminal device by using radio resource control (RRC) signaling. The terminal device may directly use a configured grant resource to transmit data without additional activation (for example, activated by using a PDCCH/DCI). The type2 configured grant may be that the network device defines a periodicity of the configured grant by using RRC signaling and then activates the configured grant by using a PDCCH/DCI, and the terminal device cannot directly use a configured grant resource to transmit data and can use the configured grant resource only after the configured grant is activated. The grant free may be a sidelink configured grant directly configured by the network device for the terminal device by using radio resource control (RRC) signaling. The terminal device may directly use a configured grant resource to transmit data without additional activation (for example, activated by using a PDCCH/DCI). The semi-persistent scheduling may be that the network device defines a periodicity of the configured grant by using RRC signaling and then activates the configured grant by using a PDCCH/DCI, and the terminal device cannot directly use a configured grant resource to transmit data and can use the configured grant resource only after the configured grant is activated. A difference between the dynamic grant and the configured grant lies in a grant, that is, resource allocation flexibility and resource allocation overheads. For the dynamic grant, the network needs to allocate a grant to each time of data transmission of the terminal device. In this case, resource allocation is flexible, but resource allocation overheads are high. For the configured grant, the network device allocates a grant once, and the terminal may use the grant for a plurality of times. In this case, resource allocation overheads are low, but an allocated resource is not changed or adjusted within a long period of time, and resource allocation is not flexible. The dynamic grant is allocated by using a physical channel (for example, a PDCCH), and allocation is quick. The configured grant is configured by using higher layer signaling (for example, RRC signaling) or by using higher layer signaling (for example, RRC signaling) and a physical channel (for example, a PDCCH), and resource allocation is slow.

The SL communication resource for wireless direct communication between the terminal devices may not be scheduled and controlled by the network device but is determined by the terminal device. For example, the terminal device is within a communication coverage area of the network device, the network device configures an SL resource pool for the terminal device by using a system information block (SIB) message or dedicated RRC signaling, and the terminal device serving as a data transmit end may autonomously obtain an SL communication resource from the SL resource pool to send a control signal and a data signal to the terminal device serving as a data receive end. Alternatively, for example, the terminal device is beyond a communication coverage area of the network device, and the terminal device serving as a data transmit end autonomously obtains a sidelink communication resource from a preconfigured SL resource pool to send a control signal and/or a data signal to the terminal device serving as a data receive end. For example, the terminal device may sense or contend for the sidelink transmission resource. Optionally, the terminal device obtains an appropriate SL communication resource from the SL resource pool by contending with another terminal device, to send the control signal and/or the data signal. For example, a higher priority of a to-be-transmitted V2X service of the terminal device indicates a greater opportunity that the terminal device contends for the appropriate SL communication resource in the SL resource pool. Optionally, the terminal device may prestore SL resource pool information, or the network device preconfigures the SL resource pool when the terminal device accesses a network. This mode in which the terminal device autonomously determines the SL transmission resource may be referred to as a second mode. Optionally, the second mode may be a mode2 resource configuration mode or a mode4 resource configuration mode specified in a standard currently formulated by the 3GPP.

Currently, the communication system supports coexistence of the first mode and the second mode. As a result, a first-mode resource of the sidelink of the terminal device overlaps a second-mode resource of the sidelink in time domain. If the terminal device simultaneously sends data on the first-mode resource and the second-mode resource, a PAPR may be excessively large. In this case, the terminal device may use one resource to override the other resource (for example, the first-mode resource of the sidelink overrides the second-mode resource of the sidelink, or the second-mode resource of the sidelink overrides the first-mode resource of the sidelink). In other words, the terminal device performs communication on only one resource. Consequently, an overridden resource is wasted, resulting in low resource utilization.

The following describes in detail the embodiments with reference to examples. It should be noted that the descriptions are merely intended to help a person skilled in the art better understand the embodiments but are not intended to limit the scope of the embodiments.

It should be understood that, in the embodiments, "first", "second", and the like are merely intended to indicate different objects, and do not indicate another limitation on the indicated objects. For example, similar to "a first threshold", "a second threshold", "a first resource", "a second resource", and the like in the embodiments are deduced by analogy. A function of "first" and "second" may be to number corresponding items, to distinguish between applicable scenarios or references and does not limit a threshold or resource. For example, that "a measurement result of a ninth resource is greater than or equal to a fourth threshold" may be understood as that a measurement result of a resource is greater than or equal to a threshold in a scenario. A resource or threshold may be determined based on an applicable scenario.

To help a reader understand the solutions in the embodiments, the following describes some terms.

1. A resource of a sidelink includes a first-mode resource of the sidelink and/or a second-mode resource of the sidelink.

2. The first-mode resource of the sidelink is a sidelink resource scheduled by a base station and includes a configured grant resource of the sidelink and/or a dynamic grant resource of the sidelink.

3. The second-mode resource of the sidelink is a sidelink resource that is selected, contended for, or sensed, and/or reserved by a terminal device.

4. The configured grant resource of the sidelink includes a first-type configured grant resource of the sidelink and/or a second-type configured grant resource of the sidelink.

5. The first-type configured grant resource of the sidelink: A sidelink configured grant is directly configured by a network device for the terminal device by using RRC signaling, and the terminal device may directly use the configured grant resource to transmit data without additional activation (for example, activated by using a PDCCH/DCI), for example, a SL configured grant type-1 or SL grant free.

6. The second-type configured grant resource of the sidelink: The network device defines a periodicity of a configured grant by using RRC signaling and then activates the configured grant by using a PDCCH/DCI, and the terminal device cannot directly use the configured grant resource to transmit data and can use the configured grant resource only after the configured grant is activated, for example, a SL configured grant type-2 or semi-persistent scheduling (SL SPS).

7. The dynamic grant resource of the sidelink is a sidelink transmission resource dynamically allocated by the network device to the terminal device by using DCI, where the DCI may be carried on a PDCCH. The network device needs to separately allocate a resource for each time of data transmission of the terminal device, which is characterized by "one-time allocation, one-time use".

8. A resource of an uplink includes a configured grant resource of the uplink and/or a dynamic grant resource of the uplink.

9. The configured grant resource of the uplink includes a first-type configured grant resource of the uplink and/or a second-type configured grant resource of the uplink.

10. The first-type configured grant resource of the uplink: An uplink configured grant is directly configured by the network device for the terminal device by using RRC signaling, and the terminal device may directly use the configured grant resource to transmit data without additional activation (for example, activated by using a PDCCH/DCI), for example, a configured grant type-1 and a grant free.

11. The second-type configured grant resource of the uplink: The network device defines a periodicity of a configured grant by using RRC signaling and then activates the configured grant by using a PDCCH/DCI, and the terminal device cannot directly use the configured grant resource to transmit data and can use the configured grant resource only after the configured grant is activated, for example, a configured grant type-2 or semi-persistent scheduling (SPS).

12. The dynamic grant resource of the uplink is an uplink transmission resource dynamically allocated by the network device to the terminal device by using DCI, where the DCI may be carried on a PDCCH. The network device needs to separately allocate a resource for each time of data transmission of the terminal device, which is characterized by "one-time allocation, one-time use."

13. A resource of a downlink includes a semi-persistently allocated resource of the downlink and/or a dynamically allocated resource of the downlink.

14. The semi-persistently allocated resource of the downlink: The network device defines a periodicity of a resource of the downlink by using RRC signaling and then activates the resource of the downlink by using a PDCCH or DCI, and the terminal device cannot directly use the resource to receive data and can use the resource only after the resource is activated, for example, a configured grant type-2 or semi-persistent scheduling (SPS).

15. The dynamically allocated resource of the downlink is a downlink resource dynamically allocated by the network device to the terminal device by using downlink control information (DCI), where the DCI may be carried on a physical downlink control channel. The network device needs to separately allocate a resource for each time of data receiving of the terminal device, which is characterized by "one-time allocation, one-time use".

16. Uplink transmission is communication performed by a first terminal device and the network device through an uplink.

17. Downlink transmission is communication performed by the first terminal device and the network device through a downlink.

18. Third terminal device: The third terminal device in this specification is a general terminal device and may be any one or more terminal devices other than the first terminal device.

19. Resource overlapping means that two or more resources overlap and/or partially overlap in time domain.

20. Overlapping: means that two or more resources overlap and/or partially overlap in time domain.

21. Release includes "released" and/or "to be released".

22. Sidelink transmission for the first mode means that the terminal device performs communication by using the first-mode resource of the sidelink.

23. Sidelink transmission for the second mode means that the terminal device performs communication by using the second-mode resource of the sidelink.

Figure 2A:
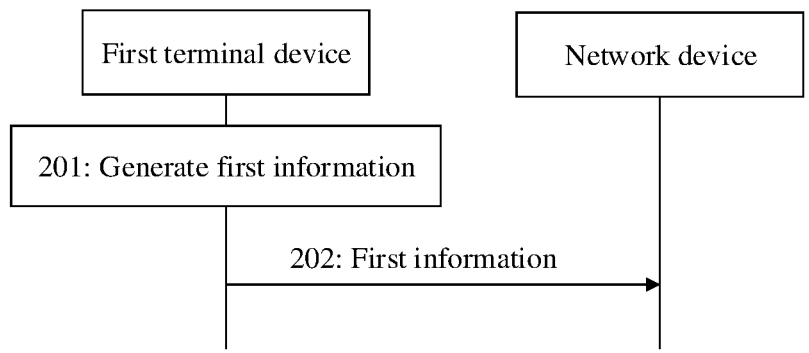
FIG. 2A is a schematic diagram of an embodiment of a communication processing method.

FIG. 2A is a schematic diagram of an embodiment of a communication processing method according to an embodiment. As shown in FIG. 2A, the method includes the following steps.

201: A first terminal device generates first information.

The first information is used to indicate any one or more of the following content: information indicating that the first terminal device releases a first resource; the first resource released by the first terminal device; and information indicating that the first terminal device requests a second resource from the network device.

Optionally, that the first terminal device releases the first resource includes any one or more of the following: The first terminal device has released the first resource, and the first terminal device is to release the first resource.

The first resource and/or the second resource include/includes any one or more of the following content:

a. A resource of a sidelink.

The resource of the sidelink includes a first-mode resource of the sidelink and/or a second-mode resource of the sidelink, and the sidelink is a wireless direct communication link between the first terminal device and a second terminal device, for example, as shown in FIG. 1A, an SL between a first terminal device (V2X device 1) and a second terminal device (V2X device 2).

The first-mode resource of the sidelink includes a configured grant resource of the sidelink and/or a dynamic grant resource of the sidelink, and the configured grant resource of the sidelink includes a first-type configured grant of the sidelink and/or a second-type configured grant of the sidelink.

b. A resource of an uplink.

The resource of the uplink includes a configured grant resource of the uplink and/or a dynamic grant resource of the uplink, and the uplink is an uplink for communication between the first terminal device and the network device. For example, as shown in FIG. 1A, the V2X device 1 is connected to the network device through a Uu interface and performs uplink transmission with the network device through the Uu interface.

The configured grant resource of the uplink includes a first-type configured grant resource and/or a second-type configured grant resource of the uplink.

c. A resource of a downlink.

The resource of the downlink includes a semi-persistently allocated resource of the downlink and/or a dynamically allocated resource of the downlink, and the downlink is a downlink for communication between the first terminal device and the network device. For example, as shown in IA, the V2X device 1 is connected to the network device through the Uu interface and performs downlink transmission with the network device through the Uu interface.

Optionally, from the foregoing descriptions of the first resource and the second resource, in this embodiment, a scenario in which the first terminal device generates the first information and reports the first information to the network device may include: Any one or more of the resource of the sidelink, the resource of the uplink, and the resource of the downlink overlap the second-mode resource of the sidelink. In addition, this embodiment is further applicable to a case in which a first-mode resource of the sidelink overlaps a first-mode resource of the sidelink. The first terminal device may notify, by using the first information, the network device that the first terminal device releases the first resource and/or of information about the first resource released by the first terminal device. Further, the first information may also be used by the first terminal device to request the second resource from the network device. For example, the first terminal device determines to release the first resource used for the first mode for the sidelink, and in this case, the first terminal device may request, by using the first information, the network device to reschedule the second resource for a first mode for the sidelink.

The following describes content included in the first information, and the first information includes any one or more of the following content:

1. An indication that the first terminal device releases the first resource.

2. Information about the first resource.

Optionally, the information about the first resource includes any one or more of the following content: resource type information of the first resource, time domain information of the first resource, frequency domain information of the first resource, a periodicity or an interval of the first resource, and duration of the first resource.

For example, the resource type information of the first resource includes an indication that the first resource is any one of the following resources: the resource of the sidelink, the first-mode resource of the sidelink, the configured grant resource of the sidelink, the first-type configured grant resource of the sidelink, the second-type configured grant resource of the sidelink, the dynamic grant resource of the sidelink, the resource of the uplink, the configured grant resource of the uplink, the first-type configured grant resource of the uplink, the second-type configured grant resource of the uplink, the dynamic grant resource of the uplink, the resource of the downlink, the semi-persistently allocated resource of the downlink, and the dynamically allocated resource of the downlink. The resource type information of the first resource may further include a configured grant index of a configured grant resource serving as the first resource.

Optionally, the time domain information of the first resource includes time domain position information of the first resource and/or time domain length information of the first resource.

Figure 2B:
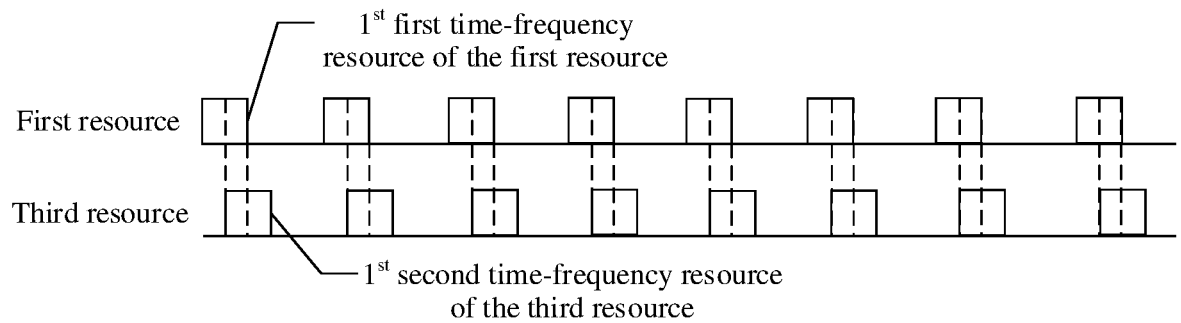
FIG. 2B is a schematic diagram of a scenario of a communication processing method according to an embodiment.

For example, as shown in FIG. 2B, the first resource is the configured grant resource of the sidelink, and the first resource includes a periodic first time-frequency resource. Initial time domain position information (for example, a system frame number (SFN), a subframe, a slot, a symbol, a TTI, and the like) of the $1^{st}$ first time-frequency resource or a first time-frequency resource in the first resource, and midpoint time domain position information (for example, an SFN, a subframe, a slot, a symbol, a TTI, and the like) of the $1^{st}$ first time-frequency resource in the first resource are included. Optionally, the time domain information may include time domain position information of one first time-frequency resource in the first resource or may include time domain position information of each first time-frequency resource or information about time domain positions occupied by all time-frequency resources in the first resource. In addition, the time domain length information of the first resource may include information (subframes, slots, symbols, or the like occupied by the first resource) about a time domain length occupied by the first time-frequency resource in the first resource. Optionally, the time domain length information may include time domain length information of the first time-frequency resource or may include time domain length information of each first time-frequency resource or may include all the time-frequency resources in the first resource. For example, the time domain information of the first resource may be a start time domain position, a length, and the like of the $1^{st}$ time-frequency resource or a time-frequency resource in the first resource.

Optionally, the frequency domain information of the first resource includes frequency domain bandwidth information and frequency domain position information of the first resource.

For example, as shown in FIG. 2B, the first resource is the configured grant resource of the sidelink, the first resource includes the periodic first time-frequency resource, and the frequency domain position information may include initial frequency domain position information (for example, an initial frequency/frequency channel number) of the first time-frequency resource, center frequency domain position information (a center frequency/frequency channel number, or the like) of the first time-frequency resource, and end frequency domain position information (an end frequency/frequency channel number, or the like) of the first time-frequency resource. Optionally, the frequency domain position information includes any one or more of the following content: frequency domain position information of one first time-frequency resource, frequency domain position information of each first time-frequency resource, and frequency domain position information of all the time-frequency resources in the first resource.

For example, the first resource is the configured grant resource of the sidelink, the first resource includes the periodic first time-frequency resource, and frequency domain bandwidth information of the first resource may be information about a frequency domain bandwidth occupied by the first time-frequency resource. The frequency domain bandwidth information includes any one or more of the following content: frequency domain bandwidth information of one first time-frequency resource, frequency domain bandwidth information of each first time-frequency resource, and frequency domain bandwidth information of all time-frequency resources.

For example, the frequency domain information of the first resource may be a frequency channel number and/or a bandwidth occupied by the first resource.

For example, the periodicity of the first resource may be a transmission periodicity of the first resource, and the interval of the first resource may be a transmission interval of the first resource. As shown in FIG. 2B, the first resource is the first-type configured grant resource of the sidelink, and a transmission periodicity or a transmission interval of first time-frequency resources included in the first resource is 20 ms.

Optionally, as shown in FIG. 2G, the first resource is the dynamic grant resource of the sidelink, and duration of the first resource includes time of several SFNs, several subframes, several slots, or several symbols occupied by the first resource.

3. Time information of releasing the first resource by the first terminal device.

Optionally, the time information of releasing the first resource by the first terminal device may include time information of the first terminal device that has released or is to release the first resource. Optionally, the time information includes any one or more of the following content: time at which the first terminal device releases the first resource, information about releasing the $1^{st}$ time-frequency resource of the first resource by the first terminal device, a time interval between the time at which the first terminal device releases the first resource and time at which the first terminal device sends the first information, and a time interval between the time at which the first terminal device releases the first resource and a time domain position of the first resource.

Optionally, the information about releasing the $1^{st}$ time-frequency resource of the first resource by the first terminal device includes: time domain information and/or frequency domain information of releasing the $1^{st}$ time-frequency resource of the first resource by the first terminal device.

For example, as shown in FIG. 2B, the time information of releasing the first resource by the first terminal device includes a time domain position at which the first terminal device releases the $1^{st}$ time-frequency resource of the resource, a frequency channel number corresponding to the time-frequency resource, and the like.

4. An indication that the first terminal device senses, selects, or obtains, through contention, a third resource.

For example, as shown in FIG. 2B, the third resource is the second-mode resource of the sidelink.

5. An indication that the first terminal device reserves the third resource.

For example, as shown in FIG. 2B, the third resource is the second-mode resource of the sidelink, and the third resource includes a periodic second time-frequency resource. The first terminal device may periodically reserve the second-mode resource of the sidelink.

6. An indication that the first resource overlaps the third resource in time domain.

7. Information about the third resource.

Optionally, the third resource includes a sidelink resource selected, contended for, or sensed by the first terminal device and/or a sidelink resource reserved by the first terminal device.

Optionally, the third resource includes the second-mode resource of the sidelink.

Optionally, the information about the third resource includes any one or more of the following content: resource type information of the third resource, time domain information of the third resource, frequency domain information of the third resource, a periodicity or a time interval of the third resource, and duration of the third resource.

Optionally, the time domain information of the third resource includes time domain length information and/or time domain position information of the third resource.

For example, as shown in FIG. 2B, the third resource includes the second-mode resource of the sidelink, and the third resource includes the periodic second time-frequency resource. Initial time domain position information (for example, an SFN, a subframe, a slot, a symbol, a TTI, and the like) of the $1^{st}$ second time-frequency resource or a second time-frequency resource in the third resource, and midpoint time domain position information (for example, an SFN, a subframe, a slot, a symbol, a TTI, and the like) of the $1^{st}$ second time-frequency resource in the third resource are included. Optionally, the time domain information may include time domain position information of one second time-frequency resource in the third resource, or may include time domain position information of each second time-frequency resource or information about a time domain position occupied by all time-frequency resources in the third resource. In addition, the time domain length information of the third resource may include information (subframes, slots, symbols, or the like occupied by the third resource) about a time domain length occupied by the second time-frequency resource in the third resource. Optionally, the time domain length information may include time domain length information of the second time-frequency resource, or may include time domain length information of each second time-frequency resource, or may include all the time-frequency resources in the third resource.

Optionally, the frequency domain information of the third resource includes frequency domain bandwidth information and frequency domain position information of the third resource.

For example, as shown in FIG. 2B, the third resource includes the second-mode resource of the sidelink, the third resource includes the periodic second time-frequency resource, and the frequency domain position information may include initial frequency domain position information (for example, an initial frequency/frequency channel number) of the second time-frequency resource, center frequency domain position information (a center frequency/frequency channel number, or the like) of the second time-frequency resource, and end frequency domain position information (an end frequency/frequency channel number, or the like) of the second time-frequency resource. Optionally, the frequency domain position information includes any one or more of the following content: frequency domain position information of one second time-frequency resource, frequency domain position information of each second time-frequency resource, and frequency domain position information of all the time-frequency resources in the third resource.

For example, the third resource includes the second-mode resource of the sidelink, the third resource includes the periodic second time-frequency resource, and the frequency domain bandwidth information of the third resource may be information about a frequency domain bandwidth occupied by the second time-frequency resource. The frequency domain bandwidth information includes any one or more of the following content: frequency domain bandwidth information of one second time-frequency resource, frequency domain bandwidth information of each second time-frequency resource, and frequency domain bandwidth information of all time-frequency resources.

For example, as shown in FIG. 2B, the third resource is the second-mode resource of the sidelink, the third resource includes the periodic second time-frequency resource, and a transmission periodicity or a time interval of the second time-frequency resource is 20 ms.

For example, as shown in FIG. 2B, the third resource is the second-mode resource of the sidelink, the third resource includes the periodic second time-frequency resource, and duration of the third resource includes time of several SFNs, several subframes, several slots, or several symbols last for by the third resource.

8. A periodicity or a time interval of a service transmitted on the first resource.

Optionally, quality of service (QoS) information of the service transmitted on the first resource, and the like are included.

9. A periodicity or a time interval of a service transmitted on the third resource.

Optionally, QoS information of the service transmitted on the third resource, and the like are included.

10. A time offset of a time domain position of the third resource relative to the time domain position at which the first terminal device sends the first information.

For example, as shown in FIG. 2B, the third resource is the second-mode resource of the sidelink, and the third resource includes the periodic second time-frequency resource, information (for example, an offset of several subframes, several slots, or several symbols) about an offset of a start time domain position of the $1^{st}$ second time-frequency resource or a second time-frequency resource in the third resource relative to the time domain position at which the first terminal device sends the first information, information (for example, an offset of several subframes, several slots, or several symbols) about an offset of a center time domain position of the $1^{st}$ second time-frequency resource or the second time-frequency resource relative to the time domain position at which the first terminal device sends the first information, and information (for example, an offset of several subframes, several slots, or several symbols) about an offset of an end time domain position of the $1^{st}$ second time-frequency resource or the second time-frequency resource relative to the time domain position at which the first terminal device sends the first information.

11. Priority information of a service or data transmitted on the first resource.

For example, the priority information may be QoS information, a PPPP (ProSe Per-Packet Priority) value, or the like of the service.

12. Priority information of a service or data transmitted on the third resource.

For example, the priority information may be QoS information, a PPPP value, or the like of the service.

13. Priority information of the first resource.

14. Priority information of the third resource.

15. An indication that a priority of the first resource is lower than a priority of the third resource.

16. Information about an overlapping resource in the first resource and the third resource.

Optionally, the information about the overlapping resource in the first resource and the third resource includes information about time domain in which the first resource overlaps the third resource.

For example, as shown in FIG. 2B, the first resource is the first-type configured grant resource of the sidelink, and the first resource includes the first time-frequency resource; the third resource is the second-mode resource of the sidelink, and the third resource includes the periodic second time-frequency resource; the first resource periodically overlaps the third resource in time domain, and the information about time domain may carry a time domain position, a time domain length, and the like of the overlapping resource.

17. Information about a time domain offset of the first resource relative to the third resource.

18. Information about a resource that does not overlap the third resource.

For example, information about a resource that does not overlap the third resource in time domain is included.

19. An indication that the first terminal device requests the second resource from the network device.

Optionally, the first terminal device may request the second resource from the network device by using the first information, that is, the first information carries the indication for requesting the second resource.

20. Information about the second resource.

Optionally, the information about the second resource includes any one or more of the following content: resource type information of the second resource, time domain information of the second resource, frequency domain information of the second resource, and a periodicity or an interval of the second resource.

For descriptions of the information about the second resource, refer to descriptions of the information about the first resource and the information about the third resource. Details are not described herein again.

For example, the resource type information of the second resource includes an indication that the second resource is any one of the following resources: the resource of the sidelink, the first-mode resource of the sidelink, the configured grant resource of the sidelink, the first-type configured grant resource of the sidelink, the second-type configured grant resource of the sidelink, the dynamic grant resource of the sidelink, the resource of the uplink, the configured grant resource of the uplink, the first-type configured grant resource of the uplink, the second-type configured grant resource of the uplink, the dynamic grant resource of the uplink, the resource of the downlink, the semi-persistently allocated resource of the downlink, and the dynamically allocated resource of the downlink.

For example, the time domain information of the second resource may be a start time domain position and the like of the $1^{st}$ time-frequency resource or a time-frequency resource in the second resource.

For example, the frequency domain information of the second resource may be a frequency channel number and/or a bandwidth occupied by the second resource.

For example, the periodicity or the interval of the second resource may be a transmission periodicity or a transmission interval of the second resource, the second resource is the first-type configured grant resource of the sidelink, and a transmission periodicity or a transmission interval of time-frequency resources included in the second resource.

21. Information about a time domain offset of the second resource relative to the third resource.

22. The information about the frequency domain offset of the first resource relative to the third resource.

23. Resource reservation indication.

Optionally, the resource reservation indication includes an indication that the first terminal device has resource reservation.

Optionally, resource reservation means that when selecting an initial transmission resource or requesting an initial transmission resource from a base station, the first terminal device reserves a resource used for retransmission.

24. Information about a resource reserved by the first terminal device.

25. An indication that the first terminal device may perform retransmission.

Optionally, the first terminal device performs blind retransmission or hybrid automatic repeat request (HARQ) feedback retransmission.

Optionally, that the first terminal device performs blind retransmission means that the first terminal device transmits a same data packet or transport block for a plurality of times or continuously transmits a same data packet or transport block for a plurality of times, and the first terminal device does not need to wait for a feedback from a receive end, which may be referred to as repetition.

Optionally, that the first terminal device performs HARQ feedback retransmission means that the first terminal device waits for a feedback from a receive end after sending data and the terminal device serving as a transmit end performs retransmission if the receive end feeds back a transmission failure.

26. A quantity of retransmission times or a maximum quantity of retransmission times.

Optionally, the first terminal device allows the quantity of retransmission times or the maximum quantity of retransmission times.

For example, the first terminal device allows a quantity of retransmission times or a maximum quantity of retransmission times of retransmission on the first resource and/or the third resource.

27. A time interval between initial transmission and retransmission.

For example, a time interval between initial transmission and retransmission performed by the first terminal device on the first resource and/or the third resource is included.

28. Frequency domain information of the initial transmission and frequency domain information of the retransmission.

For example, frequency domain information of initial transmission and frequency domain information of retransmission performed by the first terminal device on the first resource and/or the third resource are included.

29. A time offset of the time domain position of the first resource relative to the time domain position at which the first terminal device sends the first information.

For example, as shown in FIG. 2B, the first resource is the second-mode resource of the sidelink, and the first resource includes the periodic first time-frequency resource, information (for example, an offset of several subframes, several slots, or several symbols) about an offset of a start time domain position of the $1^{st}$ first time-frequency resource or a first time-frequency resource in the first resource relative to the time domain position at which the first terminal device sends the first information, information (for example, an offset of several subframes, several slots, or several symbols) about an offset of a center time domain position of the $1^{st}$ first time-frequency resource or the first time-frequency resource relative to the time domain position at which the first terminal device sends the first information, and information (for example, an offset of several subframes, several slots, or several symbols) about an offset of an end time domain position of the $1^{st}$ first time-frequency resource or the first time-frequency resource relative to the time domain position at which the first terminal device sends the first information.

With reference to FIG. 2C, FIG. 2D, and FIG. 2E, the following separately describes three possible implementations in which the first terminal device releases the first resource. An example in which the first resource is a first-type configured grant resource is used for description, and is also applicable to a scenario in which the first resource is a dynamic grant resource or a second-type configured grant resource.

1. With reference to FIG. 2C, the first resource is the first-type configured grant resource of the sidelink, and the third resource is the second-mode resource of the sidelink. It can be learned from FIG. 2C that the first resource partially overlaps the third resource in time domain, and the first terminal device releases the first-type configured grant resource of the sidelink, that is, as shown in FIG. 2C, releases all resources in a shaded part.

2. With reference to FIG. 2D, the first resource is the first-type configured grant resource of the sidelink, the third resource is the second-mode resource of the sidelink, the first resource partially overlaps the third resource in time domain, and the first terminal device releases a resource in a shaded part shown in FIG. 2D.

3. With reference to FIG. 2E, the first resource is the first-type configured grant resource of the sidelink, and the third resource is the second-mode resource of the sidelink. It can be learned from FIG. 2E that the first resource partially overlaps the third resource in time domain, and the first terminal device releases a resource in an overlapping part of the first resource and the third resource, that is, releases a resource in a shaded part shown in FIG. 2E.

In this embodiment, a release manner in which the first terminal device releases the first resource may be specified in a communication protocol, or may be indicated by the network device, or may be agreed on by the first terminal device in advance.

In this embodiment, the first terminal device may alternatively resend indication information to the network device, to request the network device to schedule the second resource for the first terminal device. In this embodiment, an example in which the first information carries an indication that the first terminal device requests the second resource from the network device is merely used for description.

202: The first terminal device sends the first information to the network device.

Optionally, the first terminal device sends the first information to the network device in a plurality of manners. The following provides descriptions by using an example.

1. The first terminal device sends the first information by using physical layer signaling (for example, a physical uplink control channel (PUCCH)).

Optionally, a resource configuration (for example, a first resource configuration) dedicated to the first information is set, the first resource configuration includes a PUCCH configuration, and the first resource configuration is used to configure a resource for sending the first information.

Optionally, a plurality of first resource configurations may be set, or only one first resource configuration may be set.

For example, each resource may be associated with one first resource configuration. For example, any one or more of the following configurations may be used:

the resource of the sidelink is associated with one first resource configuration,
the first-mode resource of the sidelink is associated with one first resource configuration,
the configured grant resource of the sidelink is associated with one first resource configuration,
the first-type configured grant resource of the sidelink is associated with one first resource configuration,
the second-type configured grant resource of the sidelink is associated with one first resource configuration,
the dynamic grant resource of the sidelink is associated with one first resource configuration,
the resource of the uplink is associated with one first resource configuration, the configured grant resource of the uplink is associated with one first resource configuration,
the first-type configured grant resource of the uplink is associated with one first resource configuration,
the second-type configured grant resource of the uplink is associated with one first resource configuration,
the dynamic grant resource of the uplink is associated with one first resource configuration,
the resource of the downlink is associated with one first resource configuration, the semi-persistently allocated resource of the downlink is associated with one first resource configuration, and
the dynamically allocated resource of the downlink is associated with one first resource configuration.

For example, each configured grant resource, each dynamic grant resource, each semi-persistently allocated resource, or each dynamic allocated resource may be associated with one first resource configuration. For example, a configured grant 1 of the first terminal device is associated with one first resource configuration, and a configured grant 2 of the first terminal device is associated with another first resource configuration.

Optionally, that the first terminal device sends the first information to the network device includes: The first terminal device sends the first information to the network device based on the first resource configuration corresponding to the first resource.

For example, reporting of the first information may alternatively be associated with one first resource configuration.

Optionally, that the first terminal device sends the first information to the network device includes: The first terminal device sends the first information based on the first resource configuration.

Optionally, the terminal device receives configuration information from the network device, the configuration information includes the first resource configuration, and the configuration information is used to configure the resource for sending the first information.

Optionally, the first resource configuration may be preconfigured. For example, the first resource configuration is specified in a protocol. Alternatively, a device vendor may store the first resource configuration in a terminal device or a network device before delivery of the terminal device or the network device. Alternatively, another network device preconfigures the first resource configuration to a terminal device or a network device when the terminal device or the network device is connected to a network.

Optionally, the physical layer signaling may be existing physical layer signaling, for example, a scheduling request (SR), a HARQ, a positive acknowledgment (ACK), or a negative acknowledgment (NACK). The physical layer signaling may alternatively be separately defined.

Optionally, the first resource configuration may be an SR configuration or a HARQ resource configuration.

2. The first terminal device sends the first information by using RRC signaling.

a. The RRC signaling may be existing RRC signaling, for example, UE assistance information (UAI) or sidelink UE information (SUI).

b. Separately defined RRC signaling is used to report the first information.

3. The first terminal device sends the first information by using MAC signaling.

Optionally, the MAC signaling may be an existing MAC CE, for example, a buffer status report (BSR) or a configured grant confirmation MAC CE. A separate MAC CE format may alternatively be defined.

Optionally, the MAC CE may be identified by using different logical channel identifiers (LCIDs).

For example, as shown in FIG. 2F, the MAC CE may include an indication that the first terminal device releases the first resource, information about the first resource, and an indication that the first terminal device requests the second resource from the network device. A field 1 is the indication that the first terminal device releases the first resource and may occupy 1 bit. When the field is 1, it indicates that the first terminal device releases the first resource. The information about the first resource may include resource type information of the first resource and is a third field, and the field may occupy 4 bits. A correspondence between a field value and a resource type of the first resource is that shown in the following Table 1. A field 2 is the indication that the first terminal device requests the second resource from the network device and may occupy one bit. When the field is 1, it indicates that the first terminal device requests the second resource from the network device. A quantity of bits occupied by each field is not limited. A reserved bit R is padded with 0. A size of the MAC CE may be fixed or variable. FIG. 2F is merely an example.

TABLE 1

Correspondence between a field value and a resource type of a first resource

| Value | Resource type of a first resource |
|---|---|
| 0 | Resource of a sidelink |
| 1 | First-mode resource of the sidelink |
| 2 | Configured grant resource of the sidelink |
| 3 | First-type configured grant resource of the sidelink |

TABLE 1-continued

Correspondence between a field value and a
resource type of a first resource

| Value | Resource type of a first resource |
|---|---|
| 4 | Second-type configured grant resource of the sidelink |
| 5 | Dynamic grant resources of the sidelink |
| 6 | Resource of an uplink |
| 7 | Configured grant resource of the uplink |
| 8 | First-type configured grant resource of the uplink |
| 9 | Second-type configured grant resource of the uplink |
| 10 | Dynamic grant resource of the uplink |
| 11 | Resource of the downlink |
| 12 | Semi-persistently allocated resource of the downlink |
| 13 | Dynamically allocated resource of the downlink |
| . . . | . . . |

Optionally, that the first terminal device sends the first information to the network device includes: The first terminal device sends the first information to the network device when a first condition is met.

It should be noted that generating the first information may be that the first terminal device generates the first information in advance before the first terminal device determines that the first condition is met or may be that the first terminal device generates the first information after the first terminal device determines that the first condition is met and sends the first information to the network device. This may be applicable to both cases. Therefore, when the first condition is met, the first terminal device may generate the first information, and then send the first information to the network device or may directly send the first information. Therefore, the first information is generated in advance before the first condition is met.

The first condition may include any one or more of the following content:

1. The first resource overlaps the third resource in time domain.

Optionally, that the first resource overlaps the third resource in time domain includes the following two possible implementations:

a. The first resource periodically overlaps the third resource in time domain.

For example, as shown in FIG. 2B, the first resource is the configured grant resource of the sidelink, the third resource is the second-mode resource of the sidelink, and the third resource includes the second time-frequency resource for periodic transmission. The first resource periodically overlaps the third resource, and an overlapping periodicity is 20 ms.

b. The first resource overlaps the third resource for N times in time domain, where N is an integer greater than 0.

For example, as shown in FIG. 2G, the first resource is the dynamic grant resource of the sidelink, and the third resource is the second-mode resource of the sidelink. The first resource overlaps the third resource once.

Optionally, the terminal device receives a configuration from the network device, where the configuration includes a value or a value range of N.

Optionally, N may be preconfigured. For example, N is specified in a protocol, or the device vendor may store N in the terminal device or the network device before delivery of the terminal device or the network device, or the another network device may preconfigure N in the terminal device or the network device when the terminal device or the network device is connected to the network.

2. The first resource is to overlap the third resource in time domain.

For example, after the terminal device obtains the first resource and/or the third resource, the terminal device can determine whether the first resource is to overlap the third resource. If the terminal device determines that the first resource is to overlap the third resource in time domain, the terminal device may determine a to-be-released resource in advance. The terminal device may notify the network device that the network may schedule the released first resource to the another terminal device for use or notify another terminal device that the another terminal device may select, contend for, or sense, and/or reserve the released resource, to improve resource utilization.

Optionally, that the first resource is to overlap the second resource in time domain includes the following two possible implementations:

a. The first resource is to periodically overlap the third resource in time domain.

For example, as shown in FIG. 2B, the first resource is the configured grant resource of the sidelink, the third resource is the second-mode resource of the sidelink, and the third resource includes the second time-frequency resource for periodic transmission. After the terminal device obtains the first resource and/or the third resource, the terminal device can determine whether the first resource is to overlap the third resource, and the terminal device determines that the first resource is to periodically overlap the third resource in time domain. If the terminal device determines that a priority of the first resource is lower than that of the third resource, the terminal device may release the first resource in advance, and the terminal device may send the first information to the network device. The network device may schedule the released first resource to the another terminal device for use, to improve resource utilization.

b. The first resource is to overlap the third resource for N times in time domain, where N is an integer greater than 0.

For example, as shown in FIG. 2G, the first resource is the dynamic grant resource of the sidelink, and the third resource is the second-mode resource of the sidelink. After the terminal device obtains the first resource and/or the third resource, the terminal device can determine whether the first resource is to overlap the third resource, and the terminal device determines that the first resource is to overlap the third resource once. If the terminal device determines that a priority of the first resource is lower than that of the third resource, the terminal device may release the first resource in advance, and the terminal device may send the first information to the network device. The network device may schedule the released first resource to the another terminal device for use, to improve resource utilization.

3. The third resource overrides the first resource or the first resource overrides the third resource.

Optionally, that the third resource overrides the first resource or the first resource overrides the third resource includes the following two possible implementations:

a. The third resource periodically overrides the first resource or the first resource periodically overrides the third resource.

For example, as shown in 2B, the first resource is the configured grant resource of the sidelink, the third resource is the second-mode resource of the sidelink, and the third resource includes the second time-frequency resource for periodic transmission. The first resource periodically overlaps the third resource. If the third resource has priority over the first resource, that is, the first terminal device periodically overrides the first resource by using the third resource.

Coverage may be understood as that the third resource has priority over the first resource and the first terminal device may replace the first resource with the third resource. When the first terminal device needs to simultaneously perform transmission in the first mode and the second mode, the first terminal device preferentially selects to perform transmission on the third resource instead of the first resource.

Figure 2H:
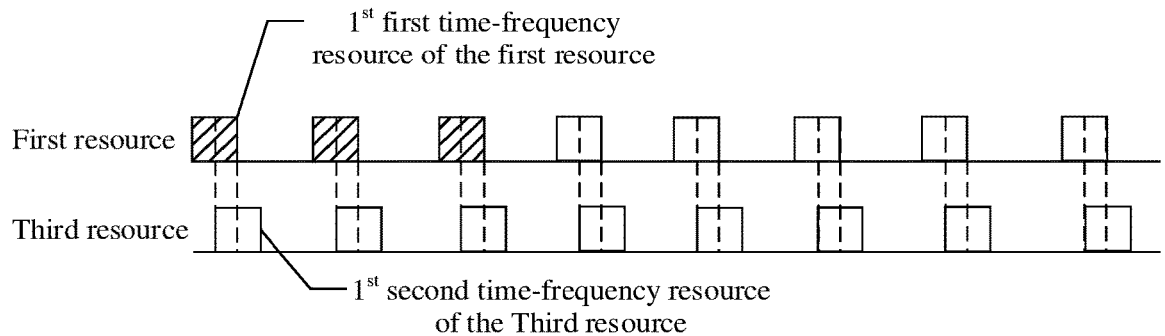
FIG. 2H is a schematic diagram of another scenario of a communication processing method according to an embodiment.

For example, as shown in FIG. 2H, the first resource is the configured grant resource of the sidelink, the first resource includes the first time-frequency resource for periodic transmission, the third resource is the second-mode resource of the sidelink, and the third resource includes the second time-frequency resource for periodic transmission. If the first terminal device periodically overrides the first three first time-frequency resources in the first resource by using the first three second time-frequency resources in the third resource, the first terminal device may determine that the first resource is to still periodically overlap the third resource subsequently, and the first terminal device may perform reporting on the network device and release the first resource. In addition, the terminal device may send the first information to the network device, and the network device may schedule the released first resource to the another terminal device for use, to improve resource utilization.

b. The third resource overrides the first resource for N times or the first resource overrides the third resource for N times, where N is an integer greater than 0.

For example, as shown in FIG. 2H, the first resource is the configured grant resource of the sidelink, the first resource includes the first time-frequency resource for periodic transmission, the third resource is the second-mode resource of the sidelink, and the third resource includes the second time-frequency resource for periodic transmission. If the first terminal device overrides the first three first time-frequency resources in the first resource by using the first three second time-frequency resources in the third resource, the first terminal device may determine that the third resource overrides the first resource for three times. In this case, the first terminal device may report the first information to the network device. Then, the first terminal device may release the first resource, so that the network device may schedule the first resource to the another terminal device for use.

4. The third resource is to override the first resource or the first resource is to override the third resource.

For example, after the terminal device obtains the first resource and/or the third resource, the terminal device can determine whether the third resource is to override the first resource or the first resource is to override the third resource. If the terminal device determines that the third resource is to override the first resource or the first resource is to override the third resource, the terminal device may determine a to-be-released resource in advance. The terminal device may notify the network device that the network may schedule the released resource to the another terminal device for use or notify the another terminal device that the another terminal device may select, contend for, or sense, and/or reserve the released resource, to improve resource utilization.

Optionally, that the third resource is to override the first resource or the first resource is to override the third resource includes the following two possible implementations:

a. The third resource is to periodically override the first resource or the first resource is to periodically override the third resource.

For example, as shown in FIG. 2B, the first resource is the configured grant resource of the sidelink, the first resource includes the first time-frequency resource for periodic transmission, the third resource is the second-mode resource of the sidelink, and the third resource includes the second time-frequency resource for periodic transmission. After the terminal device obtains the first resource and/or the third resource, the terminal device can determine whether the third resource is to periodically override the first resource or the first resource is to periodically override the third resource, and the terminal device determines that the third resource is to periodically override the first resource or the first resource is to periodically override the third resource. If the terminal device determines that a priority of the first resource is lower than that of the third resource, the terminal device may release the first resource in advance, and the terminal device may send the first information to the network device. The network device may schedule the released first resource to the another terminal device for use, to improve resource utilization.

For example, as shown in FIG. 2H, the first resource is the configured grant resource of the sidelink, the first resource includes the first time-frequency resource for periodic transmission, the third resource is the second-mode resource of the sidelink, and the third resource includes the second time-frequency resource for periodic transmission. If the first terminal device periodically overrides the first three first time-frequency resources in the first resource by using the first three second time-frequency resources in the third resource, and as shown in FIG. 2H, a shaded part is the to-be-overridden first three first time-frequency resources in the first resource, the first terminal device may determine that the first resource is to still periodically overlap the third resource subsequently. In this case, the terminal device may release the first resource in advance, and the terminal device may send the first information to the network device. The network device may schedule the released first resource to the another terminal device for use, to improve resource utilization.

b. The third resource is to override the first resource for N times or the first resource is to override the third resource for N times, where N is an integer greater than 0.

Figure 2I:
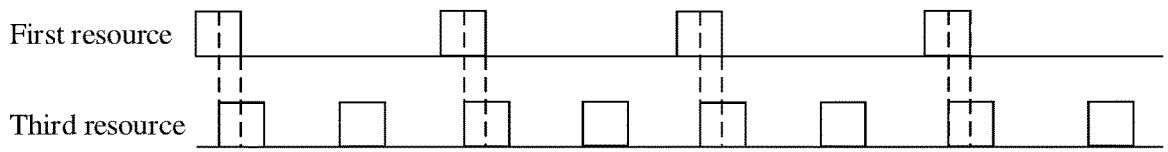
FIG. 2I is a schematic diagram of another scenario of a communication processing method according to an embodiment.

For example, as shown in FIG. 2I, the first resource is the configured grant resource of the sidelink, the first resource includes the first time-frequency resource for periodic transmission, the third resource is the second-mode resource of the sidelink, and the third resource includes the second time-frequency resource for periodic transmission. After the terminal device obtains the first resource and/or the third resource, the terminal device can determine whether the third resource is to override the first resource for N times or the first resource is to override the third resource for N times. If the first terminal device determines that the third resource is to override the first resource for four times, the terminal device may release the first resource, and the terminal device may send the first information to the network device. The network device may schedule the released first resource to the another terminal device for use, to improve resource utilization.

5. First duration is greater than or equal to a first threshold.

Optionally, the first duration is a time difference between a time domain position of the first resource and a moment at which the first terminal device determines to release the first resource, or is a time difference between a time domain position of the first resource and a time domain position at which the first terminal device sends the first information.

Optionally, the time domain position of the first resource includes a start time domain position of the first resource.

Optionally, the first duration is a time difference between the start time domain position of the first resource and the moment at which the first terminal device releases the first resource or is a time difference between the start time domain position of the first resource and the time domain position at which the first terminal device sends the first information.

Optionally, the start time domain position of the first resource includes a start time domain position of the released first resource, a start time domain position of the $1^{st}$ time-frequency resource of the released first resource, a time domain position of the released first resource, or a time domain position of the $1^{st}$ time-frequency resource of the released first resource.

Figure 2J:
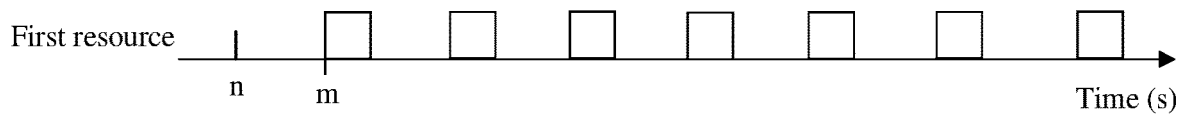
FIG. 2J is a schematic diagram of another scenario of a communication processing method according to an embodiment.

For example, as shown in FIG. 2J, the first resource is the configured grant resource of the sidelink, the first resource includes the first time-frequency resource for periodic transmission, the third resource is the second-mode resource of the sidelink, and the third resource includes the second time-frequency resource for periodic transmission. A start time domain position of the released first resource is m, and a moment at which the first terminal device releases the first resource is n. In this case, a time difference between the two moments is the first duration. If there is a long time between the moment at which the first terminal device releases the first resource and the start time domain position of the released first resource, that is, the first duration is greater than the first threshold. In this case, the first terminal device may report the first information to the network device, and the network device still has time to schedule the released first resource to the another terminal device for use, to improve resource utilization.

The first threshold may be preconfigured, configured by the network device for the first terminal device, specified in a communication protocol, determined by the network device according to a rule and notified to the first terminal device, or defined at delivery of the first terminal device.

6. The first resource includes a dedicated resource of the first terminal device.

Optionally, the dedicated resource of the first terminal device includes any one or more of the following content: the dynamic grant resource of the sidelink, the second-type configured grant resource of the sidelink, the dynamic grant resource of the uplink, the second-type configured grant resource of the uplink, the resource of the downlink, the semi-persistently allocated resource of the downlink, and the dynamic allocated resource of the downlink.

For example, as shown in FIG. 2E, the first terminal device may determine, based on a type of the first resource, whether to report the first information. If the first resource is the second-type configured grant resource of the sidelink, the first resource is allocated by the network device and dedicated to the first terminal device. If the first terminal device releases the first resource, the first terminal device does not use the first resource, and the another terminal device does not use the first resource, the first resource is wasted. Therefore, when the first resource is the dedicated resource of the first terminal device, the first terminal device may report the first information to the network device, and the network device may allocate the first resource to the another terminal device for use, to improve resource utilization.

The first terminal device releases the first resource. When the first resource is a resource (for example, a resource type), the first terminal device needs to report release information to the network device. This may be preconfigured, configured by the network device for the first terminal device, specified in a communication protocol, determined by the first terminal device according to a preset rule, or defined at delivery of the first terminal device.

7. The first resource includes a periodic time-frequency resource.

Optionally, the first resource includes any one or more of the following content: the configured grant resource of the sidelink, the first-type configured grant resource of the sidelink, the second-type configured grant resource of the sidelink, the configured grant resource of the uplink, the first-type configured grant resource of the uplink, the second-type configured grant resource of the uplink, and the semi-persistently allocated resource of the downlink.

For example, as shown in FIG. 2B, the first resource is the configured grant resource of the sidelink, the first resource includes the first time-frequency resource for periodic transmission, the third resource is the second-mode resource of the sidelink, and the third resource includes the second time-frequency resource for periodic transmission. If the first terminal device releases the first resource, the first terminal device does not use the first resource, and the another terminal device does not use the first resource, the first resource is wasted. Therefore, when the first resource is the periodic time-frequency resource, the first terminal device may report the first information to the network device, and the network device may allocate the first resource to the another terminal device for use, to improve resource utilization.

8. The first terminal device has a resource of the uplink.

Optionally, that the first terminal device has a resource of the uplink includes that the first terminal device has an uplink resource that can accommodate the first information.

In this embodiment, the first terminal device may further send second information to a third terminal device, where the second information is used to indicate that the first terminal device releases the first resource and/or indicate the first resource released by the first terminal device.

Optionally, that the first terminal device sends second information to a third terminal device includes: The first terminal device sends the second information to the third terminal device when the first condition is met.

Optionally, the second information may include any one or more types of content of the first information. For example, the second information may carry the information about the first resource and the time information of releasing the first resource by the first terminal device in the first information, and the like.

Optionally, a manner in which the first terminal device sends the second information to the third terminal device is similar to the manner in which the first terminal device sends the first information to the network device in FIG. 2A (by using RRC signaling, MAC signaling, and physical layer signaling). For details, refer to the related descriptions in step 202 shown in FIG. 2A. In addition, the first terminal device may further send the second information to the third terminal device by using SCI, so that the third terminal device determines, by using the SCI, the first resource that has been released or is to be released by the first terminal device.

For example, the third terminal device is a general terminal device, and may be any terminal device other than the first terminal device.

In this embodiment, before the first terminal device sends the first information to the network device or the first terminal device sends the second information to the third terminal device, the first terminal device may determine to release the first resource. For a determining manner, refer to the embodiment shown in FIG. 2K. The method includes the following steps.

203: The first terminal device determines that the priority of the first resource is lower than the priority of the third resource when a second condition is met.

The second condition includes any one or more of the following content:

1. A priority of sidelink transmission for the first mode is lower than a priority of sidelink transmission for the second mode.

A priority of performing transmission by the first terminal device in a first mode for the sidelink is lower than a priority of performing transmission by the first terminal device in a second mode for the sidelink.

Optionally, the first-mode resource of the sidelink includes any one or more of the following content: the configured grant resource of the sidelink, the first-type configured grant resource of the sidelink, the second-type configured grant resource of the sidelink, and the dynamic grant resource of the sidelink.

For example, the priority or priority information may include QoS information, a PPPP value, a priority of a logical channel in a MAC PDU, a priority of a logical channel with a highest priority in the MAC PDU, a priority of a logical channel allowed a resource (for example, a grant,), a highest priority of a logical channel allowed on the resource (for example, the grant), or the like.

2. A priority of uplink transmission is lower than the priority of the sidelink transmission for the second mode.

A priority of performing transmission by the first terminal device through the uplink is lower than a priority of performing transmission by the first terminal device in the second mode.

3. A priority of downlink transmission is lower than the priority of the sidelink transmission for the second mode.

A priority of performing transmission by the first terminal device through the downlink is lower than a priority of using the second mode for the sidelink by the first terminal device.

4. A priority of the service or the data transmitted on the first resource is lower than a priority of the service or the data transmitted on the third resource.

5. The priority information of the service or the data transmitted on the first resource is greater than or equal to or is less than or equal to a second threshold.

6. The priority information of the service or the data transmitted on the third resource is greater than or equal to or is less than or equal to a third threshold.

7. A measurement result for the first mode of the sidelink is lower than a measurement result for the second mode of the sidelink.

For example, the measurement result may be a channel busy ratio (CBR) measurement value, a physical sidelink shared-reference signal received power (PSSCH-RSRP) value, a sidelink received signal strength indicator (S-RSSI) value, or the like. A channel quality value of a channel used when the first terminal device performs transmission in the first mode for the sidelink is lower than a channel quality value of a channel used when the first terminal device performs transmission in the second mode for the sidelink.

8. A measurement result of the uplink is lower than the measurement result for the second mode of the sidelink.

9. A measurement result of the downlink is lower than the measurement result for the second mode of the sidelink.

10. The measurement result for the first mode of the sidelink is greater than or equal to or is less than or equal to a fourth threshold.

For example, the measurement result for the first mode of the sidelink may be a CBR measurement value, a PSSCH-RSRP value, an S-RSSI value, or the like, and the measurement result for the first mode is compared with the fourth threshold to determine whether a transmission priority of the first resource is lower than a transmission priority of the third resource.

11. The measurement result of the uplink is greater than or equal to or is less than or equal to the fourth threshold.

12. The measurement result of the downlink is greater than or equal to or is less than or equal to the fourth threshold.

13. The measurement result for the second mode of the sidelink is greater than or equal to or is less than or equal to a fifth threshold.

14. Priority information of the sidelink transmission for the first mode is greater than or equal to or is less than or equal to a sixth threshold.

15. Priority information of the uplink transmission is greater than or equal to or is less than or equal to the sixth threshold.

16. Priority information of the downlink transmission is greater than or equal to or is less than or equal to the sixth threshold.

17. Priority information of the sidelink transmission for the second mode is greater than or equal to or is less than or equal to the sixth threshold.

For example, a channel quality value corresponding to a channel used when the first terminal device performs transmission in the second mode may be a CBR measurement value, a PSSCH-RSRP value, an S-RSSI value, or the like, and the channel quality value of the channel is compared with the fifth threshold to determine whether a transmission priority of the first resource is lower than a transmission priority of the third resource.

18. A measurement result of the first resource is lower than a measurement result of the third resource.

19. The measurement result of the first resource is greater than or equal to or is less than or equal to the fourth threshold.

20. The measurement result of the third resource is greater than or equal to or is less than or equal to the fifth threshold.

21. The first resource includes a resource shared by the first terminal device and another terminal device and the first resource is not to be used.

Optionally, the resource shared by the first terminal device and the another terminal device includes a first-type configured grant resource of the sidelink and/or a first-type configured grant resource of the uplink.

Optionally, measurement results or priority information of different links are/is compared with a specified threshold. For the different links, specified thresholds may be the same or may be different. The foregoing 11 to 17 are merely examples.

Optionally, the second threshold, the third threshold, the fourth threshold, the fifth threshold, and the sixth threshold may be preconfigured, configured by the network device for the first terminal device, specified in a communication protocol, determined by the network device according to a rule and notified to the first terminal device, or defined at delivery of the first terminal device.

Optionally, the first-type configured grant resource (that is, a type1 CG resource) of the sidelink is a resource allocated by the network device to a plurality of terminal devices for sharing and is not a dedicated resource allocated by the network device to the first terminal device. Therefore, if a plurality of terminal devices simultaneously perform sending on a same first-type configured grant resource, mutual interference may occur during transmission between the plurality of terminal devices, and transmission quality of each terminal device cannot be ensured. However, the second-mode resource of the sidelink is obtained by the terminal device through contention, selection, or sensing and is also shared by a plurality of terminal devices, and transmission quality cannot be ensured. Therefore, a transmission priority of the first-type configured grant resource of the sidelink and a transmission priority of the second-mode resource of the sidelink may be determined based on whether the first-type configured grant resource of the sidelink is to be used. If the terminal device is to send data on the first-type configured grant resource of the sidelink, the transmission priority of the first-type configured grant resource of the sidelink is higher than the transmission priority of the second-mode resource of the sidelink. If the terminal device is not to send data on the first-type configured grant resource of the sidelink, the transmission priority of the first-type configured grant resource is lower than the transmission priority of the second-mode resource of the sidelink, that is, the transmission priority of the first resource is lower than the transmission priority of the third resource.

22. A start time domain position of the first resource is after or before a start time domain position of the third resource.

Figure 2K:
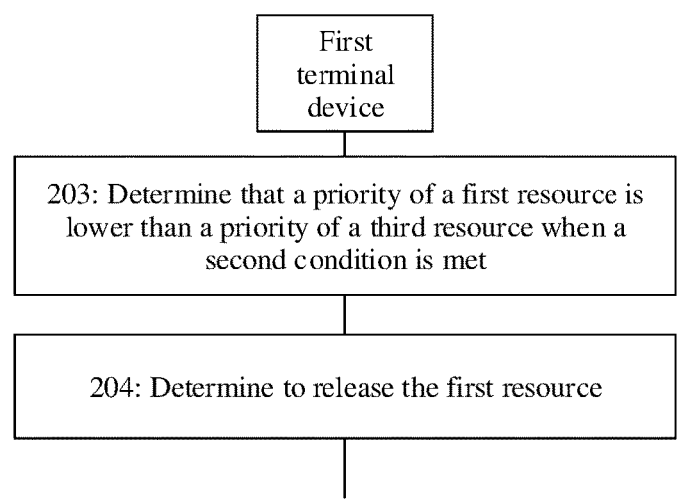
FIG. 2K is a schematic diagram of another embodiment of a communication processing method.
Figure 2L:
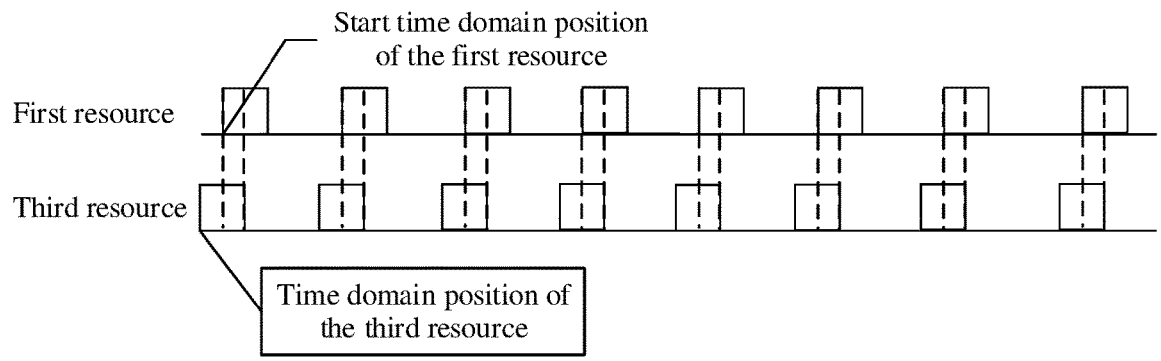
FIG. 2L is a schematic diagram of another scenario of a communication processing method according to an embodiment.

For example, as shown in FIG. 2L, the first resource is the first-type configured grant resource of the sidelink, and the third resource is the second-mode resource of the sidelink. It can be learned from FIG. 2L that the start time domain position of the first-type configured grant resource of the sidelink is after the start time domain position of the second-mode resource of the sidelink. Therefore, the transmission priority of the first-type configured grant resource of the sidelink is lower than the transmission priority of the second-mode resource of the sidelink.

23. The first resource includes a periodic first time-frequency resource, the second resource includes a periodic second time-frequency resource, and a periodicity of the first time-frequency resource is greater than or less than a periodicity of the second time-frequency resource.

Figure 2M:
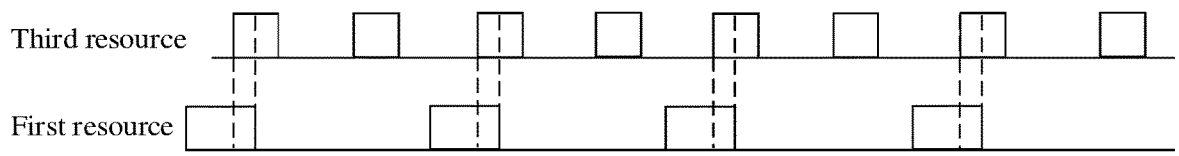
FIG. 2M is a schematic diagram of another scenario of a communication processing method according to an embodiment.

For example, as shown in FIG. 2M, the first resource is the second-type configured grant resource of the sidelink, the second-type configured grant resource includes the periodic first time-frequency resource, the third resource is the second-mode resource of the sidelink, and the second-mode resource of the sidelink includes the periodic second time-frequency resource grant. It can be learned from FIG. 2M that the periodicity of the first time-frequency resource is greater than the periodicity of the second time-frequency resource, and in this case, the priority of the first resource is lower than the priority of the third resource.

24. The first resource includes the periodic first time-frequency resource, the third resource includes the periodic second time-frequency resource, and a time interval between two adjacent first time-frequency resources is greater than or less than a time interval between two adjacent second time-frequency resources.

Figure 2N:
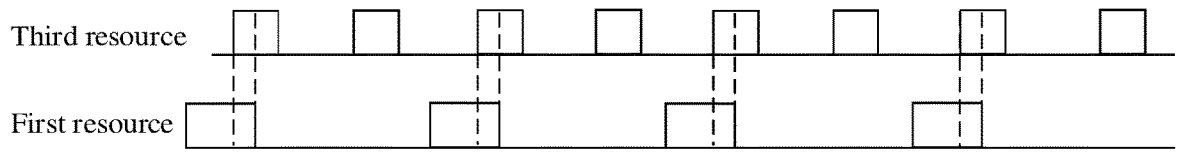
FIG. 2N is a schematic diagram of another scenario of a communication processing method according to an embodiment.

For example, as shown in FIG. 2N, the first resource is the second-type configured grant resource of the sidelink, the second-type configured grant resource of the sidelink includes the periodic first time-frequency resource, the third resource is the second-mode resource of the sidelink, and the second-mode resource of the sidelink includes the periodic second time-frequency resource grant. It can be learned from FIG. 2N that the time interval between the two adjacent first time-frequency resources is greater than the time interval between the two adjacent second time-frequency resource grants, and in this case, the priority of the first resource is lower than the priority of the third resource.

25. A size of the first resource is less than or greater than a size of the third resource.

Optionally, the first resource includes a first time-frequency resource, the third resource includes a second time-frequency resource, and a size of the first time-frequency resource is less than or greater than a size of the second time-frequency resource.

Figure 2O:
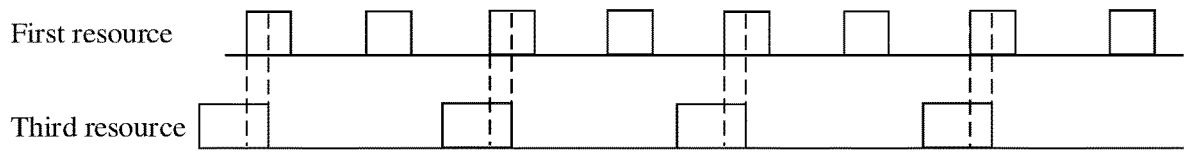
FIG. 2O is a schematic diagram of another scenario of a communication processing method according to an embodiment.

For example, as shown in FIG. 2O, the first resource is the configured grant resource of the sidelink, the configured grant resource of the sidelink includes the periodic first time-frequency resource, the third resource is the second-mode resource of the sidelink, and the second-mode resource of the sidelink includes the periodic second time-frequency resource. Therefore, the priority of the second-mode resource is higher than that of the first-mode resource.

Optionally, the size of the time-frequency resource includes a time domain length of the time-frequency resource or a quantity of bits that can be accommodated in the time-frequency resource.

26. A proportion of an overlapping resource in the first resource to the first resource is greater than or less than a proportion of an overlapping resource in the third resource to the third resource.

Optionally, the first resource includes the first time-frequency resource for periodic transmission, the third resource includes the second time-frequency resource for periodic transmission, the first time-frequency resource overlaps the second time-frequency resource in time domain, and a proportion of an overlapping resource to the first time-frequency resource is greater than a proportion of an overlapping resource to the second time-frequency resource.

Figure 2P:
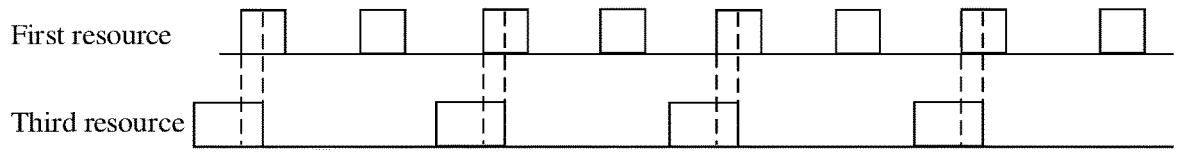
FIG. 2P is a schematic diagram of another scenario of a communication processing method according to an embodiment.

For example, as shown in FIG. 2P, the first resource is the configured grant resource of the sidelink, the third resource is the second-mode resource of the sidelink, a proportion of an overlapping resource in the first resource to the first resource is 50%, a proportion of an overlapping resource in the third resource to the third resource is 100%, and the proportion of the overlapping resource in the first resource to the first resource is less than the proportion of the overlapping resource in the third resource to the third resource. Therefore, the priority of the second-mode resource is higher than that of the first-mode resource.

Figure 2Q:
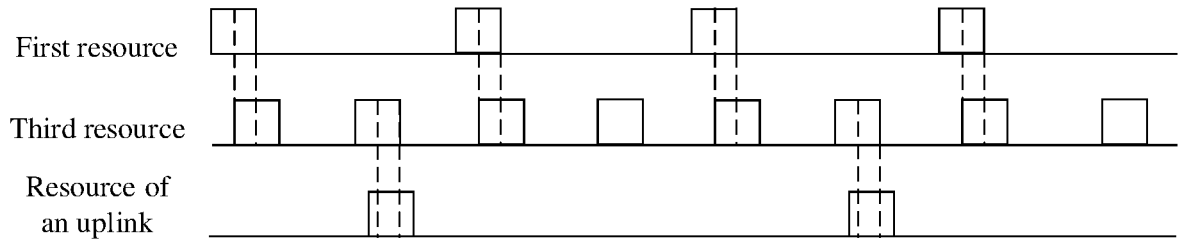
FIG. 2Q is a schematic diagram of another scenario of a communication processing method according to an embodiment.

For example, as shown in FIG. 2Q, the first resource is the first-mode resource of the sidelink, the resource of the uplink is a resource that is scheduled by the network device for the first terminal device and that is used for uplink transmission, and the third resource is the second-mode resource of the sidelink. A proportion of an overlapping resource in the first resource to the first resource is 100%, a proportion of an overlapping resource in the third resource to the third resource is 75%, and the proportion of the overlapping resource in the first resource to the first resource is greater than the proportion of the overlapping resource in the third resource to the third resource. Therefore, the priority of the third resource is higher than the priority of the first resource.

27. The priority of the first resource is lower than the priority of the third resource.

204: The first terminal device determines to release the first resource.

Optionally, the first terminal device determines to release the first resource whose priority is lower than that of the third resource.

It should be noted that, in this embodiment, the rule used to determine that the priority of the first resource is lower than the priority of the third resource in the second condition may be separately applied to a scenario in which the first terminal device needs to determine a priority of a resource, or may be applied to another scenario in which a priority of a resource needs to be determined and then corresponding processing is performed.

In this embodiment, the first terminal device generates the first information. Then, the first terminal device sends the first information to the network device, where the first information is used to indicate any one or more of the following content: information indicating that the first terminal device releases the first resource; the first resource released by the first terminal device; and information indicating that the first terminal device requests the second resource from the network device. Therefore, when the first terminal device determines to release the first resource, the first terminal device may send the first information to the network device, so that the network device determines the first resource released by the first terminal device. In this way, the network device may allocate the first resource to another terminal device, to improve resource utilization.

In this embodiment, the first terminal device sends the second information to the third terminal device, where the second information is used to indicate that the first terminal device releases the first resource and/or indicate the first resource released by the first terminal device. Therefore, when the first terminal device determines to release the first resource, the first terminal device may send the second information to the third terminal device, so that the third terminal device determines the first resource released by the first terminal device. In this way, the third terminal device may select, contend for, or sense, and/or reserve the first resource, to improve resource utilization.

Figure 3A:
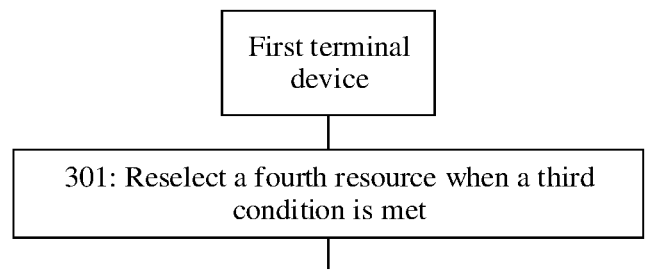
FIG. 3A is a schematic diagram of another embodiment of a communication processing method.

FIG. 3A is a schematic diagram of another embodiment of a communication processing method according to an embodiment. As shown in FIG. 3A, the method includes the following steps.

301: A first terminal device reselects a fourth resource when a third condition is met.

The fourth resource includes a second-mode resource of a sidelink, and the second-mode resource of the sidelink includes a sidelink resource selected, contended for, or sensed by the terminal device and/or a sidelink resource reserved by the terminal device.

The sidelink is a wireless direct communication link between the first terminal device and a second terminal device.

Optionally, this embodiment is applied to a scenario in which a fifth resource overlaps a sixth resource in time domain, where the fifth resource includes any one or more of a first-mode resource of the sidelink, a second-mode resource of the sidelink, a resource of an uplink, and a resource of a downlink, and the sixth resource is a second-mode resource of the sidelink.

Figure 3B:
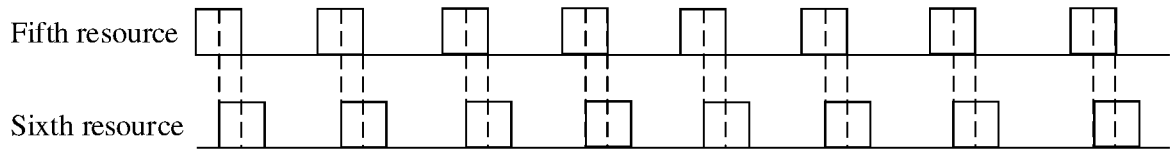
FIG. 3B is a schematic diagram of another scenario of a communication processing method according to an embodiment.

For example, as shown in FIG. 3B, the fifth resource is a second-type configured grant resource of the sidelink, and the sixth resource is a second-mode resource of the sidelink. It can be learned from FIG. 3B that the fifth resource overlaps the sixth resource.

For another example, as shown in FIG. 3B, the fifth resource is a second-mode resource of the sidelink, and the sixth resource is a second-mode resource of the sidelink. In other words, the second-mode resources of the sidelink that are obtained by the first terminal device include the fifth resource and the sixth resource. It can be learned from FIG. 3B that the fifth resource overlaps the sixth resource.

The third condition includes any one or more of the following:

1. The fifth resource overlaps the sixth resource in time domain.

a. The fifth resource periodically overlaps the sixth resource in time domain.

b. The fifth resource overlaps the sixth resource for N times in time domain, where N is an integer greater than 0.

2. The fifth resource is to overlap the sixth resource in time domain.

a. The fifth resource is to periodically overlap the sixth resource in time domain.

b. The fifth resource is to overlap the sixth resource for N times in time domain, where N is an integer greater than 0.

3. The sixth resource overrides the fifth resource or the fifth resource overrides the sixth resource.

a. The sixth resource periodically overrides the fifth resource or the fifth resource periodically overrides the sixth resource.

b. The sixth resource overrides the fifth resource for N times or the fifth resource overrides the sixth resource for N times, where N is an integer greater than 0.

4. The sixth resource is to override the fifth resource or the fifth resource is to override the sixth resource.

a. The sixth resource is to periodically override the fifth resource or the fifth resource is to periodically override the sixth resource.

b. The sixth resource is to override the fifth resource for N times or the fifth resource is to override the sixth resource for N times, where N is an integer greater than 0.

5. Second duration is greater than or equal to a seventh threshold.

Optionally, the seventh threshold may be preconfigured, configured by a network device for the first terminal device, specified in a communication protocol, determined by the network device according to a rule and notified to the first terminal device, or defined at delivery of the first terminal device.

Optionally, the second duration is a time difference between a time domain position of the sixth resource and a moment at which the first terminal device releases the sixth resource or is a time difference between a time domain position of the sixth resource and a time domain position at which the first terminal device sends third information.

6. The sixth resource includes a periodic time-frequency resource.

The foregoing conditions are similar to the first five conditions and the seventh possible condition included in the first condition in the embodiment shown in FIG. 2A. For details, refer to the related descriptions of the first condition in the embodiment shown in FIG. 2A. Details are not described herein again.

Optionally, this embodiment further includes step 302. Step 302 is: The first terminal device sends the third information to a third terminal device.

The third information is used to indicate that the first terminal device releases the sixth resource and/or indicate the sixth resource released by the first terminal device. For example, the third terminal device is a general terminal device, and may be any terminal device other than the first terminal device.

The third information includes any one or more of the following content:

1. An indication that the first terminal device releases the sixth resource, where the sixth resource is the second-mode resource of the sidelink.

2. Information about the sixth resource.

Optionally, the information about the sixth resource includes any one or more of the following content: resource type information of the sixth resource, time domain information of the sixth resource, frequency domain information of the sixth resource, a periodicity or an interval of the sixth resource, and duration of the sixth resource.

Optionally, the time domain information of the sixth resource includes time domain position information of the sixth resource and/or time domain length information of the sixth resource.

Optionally, the frequency domain information of the sixth resource includes frequency domain position information of the sixth resource and/or frequency domain bandwidth information of the sixth resource.

3. Time information of releasing the sixth resource by the first terminal device.

Optionally, the time information includes any one or more of the following content: time at which the first terminal device releases the sixth resource, information about releasing the $1^{st}$ time-frequency resource of the sixth resource by the first terminal device, and a time interval between the time at which the first terminal device releases the sixth resource and a moment at which the first terminal device sends the third information.

Optionally, the time at which the first terminal device releases the sixth resource includes time domain information of releasing the $1^{st}$ time-frequency resource of the sixth resource by the first terminal device and/or frequency domain information of releasing the $1^{st}$ time-frequency resource of the sixth resource by the first terminal device.

4. An indication that the first terminal device senses, selects, or obtains, through contention, the sixth resource.

5. An indication that the first terminal device reserves the sixth resource.

6. An indication that the fifth resource overlaps the sixth resource in time domain.

The fifth resource includes any one or more of the following content: the resource of the sidelink, the resource of the uplink, and the resource of the downlink.

7. Information about the fifth resource.

Optionally, the information about the fifth resource includes any one or more of the following content: resource type information of the fifth resource, time domain information of the fifth resource, frequency domain information of the fifth resource, a periodicity or a time interval of the fifth resource, and duration of the fifth resource.

Optionally, the time domain information of the fifth resource includes time domain length information of the fifth resource and/or time domain position information of the fifth resource.

Optionally, the frequency domain information of the fifth resource includes frequency domain bandwidth information of the fifth resource and/or frequency domain position information of the fifth resource.

8. A periodicity or a time interval of a service transmitted on the fifth resource.

9. A periodicity or a time interval of a service transmitted on the sixth resource.

10. A time offset of a time domain position of the fifth resource relative to a time domain position at which the first terminal device sends the third information.

11. Priority information of a service or data transmitted on the fifth resource.

12. Priority information of a service or data transmitted on the sixth resource.

13. Priority information of the fifth resource.

14. Priority information of the sixth resource.

15. An indication that a priority of the sixth resource is lower than a priority of the fifth resource.

16. Information of the fifth resource overlapping the sixth resource.

17. Information about a time domain offset of the sixth resource relative to the fifth resource.

18. Information about a resource that does not overlap the fifth resource.

19. An indication that the first terminal device has resource reservation.

20. Information about a resource reserved by the first terminal device.

21. An indication that the first terminal device may perform retransmission.

22. A maximum quantity of retransmission times of the first terminal device.

23. A time interval between initial transmission and retransmission of the first terminal device.

24. Frequency domain information of the initial transmission and frequency domain information of the retransmission of the first terminal device.

25. A time offset of a time domain position of the sixth resource relative to the time domain position at which the first terminal device sends the third information.

Content carried in the third information is similar to content carried in the first information in the embodiment shown in FIG. 2A. For an example, refer to the descriptions of the first information in the embodiment shown in FIG. 2A. Details are not described herein again.

Optionally, in this embodiment, the first terminal device may send the third information to the third terminal device in a plurality of manners. The following provides an example for description.

1. The first terminal device sends the third information to the third terminal device by using physical layer signaling.

2. The first terminal device sends the third information to the third terminal device by using RRC signaling.

3. The first terminal device sends the third information to the third terminal device by using MAC signaling.

The foregoing three manners are similar to the manner in which the first terminal device sends the first information to the network device in step 202 shown in FIG. 2A. For details, refer to the related descriptions in step 202 shown in FIG. 2A.

4. The first terminal device may send the third information to the third terminal device by using SCI.

Optionally, after receiving the third information, the third terminal device may determine any one or more of the following content: information indicating that the third terminal device may determine that the first terminal device releases the sixth resource, the sixth resource released by the first terminal device, and information indicating that the third terminal device determines time for the first terminal device to release the sixth resource. In this way, the third terminal device may select the sixth resource for transmission, to improve resource utilization.

Figure 3C:
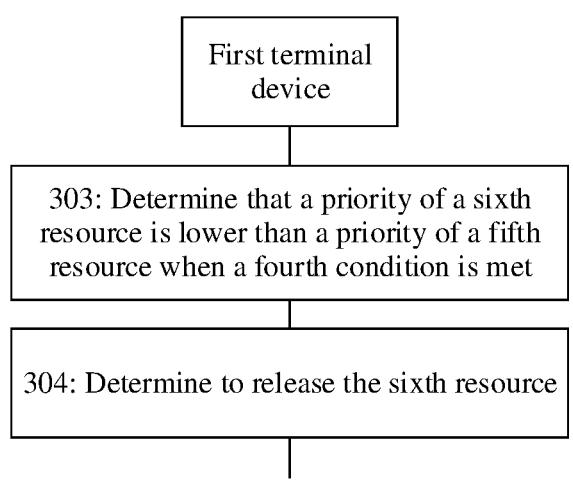
FIG. 3C is a schematic diagram of another embodiment of a communication processing method.

In this embodiment, before, when, or after the first terminal device reselects the fourth resource, the first terminal device may determine to release the sixth resource. A determining manner is described by using the embodiment shown in FIG. 3C. As shown in FIG. 3C, the method includes the following steps.

303: The first terminal device determines that the priority of the sixth resource is lower than the priority of the fifth resource when a fourth condition is met.

The fourth condition includes any one or more of the following content:

1. A priority of sidelink transmission for the first mode is higher than a priority of sidelink transmission for the second mode.
2. A priority of uplink transmission is higher than the priority of the sidelink transmission for the second mode.
3. A priority of downlink transmission is higher than the priority of the sidelink transmission for the second mode.
4. A priority of a service or data transmitted on the fifth resource is higher than a priority of a service transmitted on the sixth resource.
5. Priority information of the service or the data transmitted on the fifth resource is greater than or equal to or is less than or equal to a second threshold.
6. Priority information of the service or the data transmitted on the sixth resource is greater than or equal to or is less than or equal to a third threshold.
7. A priority of the fifth resource is higher than a priority of the sixth resource.
8. A measurement result for the first mode of the sidelink is higher than a measurement result for the second mode of the sidelink.
9. A measurement result of the uplink is higher than the measurement result for the second mode of the sidelink.
10. A measurement result of the downlink is higher than the measurement result for the second mode of the sidelink.
11. The measurement result for the first mode of the sidelink is greater than or equal to or is less than or equal to a fourth threshold.
12. The measurement result of the uplink is greater than or equal to or is less than or equal to the fourth threshold.
13. The measurement result of the downlink is greater than or equal to or is less than or equal to the fourth threshold.
14. The measurement result for the second mode of the sidelink is greater than or less than a fifth threshold.
15. A measurement result of the fifth resource is higher than a measurement result of the sixth resource.
16. The measurement result of the fifth resource is greater than or equal to or is less than or equal to the fourth threshold.
17. The measurement result of the sixth resource is greater than or equal to or is less than or equal to the fifth threshold.
18. Priority information of the sidelink transmission for the first mode is greater than or equal to or is less than or equal to a sixth threshold.
19. Priority information of the uplink transmission is greater than or equal to or is less than or equal to the sixth threshold.
20. Priority information of the downlink transmission is greater than or equal to or is less than or equal to the sixth threshold.
21. Priority information of the sidelink transmission for the second mode is greater than or equal to or is less than or equal to the sixth threshold.
22. The fifth resource includes a resource shared by the first terminal device and another terminal device and the fifth resource is not used, where the resource shared by the first terminal device and the another terminal device includes a first-type configured grant resource and/or a second-mode resource of the sidelink, and the first-type configured grant includes a sidelink resource and/or an uplink resource that are/is provided by the network device by using RRC signaling.
23. The fifth resource includes a dedicated resource of the first terminal device.
24. A start time domain position of the fifth resource is before or after a start time domain position of the sixth resource.
25. The fifth resource includes a periodic third time-frequency resource, the sixth resource includes a periodic fourth time-frequency resource, and a periodicity of the third time-frequency resource is greater than or less than a periodicity of the fourth time-frequency resource.
26. The fifth resource includes the periodic third time-frequency resource, the sixth resource includes the periodic fourth time-frequency resource, and a time interval between two adjacent third time-frequency resources is greater than or less than a time interval between two adjacent fourth time-frequency resources.
27. A size of the third time-frequency resource is less than or greater than a size of the fourth time-frequency resource.
28. A proportion of an overlapping resource in the sixth resource to the sixth resource is greater than or less than a proportion of an overlapping resource in the fifth resource to the fifth resource.

The priority rule described in the fourth condition is similar to the priority rule described in the second condition in the embodiment shown in FIG. 2K. For details, refer to an example of the priority rule described in the second condition in the embodiment shown in FIG. 2K. Details are not described herein again.

304: The first terminal device determines the sixth resource.

Optionally, the priority of the sixth resource is lower than the priority of the fifth resource.

It should be noted that, in this embodiment, the rule used to determine that the priority of the sixth resource is lower than the priority of the fifth resource in the fourth condition may be separately applied to a scenario in which the first terminal device needs to determine a priority of a resource, or may be applied to another scenario in which a priority of a resource needs to be determined and then corresponding processing is performed.

In this embodiment, the first terminal device reselects the fourth resource when the third condition is met, where the fourth resource is the second-mode resource of the sidelink, and the second-mode resource of the sidelink includes a sidelink resource selected, contended for, or sensed by the terminal device and/or a sidelink resource reserved by the terminal device. The sidelink is a wireless direct communication link between the first terminal device and the second terminal device. A condition for triggering the first terminal device to reselect the second-mode resource of the sidelink may be set, for example, when any one or more of the first-mode resource of the sidelink, the resource of the uplink, and the resource of the downlink overlap a selected or reserved second-mode resource of the sidelink, the first terminal device may reselect the second-mode resource of the sidelink in this case, to improve transmission performance of the sidelink transmission for the first mode, the uplink transmission, the downlink transmission, and the sidelink transmission for the second mode.

Figure 4A:
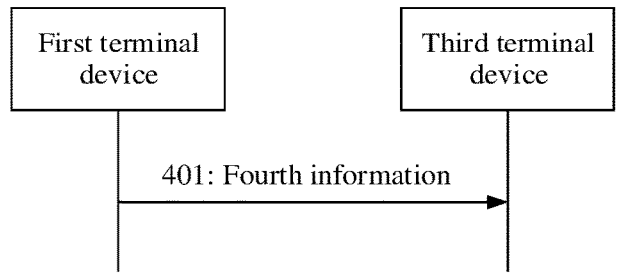
FIG. 4A is a schematic diagram of another embodiment of a communication processing method.

FIG. 4A is a schematic diagram of another embodiment of a communication processing method. As shown in FIG. 4A, the method includes the following steps.

401: A first terminal device sends fourth information to a third terminal device.

The fourth information is used to indicate that the first terminal device releases a seventh resource and/or indicate the seventh resource released by the first terminal device, the seventh resource includes a resource of a sidelink, and the sidelink is a wireless direct communication link between the first terminal device and a second terminal device.

Optionally, the seventh resource includes a first-mode resource and/or a second-mode resource of the sidelink.

Optionally, after the third terminal device receives the fourth information, the third terminal device may determine any one or more of the following content: information indicating that the third terminal device may determine that the first terminal device releases the seventh resource, the seventh resource released by the first terminal device, and information indicating that the third terminal device determines time for the first terminal device to release the seventh resource. The third terminal device may select the seventh resource for transmission, to improve resource utilization.

For example, the third terminal device is a general terminal device, and may be any one or more terminal devices other than the first terminal device.

Optionally, this embodiment is applied to a scenario in which the seventh resource overlaps an eighth resource in time domain, where the seventh resource is the first-mode resource of the sidelink and/or the second-mode resource of the sidelink, and the eighth resource is any one or more of the first-mode resource of the sidelink, the second-mode resource of the sidelink, a resource of an uplink between the first terminal device and a network device, and a resource of a downlink between the first terminal device and the network device.

Figure 4B:
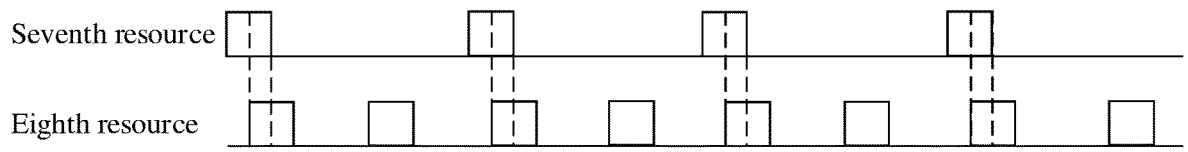
FIG. 4B is a schematic diagram of another scenario of a communication processing method according to an embodiment.
Figure 4C:
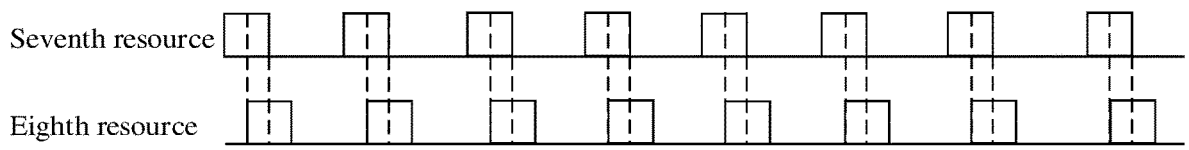
FIG. 4C is a schematic diagram of another scenario of a communication processing method according to an embodiment.

For example, as shown in FIG. 4B, the seventh resource is a second-type configured grant resource of the sidelink, and the eighth resource is a second-mode resource of the sidelink. It can be learned from FIG. 4B that the second-type configured grant resource of the sidelink overlaps the second-mode resource of the sidelink. For another example, as shown in FIG. 4C, the seventh resource is a first-type configured grant resource of the sidelink, and the eighth resource is a second-type configured grant resource of the sidelink. It can be learned from FIG. 4C that the first-type configured grant resource of the sidelink overlaps the second-type configured grant resource of the sidelink. Other scenarios are similar and are not described one by one herein.

The fourth information may be understood as the second information in the embodiment shown in FIG. 2A or may be the third information in step 302 in the embodiment shown in FIG. 3A. The embodiment shown in FIG. 2A describes an implementation in which the first terminal device determines to release the first-mode resource of the sidelink and then sends the second information to the third terminal device. However, the embodiment shown in FIG. 3A describes an implementation in which the first terminal device determines to release the second-mode resource of the sidelink and then sends the third information to the third terminal device. However, in this embodiment, whether the first terminal device determines to release the first-mode resource of the sidelink or the second-mode resource of the sidelink is not distinguished, but an implementation in which the first terminal device determines to release the seventh resource of the sidelink, where the seventh resource may be the first-mode resource of the sidelink and/or the second-mode resource of the sidelink, and then sends the fourth information to the network device is used. The fourth information includes any one or more of the following:

1. An indication that the first terminal device is to release the seventh resource.

2. Information about the seventh resource.

Optionally, the information about the seven resources includes any one or more of the following content: resource type information of the seventh resource, time domain information of the seventh resource, frequency domain information of the seventh resource, a periodicity or an interval of the seventh resource, and duration of the seventh resource.

Optionally, the time domain information of the seventh resource includes time domain position information of the seventh resource and/or time domain length information of the seventh resource.

Optionally, the frequency domain information of the seventh resource includes frequency domain bandwidth information and/or frequency domain position information of the seventh resource.

3. Time information of releasing the seventh resource by the first terminal device.

Optionally, the time information includes time at which the first terminal device releases the seventh resource, information about releasing the $1^{st}$ time-frequency resource of the seventh resource by the first terminal device, and a time interval between the time at which the first terminal device releases the seventh resource and time at which the first terminal device sends the fourth information.

Optionally, the information about releasing the $1^{st}$ time-frequency resource of the first resource by the first terminal device includes: time domain information and/or frequency domain information of releasing the $1^{st}$ time-frequency resource of the first resource by the first terminal device.

4. An indication that the first terminal device senses, selects, or obtains, through contention, the seventh resource.

5. An indication that the first terminal device reserves the seventh resource.

6. An indication that the eighth resource overlaps the seventh resource in time domain.

7. Information about the eighth resource.

Optionally, the information about the eighth resource includes any one or more of the following content: resource type information of the eighth resource, time domain information of the eighth resource, frequency domain information of the eighth resource, a periodicity or a time interval of the eighth resource, and duration of the eighth resource.

Optionally, the time domain information of the eighth resource includes time domain length information of the eighth resource and/or time domain position information of the eighth resource.

Optionally, the frequency domain information of the eighth resource includes frequency domain position information of the eighth resource and frequency domain bandwidth information of the seventh resource.

8. A periodicity or a time interval of a service transmitted on the seventh resource.

9. A periodicity or a time interval of a service transmitted on the eighth resource.

10. A time offset of a time domain position of the eighth resource relative to a time domain position at which the first terminal device sends the fourth information.

11. Priority information of a service or data transmitted on the seventh resource.

12. Priority information of a service or data transmitted on the eighth resource.

13. Priority information of the seventh resource.

14. Priority information of the eighth resource.

15. An indication that a priority of the seventh resource is lower than a priority of the eighth resource.

16. Information of the seventh resource overlapping the eighth resource.

17. Information about a time domain offset of the seventh resource relative to the eighth resource.

18. Information about a resource that does not overlap the eighth resource.

19. An indication that the first terminal device has resource reservation.

20. Information about a resource reserved by the first terminal device.

21. An indication that the first terminal device may perform retransmission.

22. A maximum quantity of retransmission times of the first terminal device.

23. A time interval between initial transmission and retransmission of the first terminal device.

24. Frequency domain information of the initial transmission and frequency domain information of the retransmission of the first terminal device.

25. A time offset of a time domain position of the seventh resource relative to the time domain position at which the first terminal device sends the fourth information.

Content carried in the fourth information is similar to content carried in the first information in the embodiment shown in FIG. 2A and may be understood with reference to an example of the content carried in the first information in the embodiment shown in FIG. 2A. Details are not described herein again.

Optionally, that a first terminal device sends fourth information to a third terminal device includes: The first terminal device sends the fourth information to the third terminal device when a fifth condition is met.

The fifth condition includes any one or more of the following content:

1. The seventh resource overlaps the eighth resource in time domain.

Optionally, that the seventh resource overlaps the eighth resource in time domain includes the following two possible implementations:

a. The seventh resource periodically overlaps the eighth resource in time domain.

b. The seventh resource overlaps the eighth resource for N times in time domain, where N is an integer greater than 0.

2. The seventh resource is to overlap the eighth resource in time domain.

Optionally, that the seventh resource is to overlap the eighth resource in time domain includes the following two possible implementations:

a. The seventh resource is to periodically overlap the eighth resource in time domain.

b. The seventh resource is to overlap the eighth resource for N times in time domain, where N is an integer greater than 0.

3. The seventh resource overrides the eighth resource or the eighth resource overrides the seventh resource.

Optionally, that the seventh resource overrides the eighth resource or the eighth resource overrides the seventh resource includes the following two possible implementations:

a. The eighth resource periodically overrides the seventh resource or the seventh resource periodically overrides the eighth resource.

b. The eighth resource overrides the seventh resource for N times or the seventh resource overrides the eighth resource for N times, where N is an integer greater than 0.

4. The eighth resource is to override the seventh resource or the seventh resource is to override the eighth resource.

Optionally, that the eighth resource is to override the seventh resource or the seventh resource is to override the eighth resource includes the following two possible implementations:

a. The eighth resource is to periodically override the seventh resource or the seventh resource is to periodically override the eighth resource.

b. The eighth resource is to override the seventh resource for N times or the seventh resource is to override the eighth resource for N times, where N is an integer greater than 0.

5. Third duration is greater than an eighth threshold.

Optionally, the eighth threshold may be preconfigured, configured by the network device for the first terminal device, specified in a communication protocol, determined by the network device according to a rule and notified to the first terminal device, or defined at delivery of the first terminal device.

Optionally, the third duration is a time difference between the time domain resource of the seventh resource and a moment at which the first terminal device releases the seventh resource or is a time difference between the time domain position of the seventh resource and the time domain position at which the first terminal device sends the fourth information.

6. The seventh resource includes a dedicated resource of the first terminal device, where the dedicated resource includes a dynamic grant resource of the sidelink and a second-type configured grant resource of the sidelink.

7. The seventh resource includes a periodic time-frequency resource.

Optionally, the periodic time-frequency resource includes any one or more of the following content: the first-type configured grant resource of the sidelink, the second-type configured grant resource of the sidelink, and the second-mode resource of the sidelink.

8. The first terminal device has a resource of the sidelink.

Optionally, that the first terminal device has a resource of the sidelink includes the first terminal device has a sidelink resource that can accommodate the fourth information.

Content carried in the fourth information is similar to content carried in the first condition. For details, refer to the foregoing example of the first condition. Details are not described herein again.

Optionally, in this embodiment, the first terminal device may send the fourth information to the third terminal device in a plurality of manners. The following provides an example for description.

1. The first terminal device sends the fourth information to the third terminal device by using physical layer signaling.

2. The first terminal device sends the fourth information to the third terminal device by using RRC signaling.

3. The first terminal device sends the fourth information to the third terminal device by using MAC signaling.

The foregoing three manners are similar to the manner in which the first terminal device sends the first information to the network device in step 202 shown in FIG. 2A. For details, refer to the related descriptions in step 202 shown in FIG. 2A.

4. The first terminal device may send the fourth information to the third terminal device by using SCI.

Optionally, after the third terminal device receives the fourth information, the third terminal device may determine any one or more of the following content: information indicating that the third terminal device may determine that the first terminal device releases the seventh resource, the seventh resource released by the first terminal device, and information indicating that the third terminal device determines time for the first terminal device to release the seventh resource. In this way, the third terminal device may select the seventh resource for transmission, to improve resource utilization.

In addition, the first terminal device may further send the fourth information to the third terminal device by using the SCI.

Figure 4D:
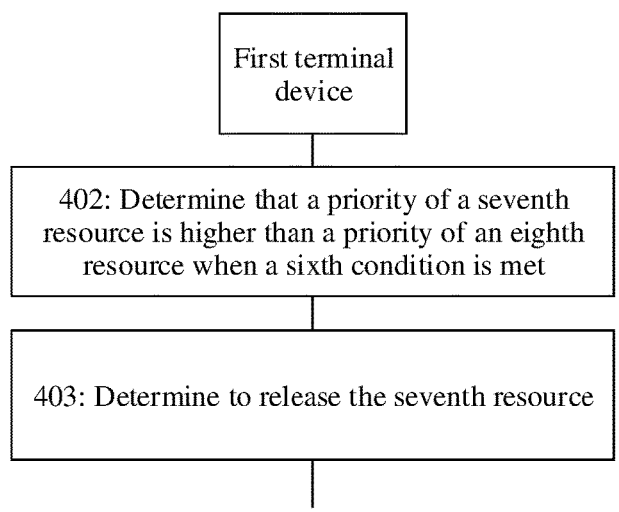
FIG. 4D is a schematic diagram of another embodiment of a communication processing method.

In this embodiment, before the first terminal device sends the fourth information to the network device, the first terminal device may determine to release the seventh resource. For a determining manner, refer to FIG. 4D. FIG. 4D is a schematic diagram of another embodiment of a communication processing method according to an embodiment. In FIG. 4D, the method includes the following steps.

402: The first terminal device determines that the priority of the seventh resource is lower than the priority of the eighth resource when a sixth condition is met.

The sixth condition includes any one or more of the following content:

1. A priority of sidelink transmission for the first mode is higher than a priority of sidelink transmission for the second mode.
2. A priority of uplink transmission is higher than the priority of the sidelink transmission for the second mode.
3. A priority of downlink transmission is higher than the priority of the sidelink transmission for the second mode.
4. A priority of a service or data transmitted on the eighth resource is higher than a priority of a service or data transmitted on the seventh resource.
5. Priority information of the service or the data transmitted on the seventh resource is greater than or equal to or is less than or equal to a second threshold.
6. Priority information of the service or the data transmitted on the eighth resource is greater than or equal to or is less than or equal to a third threshold.
7. The priority of the eighth resource is higher than the priority of the seventh resource.
8. A measurement result for the first mode of the sidelink is higher than a measurement result for the second mode of the sidelink.
9. A measurement result of the uplink is higher than the measurement result for the second mode of the sidelink.
10. A measurement result of the downlink is higher than the measurement result for the second mode of the sidelink.
11. The measurement result for the first mode of the sidelink is greater than or equal to or is less than or equal to a fourth threshold.
12. The measurement result of the uplink is greater than or equal to or is less than or equal to the fourth threshold.
13. The measurement result of the downlink is greater than or equal to or is less than or equal to the fourth threshold.
14. The measurement result for the second mode of the sidelink is greater than or less than a fifth threshold.
15. A measurement result of the eighth resource is higher than a measurement result of the seventh resource.
16. The measurement result of the seventh resource is greater than or equal to or is less than or equal to the fourth threshold.
17. The measurement result of the eighth resource is greater than or equal to or is less than or equal to the fifth threshold.
18. Priority information of the sidelink transmission for the first mode is greater than or equal to or is less than or equal to a sixth threshold.
19. Priority information of the uplink transmission is greater than or equal to or is less than or equal to the sixth threshold.
20. Priority information of the downlink transmission is greater than or equal to or is less than or equal to the sixth threshold.
21. Priority information of the sidelink transmission for the second mode is greater than or equal to or is less than or equal to the sixth threshold.
22. The eighth resource includes a resource shared by the first terminal device and another terminal device and the eighth resource is not used.
23. A start time domain position of the eighth resource is before or after a start time domain position of the seventh resource.
24. The eighth resource includes a periodic fifth time-frequency resource, the seventh resource includes a periodic sixth time-frequency resource, and a periodicity of the fifth time-frequency resource is greater than or less than a periodicity of the sixth time-frequency resource.
25. The eighth resource includes the periodic fifth time-frequency resource, the seventh resource includes the periodic sixth time-frequency resource, and a time interval between two adjacent fifth time-frequency resources is greater than or less than a time interval between two adjacent sixth time-frequency resources.
26. A size of the eighth resource is less than or greater than a size of the seventh resource.
27. A proportion of an overlapping resource in the seventh resource to the seventh resource is greater than or less than a proportion of an overlapping resource in the eighth resource to the eighth resource.
28. A time offset of a time domain position of the seventh resource relative to a time domain position at which the first terminal device sends the fourth information.

The priority rule described in the sixth condition is similar to the priority rule described in the second condition described in FIG. 2K. For details, refer to an example of the priority rule described in the second condition in FIG. 2K. Details are not described herein again.

403: The first terminal device determines to release the seventh resource.

In this embodiment, the first terminal device sends the fourth information to the third terminal device, where the fourth information is used to indicate that the first terminal device releases the seventh resource and/or indicate the seventh resource released by the first terminal device, and the seventh resource includes the resource of the sidelink. The sidelink is a wireless direct communication link between the first terminal device and the second terminal device. It can be learned that, after determining to release the seventh resource, the first terminal device may send the fourth information to a surrounding terminal device, to notify the surrounding terminal device of information about the seventh resource released by the first terminal device. In this way, the surrounding terminal device may select the seventh resource, to avoid or reduce waste of the seventh resource and improve resource utilization.

In this embodiment, to avoid or reduce a problem that a resource scheduled by the network device for the first terminal device overlaps, in time domain, a resource that is selected, contended for, or sensed, and/or reserved by the first terminal device, or to avoid or reduce a problem that two second-mode resources of the sidelink of the first terminal device overlap, this embodiment provides a plurality of solutions. The following provides an example for description.

Manner 1: The first terminal device selects a second-mode resource of the sidelink based on a status of a resource that has been scheduled by the network device for the first terminal device, to avoid or reduce overlap in time domain between the resource scheduled by the network device for the first terminal device and the resource that is selected, contended for, or sensed, and/or reserved by the first terminal device. Alternatively, the first terminal device selects the other second-mode resource of the sidelink based on a second-mode resource of the sidelink that has been obtained by the first terminal device, to avoid or reduce overlap between the two second-mode resources of the sidelink. This manner is described by using the embodiment shown in FIG. 5A.

Manner 2: The first terminal device reports, to the network device, information about a second-mode resource of the sidelink obtained by the terminal device and/or information used by the first terminal device to request a resource from the network device, and the network device schedules a resource for the first terminal device based on the information reported by the terminal device, to avoid or reduce overlap in time domain between the resource scheduled by the network device for the first terminal device and the resource that is selected, contended for, or sensed, and/or reserved by the first terminal device. This manner is described by using the embodiment shown in FIG. 6A.

Manner 3: The first terminal device selects, contends for, or senses, and/or reserves a corresponding resource of the sidelink based on a transmission configuration, and the network device schedules a corresponding resource for the terminal device based on the transmission configuration, where the transmission configuration includes a first dedicated time domain resource configuration and/or a second dedicated time domain resource configuration. This manner is described by using an embodiment shown in FIG. 7A and an embodiment shown in FIG. 8A.

Figure 5A:
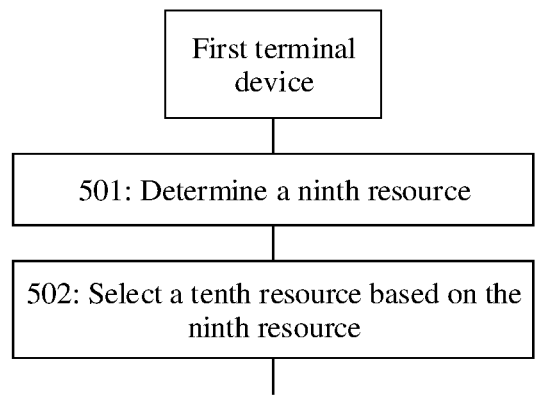
FIG. 5A is a schematic diagram of another embodiment of a communication processing method.

FIG. 5A is a schematic diagram of another embodiment of a communication processing method according to an embodiment. In FIG. 5A, the method includes the following steps.

501: A first terminal device determines a ninth resource.

The ninth resource includes any one or more of the following content:

1. A resource of a sidelink.

The sidelink is a wireless direct communication link between the first terminal device and a second terminal device.

Optionally, the resource of the sidelink includes a first-mode resource of the sidelink and/or a second-mode resource of the sidelink.

The first-mode resource of the sidelink includes a configured grant resource of the sidelink and/or a dynamic grant resource of the sidelink. The configured grant resource includes a first-type configured grant resource of the sidelink and/or a second-type configured grant resource of the sidelink.

2. A resource of an uplink.

The uplink is a link for communication between the first terminal device and a network device.

Optionally, the resource of the uplink includes a configured grant resource of the uplink and/or a dynamic grant resource of the uplink. The configured grant resource of the uplink includes a first-type configured grant resource of the uplink and/or a second-type configured grant resource of the uplink.

3. A resource of a downlink.

The downlink is a link for communication between the first terminal device and the network device.

Optionally, the resource of the downlink includes a semi-persistently allocated resource of the downlink and/or a dynamically allocated resource of the downlink.

Figure 5B:
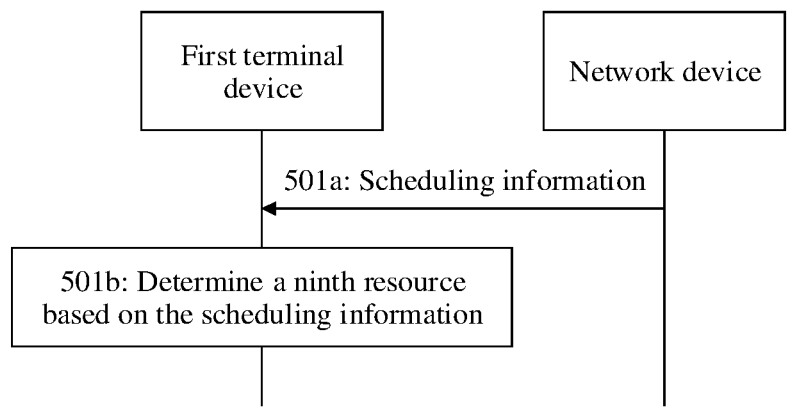
FIG. 5B is a schematic diagram of another embodiment of a communication processing method.

Optionally, the following describes, by using FIG. 5B, a determining manner in which the first terminal device determines the ninth resource. Refer to FIG. 5B. An example in which the ninth resource is the first-mode resource of the sidelink is used for description when the determining manner is described. The method includes the following steps.

501*a*: The first terminal device receives scheduling information sent by the network device.

The first terminal device receives, before a sensing window ends, the scheduling information sent by the network device, where a resource scheduled by the network device by using the scheduling information exists in a selection window.

Optionally, the first terminal device does not receive, at and before an end boundary of the sensing window, information that is sent by the network device and that is about reconfiguration, deactivation, or release of the resource scheduled by using the scheduling information.

Optionally, the first terminal device selects, contends for, or senses, and/or reserves a resource based on a sensing result in the sensing window, where the resource is used for sidelink transmission for the second mode. Time or a length of the sensing window may be one second or another value and is not limited. The time or the length of the sensing window may be configured, configured by the network device, preconfigured, defined in a protocol, determined according to a rule, defined at delivery of UE, or the like.

Optionally, the first terminal device selects, contends for, or senses, and/or reserves a resource in the selection window, where the resource is used for the sidelink transmission for the second mode. Time of the selection window may be one second or another value and is not limited. The time or a length of the selection window may be configured, configured by the network device, preconfigured, defined in a protocol, determined according to a rule, defined at delivery of the UE, or the like.

Optionally, the sensing window and the selection window may or may not be adjacent, and this is not limited. If the sensing window and the selection window are not adjacent, an interval between the sensing window and the selection window may be configured, configured by the network device, preconfigured, defined in a protocol, determined according to a rule, defined at delivery of the UE, or the like.

Optionally, the first terminal device may receive the scheduling information in any one or more of the following manners: DCI, a PDCCH, and RRC signaling.

Optionally, when selecting a tenth resource for a second mode for the sidelink, the first terminal device can consider whether to exclude the resource scheduled by using the scheduling information only when the first terminal device receives, before the sensing window ends, the scheduling information sent by the network device and the resource scheduled by using the scheduling information exists in the selection window. On the contrary, when selecting a tenth resource, the first terminal device cannot consider the resource scheduled by using the scheduling information.

The following provides descriptions with reference to an example in which the ninth resource is the first-mode resource of the sidelink (where the first-mode resource of the sidelink includes three different types of resources, which are the first-type configured grant resource (a type1 CG resource) of the sidelink, the second-type configured grant resource (a type2 CG resource) of the sidelink, and the dynamic grant resource (a DG resource) of the sidelink, and the scheduling information is described below based on resource types).

Figure 5C:
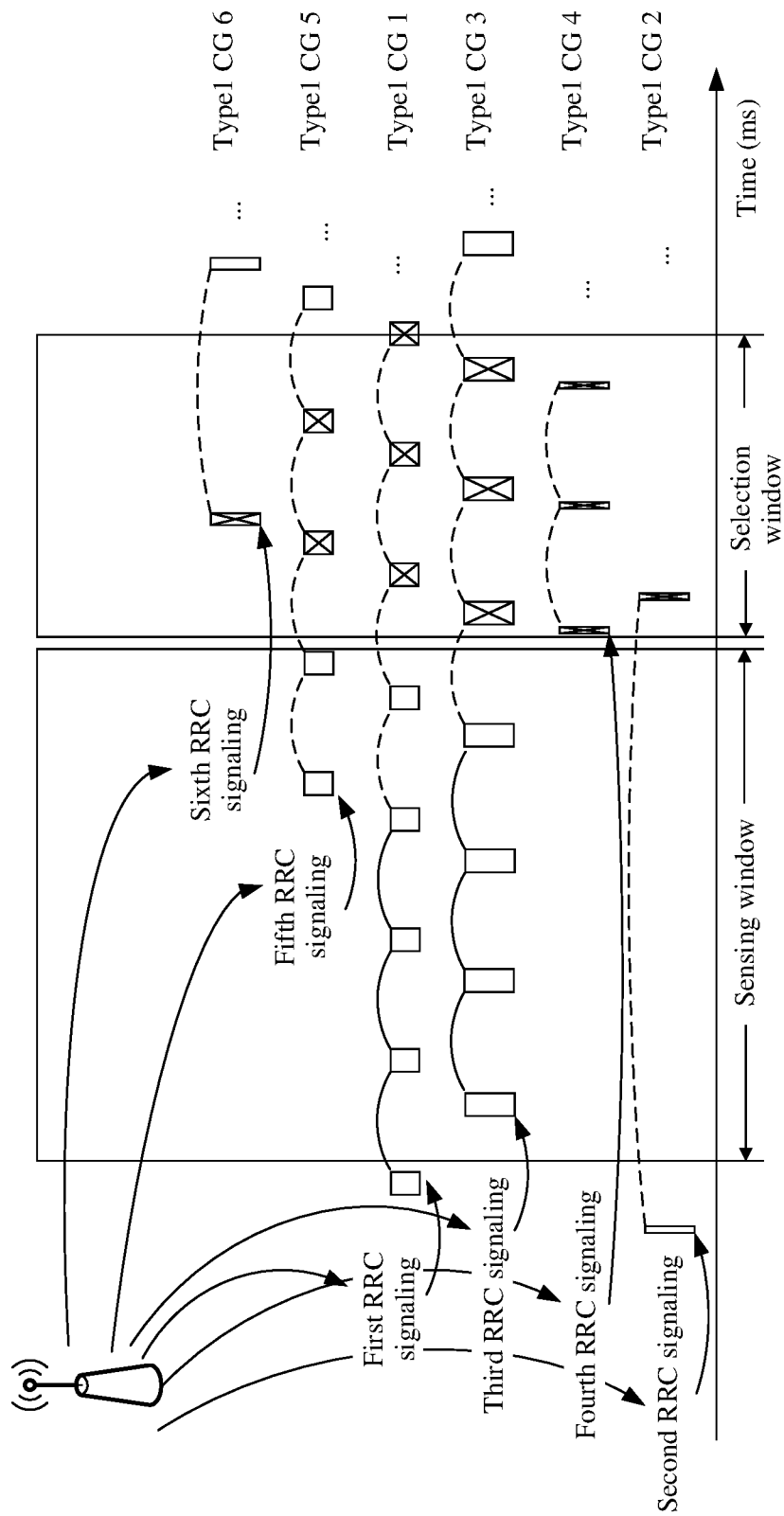
FIG. 5C is a schematic diagram of another scenario of a communication processing method according to an embodiment.

1. With reference to FIG. 5C, impact of the first-type configured grant resource of the sidelink on the selection of the tenth resource by the first terminal device is described: At and before the end boundary of the sensing window of the first terminal device, the first terminal device receives scheduling of the first-type configured grant resource of the sidelink, and the first-type configured grant resource of the sidelink exists in the selection window (selection window) of the first terminal device. In this case, when selecting the tenth resource, the network device may consider excluding the first-type configured grant resource of the sidelink, excluding a resource whose priority is higher than that of the tenth resource in the scheduled first-type configured grant resource of the sidelink, excluding any time-frequency resource in time domain in which the first-type configured grant resource of the sidelink is located, or excluding any time-frequency resource in time domain in which a resource whose priority is higher than that of the tenth resource is located in the first-type configured grant resource of the sidelink, which may be performed in a preset exclusion manner. There may be six cases. In the six cases, the first terminal device may determine a scheduled resource, and then the first terminal device may select the tenth resource for the second mode for the sidelink based on the scheduled resource. The following describes the six possible cases with reference to FIG. 5C:

Optionally, at and before the end boundary of the sensing window, the network device does not reconfigure, deactivate, or release the first-type configured grant resource of the sidelink.

a. The first terminal device receives, before the sensing window, first RRC signaling sent by the network device. The first RRC signaling is used by the network device to schedule a first-type configured grant resource (for example, a type1 CG1 resource) of the sidelink for the first terminal device. The type1 CG1 resource periodically exists, the type1 CG1 resource scheduled by the network device is included before the sensing window and in the sensing window, and the type1 CG1 resource scheduled by the network device exists in the selection window. For details, refer to the type1 CG1 resource in FIG. 5C.

b. The first terminal device receives, before the sensing window, second RRC signaling sent by the network device. The second RRC signaling is used by the network device to schedule a first-type configured grant resource (for example, a type1 CG2 resource) of the sidelink for the first terminal device. The type1 CG2 resource periodically exists, the type1 CG2 resource scheduled by the network device is included before the sensing window and is not included in the sensing window, and the type1 CG2 resource scheduled by the network device exists in the selection window. For details, refer to the type1 CG2 resource in FIG. 5C.

c. The first terminal device receives, before the sensing window, third RRC signaling sent by the network device. The third RRC signaling is used by the network device to schedule a first-type configured grant resource (for example, a type1 CG3 resource) of the sidelink for the first terminal device. The type1 CG3 resource periodically exists, the type1 CG3 resource scheduled by the network device is included in the sensing window and is not included before the sensing window, and the type1 CG3 resource scheduled by the network device exists in the selection window. For details, refer to the type1 CG3 resource in FIG. 5C.

d. The first terminal device receives, before the sensing window, fourth RRC signaling sent by the network device. The fourth RRC signaling is used by the network device to schedule a first-type configured grant resource (for example, a type1 CG4 resource) of the sidelink for the first terminal device. The type1 CG4 resource periodically exists, the type1 CG4 resource scheduled by the network device is not included before the sensing window and in the sensing window, and the type1 CG4 resource scheduled by the network device exists in the selection window. For details, refer to the type1 CG4 resource in FIG. 5C.

e. The first terminal device receives, in the sensing window, fifth RRC signaling sent by the network device. The fifth RRC signaling is used by the network device to schedule a first-type configured grant resource (for example, a type1 CG5 resource) of the sidelink for the first terminal device. The type1 CG5 resource periodically exists, the type1 CG5 scheduled by the network device is included in the sensing window, and the type1 CG5 resource scheduled by the network device exists in the selection window. For details, refer to the type1 CG5 resource in FIG. 5C.

f. The first terminal device receives, in the sensing window, sixth RRC signaling sent by the network device. The sixth RRC signaling is used by the network device to schedule a first-type configured grant resource (for example, a type1 CG6 resource) of the sidelink for the first terminal device. The type1 CG6 resource periodically exists,
   the type1 CG6 resource scheduled by the network device
      is not included in the sensing window, and the type1
      CG6 resource scheduled by the network device exists
      in the selection window. For details, refer to the type1
      CG6 resource in FIG. 5C.

Figure 5D:
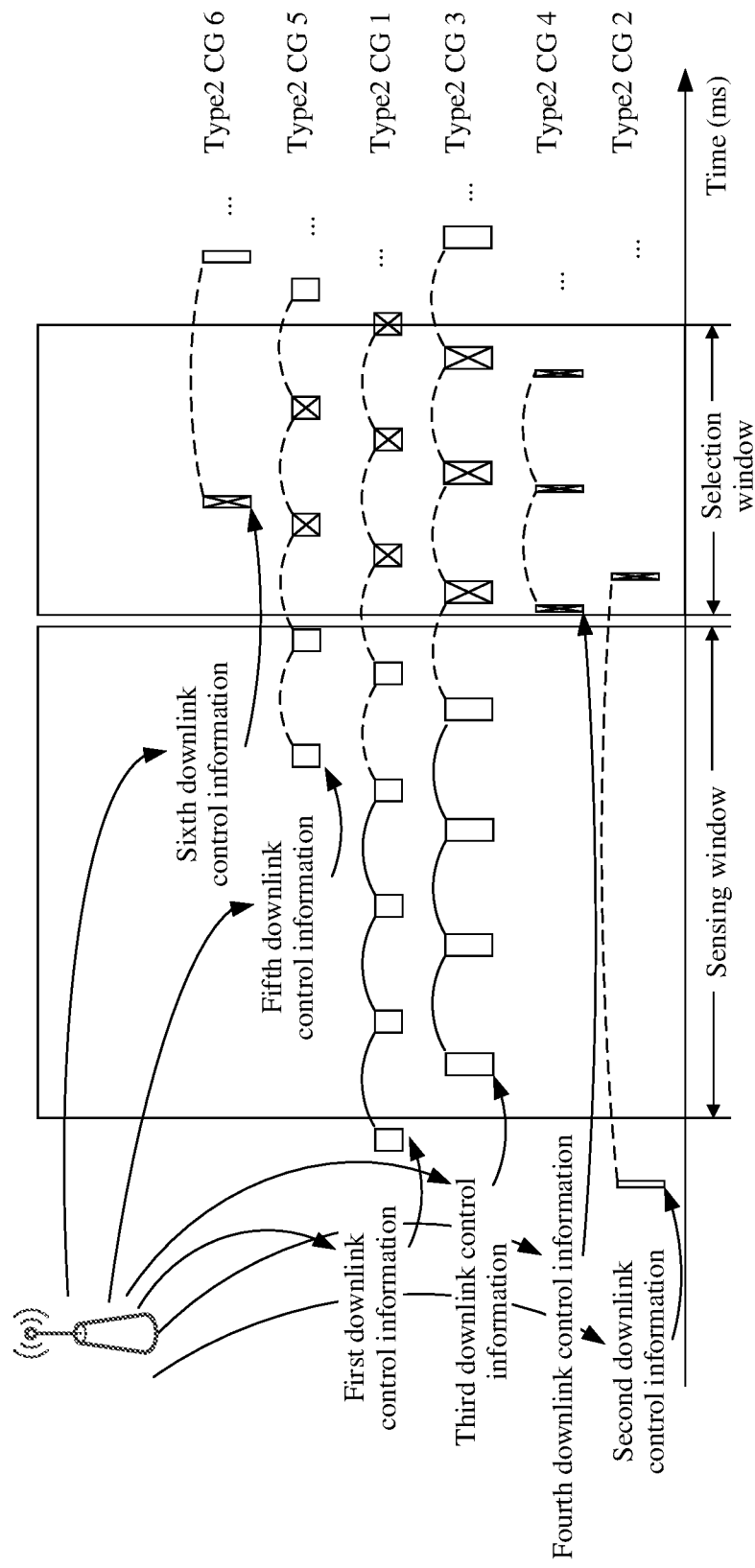
FIG. 5D is a schematic diagram of another scenario of a communication processing method according to an embodiment.

2. With reference to FIG. 5D, impact of the second-type configured grant resource of the sidelink on the selection of the tenth resource by the first terminal device is described: Before the end boundary of the sensing window of the first terminal device, the first terminal device receives scheduling of the second-type configured grant resource of the sidelink, and the second-type configured grant resource of the sidelink exists in the selection window of the first terminal device. In this case, when selecting the tenth resource, the network device may consider excluding the second-type configured grant resource of the sidelink, excluding a resource whose priority is higher than that of the tenth resource in the second-type configured grant resource of the sidelink, excluding any time-frequency resource in time domain in which the second-type configured grant resource of the sidelink is located, or excluding any time-frequency resource in time domain in which a resource whose priority is higher than that of the tenth resource is located in the second-type configured grant resource of the sidelink, which may be performed in a preset exclusion manner. There may be six cases. In the six cases, the first terminal device may determine a scheduled resource, and then the first terminal device may select the tenth resource for the second mode for the sidelink based on the scheduled resource. The following describes six possible cases with reference to FIG. 5D:

Optionally, at and before the end boundary of the sensing window, the network device does not reconfigure, deactivate, or release the second-type configured grant resource of the sidelink.

a. The first terminal device receives, before the sensing window, first DCI/a first PDCCH sent by the network device. The first DCI/the first PDCCH is used by the network device to schedule a second-type configured grant resource (for example, a type2 CG1 resource) of the sidelink for the first terminal device. The type2 CG1 resource periodically exists, the type2 CG1 resource scheduled by the network device is included before the sensing window and in the sensing window, and the type2 CG1 resource scheduled by the network device exists in the selection window. For details, refer to the type2 CG1 resource in FIG. 5D.

b. The first terminal device receives, before the sensing window, second DCI/a second PDCCH sent by the network device. The second DCI/the second PDCCH is used by the network device to schedule a second-type configured grant resource (for example, a type2 CG2 resource) of the sidelink for the first terminal device. The type2 CG2 resource periodically exists, the type2 CG2 resource scheduled by the network device is included before the sensing window and is not included in the sensing window, and the type2 CG2 resource scheduled by the network device exists in the selection window. For details, refer to the type2 CG2 resource in FIG. 5D.

c. The first terminal device receives, before the sensing window, third DCI/a third PDCCH sent by the network device. The third DCI/the third PDCCH is used by the network device to schedule a second-type configured grant resource (for example, a type2 CG3 resource) of the sidelink for the first terminal device. The type2 CG3 resource periodically exists, the type2 CG3 resource scheduled by the network device is included in the sensing window and is not included before the sensing window, and the type2 CG3 resource scheduled by the network device exists in the selection window. For details, refer to the type2 CG3 resource in FIG. 5D.

d. The first terminal device receives, before the sensing window, fourth DCI/a fourth PDCCH sent by the network device. The fourth DCI/the fourth PDCCH is used by the network device to schedule a second-type configured grant resource (for example, a type2 CG4 resource) of the sidelink for the first terminal device. The type2 CG4 resource periodically exists, the type2 CG4 resource scheduled by the network device is not included before the sensing window and in the sensing window, and the type2 CG4 resource scheduled by the network device exists in the selection window. For details, refer to the type2 CG4 resource in FIG. 5D.

e. The first terminal device receives, in the sensing window, fifth DCI/a fifth PDCCH sent by the network device. The fifth DCI/the fifth PDCCH is used by the network device to schedule a second-type configured grant resource (for example, a type2 CG5 resource) of the sidelink for the first terminal device. The type2 CG5 resource periodically exists, the type2 CG5 scheduled by the network device is included in the sensing window, and the type2 CG5 resource scheduled by the network device exists in the selection window. For details, refer to the type2 CG5 resource in FIG. 5D.

f. The first terminal device receives, in the sensing window, sixth DCI/a sixth PDCCH sent by the network device. The sixth DCI/the sixth PDCCH is used by the network device to schedule a second-type configured grant resource (for example, a type2 CG6 resource) of the sidelink for the first terminal device. The type2 CG6 resource periodically exists, the type2 CG6 resource scheduled by the network device is not included in the sensing window, and the type2 CG6 resource scheduled by the network device exists in the selection window. For details, refer to the type2 CG6 resource in FIG. 5D.

Figure 5E:
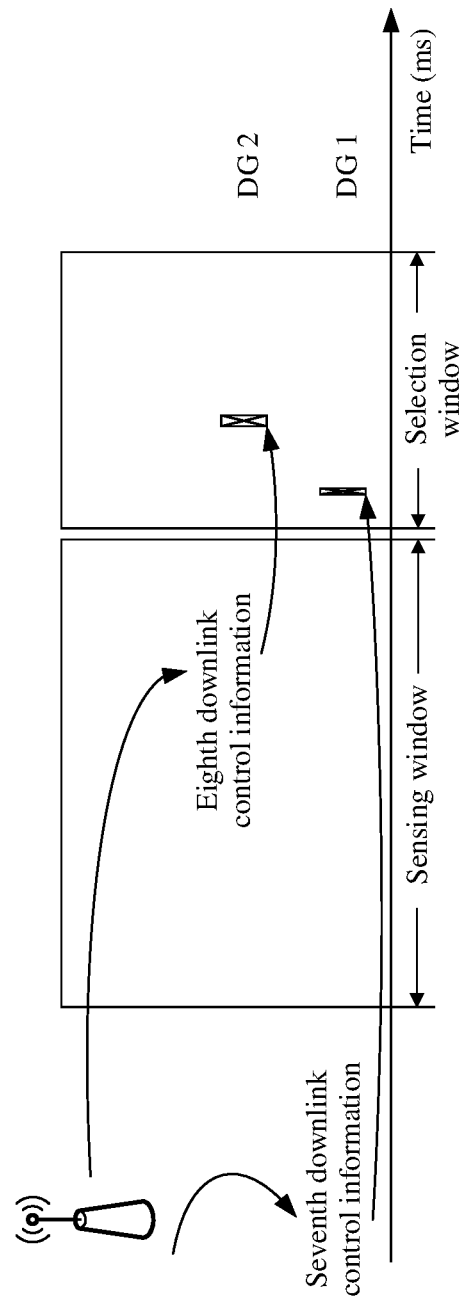
FIG. 5E is a schematic diagram of another scenario of a communication processing method according to an embodiment.

3. With reference to FIG. 5E, impact of the dynamic grant resource of the sidelink on the selection of the tenth resource by the first terminal device is described: At and before the end boundary of the sensing window of the first terminal device, the first terminal device receives scheduling of the dynamic grant resource of the sidelink, and the dynamic grant resource of the sidelink exists in the selection window of the first terminal device. In this case, when selecting the tenth resource, the network device may consider excluding the dynamic grant resource of the sidelink, excluding a resource whose priority is higher than that of the tenth resource in the dynamic grant resource of the sidelink, excluding any time-frequency resource in time domain in which the dynamic grant resource of the sidelink is located, or excluding any time-frequency resource in time domain in which a resource whose priority is higher than that of the tenth resource is located in the dynamic grant resource of the sidelink, which may be performed in a preset exclusion manner. There may be two cases. In the two cases, the first terminal device may determine a scheduled resource, and then the first terminal device may select the tenth resource for the second mode for the sidelink based on the scheduled resource. The following describes the two possible cases with reference to FIG. 5E:

Optionally, at and before the end boundary of the sensing window, the network device does not reconfigure, deactivate, or release the dynamic grant resource of the sidelink.

a. The first terminal device receives, before the sensing window, seventh DCI/a seventh PDCCH sent by the network device. The seventh DCI/the seventh PDCCH is used by the network device to schedule a dynamic grant resource (for example, a DG1 resource) of the sidelink for the first terminal device, and the DG11 resource configured by the network device exists in the selection window. For details, refer to the DG11 resource in FIG. 5E.

b. The first terminal device receives, in the sensing window, eighth DCI/an eighth PDCCH sent by the network device. The eighth DCI/the eighth PDCCH is used by the network device to schedule a dynamic grant resource (for example, a DG2 resource) of the sidelink for the first terminal device, and the DG2 resource configured by the network device exists in the selection window. For details, refer to the DG2 resource in FIG. 5E.

501b: The first terminal device determines the ninth resource.

Optionally, the first terminal device determines the ninth resource based on the scheduling information.

It can be learned from step 501a that the first terminal device may determine the scheduled ninth resource based on the scheduling information.

502: The first terminal device selects the tenth resource based on the ninth resource.

The tenth resource includes the second-mode resource of the sidelink.

The tenth resource includes a resource selected, contended for, or sensed by the first terminal device and/or a resource reserved by the first terminal device.

For example, the tenth resource includes the second-mode resource of the sidelink.

When selecting the tenth resource, the first terminal device excludes any one or more of the following resources:

1. The ninth resource.
2. All time-frequency resources in time domain in which the ninth resource is located.

3. A subset of the ninth resource. Optionally, the subset of the ninth resource may include a resource whose priority is higher than that of the tenth resource.

4. All time domain resources in time domain in which the subset of the ninth resource is located.

Figure 5F:
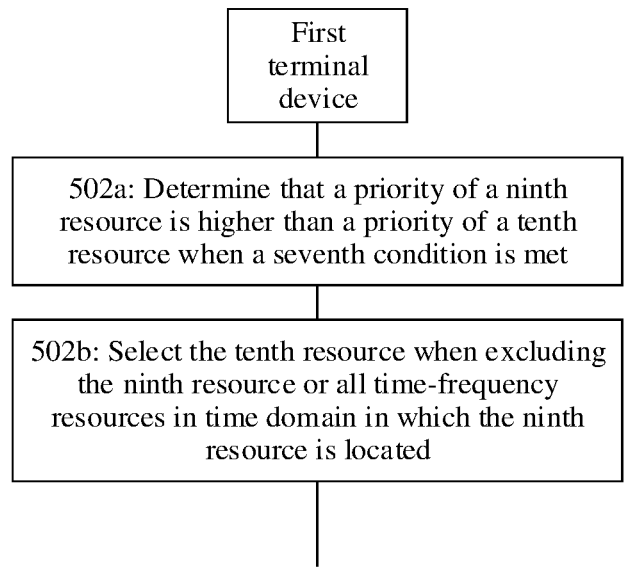
FIG. 5F is a schematic diagram of another embodiment of a communication processing method.

Optionally, a possible selection manner in which the first terminal device selects the tenth resource based on the ninth resource is described by using FIG. 5F. The method includes the following steps.

502a: The first terminal device determines that a priority of the ninth resource is higher than the priority of the tenth resource when a seventh condition is met.

The seventh condition includes any one or more of the following content:

1. A priority of sidelink transmission for the first mode is higher than a priority of sidelink transmission for the second mode.

2. A priority of uplink transmission is higher than the priority of the sidelink transmission for the second mode.

3. A priority of downlink transmission is higher than the priority of the sidelink transmission for the second mode.

4. A priority of a service or data transmitted on the ninth resource is higher than a priority of a service or data transmitted on the tenth resource.

5. Priority information of the service or the data transmitted on the ninth resource is greater than or equal to or is less than or equal to a second threshold.

6. Priority information of the service or the data transmitted on the tenth resource is greater than or equal to or is less than or equal to a third threshold.

7. The priority of the ninth resource is higher than the priority of the tenth resource.

8. A measurement result for the first mode of the sidelink is higher than a measurement result for the second mode of the sidelink.

9. A measurement result of the uplink is higher than the measurement result for the second mode of the sidelink.

11. A measurement result of the downlink is higher than the measurement result for the second mode of the sidelink.

12. The measurement result for the first mode of the sidelink is greater than or equal to or is less than or equal to a fourth threshold.

13. The measurement result of the uplink is greater than or equal to or is less than or equal to the fourth threshold.

14. The measurement result of the downlink is greater than or equal to or is less than or equal to the fourth threshold.

15. The measurement result for the second mode of the sidelink is greater than or equal to or is less than or equal to a fifth threshold.

16. Priority information of the sidelink transmission for the first mode is greater than or equal to or is less than or equal to a sixth threshold.

17. Priority information of the uplink transmission is greater than or equal to or is less than or equal to the sixth threshold.

18. Priority information of the downlink transmission is greater than or equal to or is less than or equal to the sixth threshold.

19. Priority information of the sidelink transmission for the second mode is greater than or equal to or is less than or equal to the sixth threshold.

20. A measurement result of the ninth resource is higher than a measurement result of the tenth resource.

21. The measurement result of the ninth resource is greater than or equal to or is less than or equal to the fourth threshold.

22. The measurement result of the tenth resource is greater than or equal to or is less than or equal to the fifth threshold.

23. The ninth resource includes a resource shared by the first terminal device and another terminal device and the first resource is not used, where the resource shared by the first terminal device and the another terminal device includes a first-type configured grant resource and/or a second-mode resource of the sidelink.

24. The ninth resource includes a dedicated resource of the first terminal device.

25. A start time domain position of the ninth resource is before or after a start time domain position of the tenth resource.

26. The ninth resource includes a periodic seventh time-frequency resource, the tenth resource includes a periodic eighth time-frequency resource, and a periodicity of the seventh time-frequency resource is greater than or less than a periodicity of the eighth time-frequency resource.

27. The ninth resource includes the periodic seventh time-frequency resource, the tenth resource includes the periodic eighth time-frequency resource, and a time interval between two adjacent seventh time-frequency resources is greater than or less than a time interval between two adjacent eighth time-frequency resources.

28. A size of the ninth resource is greater than a size of the tenth resource.

29. A proportion of an overlapping resource in the ninth resource to the ninth resource is greater than or less than a proportion of an overlapping resource in the tenth resource to the tenth resource.

The priority rule described in the seventh condition is similar to the priority rule in the second condition in the embodiment shown in FIG. 2K. For details, refer to an example of the priority rule described in the second condition in the embodiment shown in FIG. 2K. Details are not described herein again.

502b: The first terminal device selects the tenth resource when excluding the ninth resource or any time domain resource in time domain in which the ninth resource is located.

It is determined in step 502a that the priority of the ninth resource is higher than the priority of the tenth resource. In this case, the first terminal device may select the tenth resource for the second mode for the sidelink when excluding the ninth resource or any time domain resource in time domain in which the ninth resource is located. The tenth resource does not include the ninth resource or any time domain resource in time domain of the ninth resource.

It should be noted that a manner in which the first terminal device selects the tenth resource is described by using an example in which the priority of the ninth resource is higher than the priority of the tenth resource. However, during actual application, a priority of the subset of the ninth resource (that is, a part of the ninth resource) may alternatively be higher than the priority of the tenth resource. The first terminal device determines that the priority of the subset of the ninth resource is higher than the priority of the tenth resource. Then, the first terminal device may select the tenth resource for the second mode for the sidelink when excluding the subset of the ninth resource or any time-frequency resource in time domain in which the subset of the ninth resource is located.

In this embodiment, the first terminal device may determine the ninth resource. Then, the first terminal device selects the tenth resource based on the ninth resource. the first terminal device may select the second-mode resource of the sidelink with reference to a status of the obtained ninth resource. In this way, a problem that the ninth resource overlaps the tenth resource in time domain can be avoided or reduced.

Figure 6A:
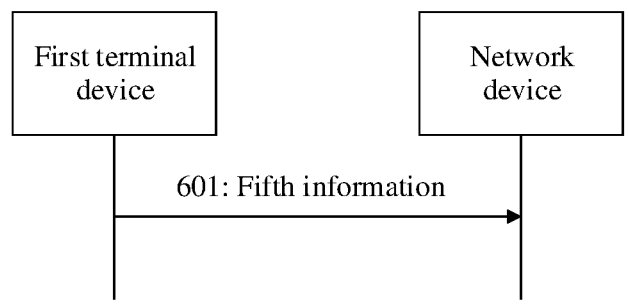
FIG. 6A is a schematic diagram of another embodiment of a communication processing method.

FIG. 6A is a schematic diagram of another embodiment of a communication processing method. As shown in FIG. 6A, the method includes the following steps.

601: A first terminal device sends fifth information to a network device.

The fifth information is used to indicate information about an eleventh resource and/or indicate that the first terminal device requests a twelfth resource from the network device, the information about the eleventh resource includes a second-mode resource of a sidelink, and the sidelink is a wireless direct communication link between the first terminal device and a second terminal device.

The eleventh resource is a resource selected, contended for, or sensed, and/or reserved by the first terminal device. The twelfth resource includes any one or more of the following resources: a first-mode resource of the sidelink, a resource of an uplink, and a resource of a downlink.

The fifth information includes any one or more of the following information:

1. An indication that the first terminal device senses, selects, or obtains, through contention, the eleventh resource.

2. An indication that the first terminal device reserves the eleventh resource.

3. The information about the eleventh resource.

Optionally, the information about the eleventh resource includes any one or more of the following content: resource type information of the eleventh resource, time domain information of the eleventh resource, frequency domain information of the eleventh resource, a periodicity or a time interval of the eleventh resource, and duration of the eleventh resource.

Optionally, the time domain information of the eleventh resource includes time domain length information of the eleventh resource and/or time domain position information of the eleventh resource.

Optionally, the frequency domain information of the eleventh resource includes frequency domain bandwidth information of the eleventh resource and/or frequency domain position information of the eleventh resource.

4. A periodicity or a time interval of a service or data transmitted on the eleventh resource.

5. A time offset of a time domain position of the eleventh resource relative to a time domain position at which the first terminal device sends the fifth information.

6. Priority information of the service or the data transmitted on the eleventh resource.

7. Priority information of the eleventh resource.

8. Information about a resource that does not overlap the eleventh resource.

9. An indication that the first terminal device requests the twelfth resource from the network device.

10. Priority information of the service or the data transmitted on the twelfth resource.

11. Priority information of the twelfth resource.

12. Information about the twelfth resource.

Optionally, the information about the twelfth resource includes any one or more of the following content: resource type information of the twelfth resource, time domain information of the twelfth resource, frequency domain information of the twelfth resource, a periodicity or an interval of the twelfth resource, and duration of the twelfth resource.

Optionally, the time domain information of the twelfth resource includes time domain length information of the eleventh resource and/or time domain position information of the eleventh resource.

Optionally, the frequency domain information of the twelfth resource includes frequency domain bandwidth information of the eleventh resource and/or frequency domain position information of the eleventh resource.

13. Information about a time domain offset of the twelfth resource relative to the eleventh resource.

14. An indication that the first terminal device has resource reservation.

15. Information about a resource reserved by the first terminal device.

16. An indication that the first terminal device may perform retransmission.

17. A maximum quantity of retransmission times of the first terminal device.

18. A time interval between initial transmission and retransmission of the first terminal device.

19. Frequency domain information of the initial transmission and frequency domain information of the retransmission of the first terminal device.

20. A periodicity or a time interval of the service or the data transmitted on the twelfth resource.

21. A time offset of a time domain position of the twelfth resource relative to the time domain position at which the first terminal device sends the fifth information.

The fifth information is similar to the first information in the embodiment shown in FIG. 2A. For details, refer to an example of the content carried in the first information in the embodiment shown in FIG. 2A for understanding the fifth information. Details are not described herein again.

Optionally, that a first terminal device sends fifth information to a network device includes: The first terminal device sends the fifth information to the network device when a ninth condition is met.

The ninth condition includes any one or more of the following content:

1. The first terminal device is in a connected state.

The first terminal device is connected to the network device, and the first terminal device is in the connected state.

2. The first terminal device determines that a priority of the eleventh resource is higher than a priority of the twelfth resource.

3. The first terminal device sends resource request information to the network device.

Optionally, the resource request information is used to request the twelfth resource from the network device.

Optionally, the first terminal device may request a resource from the network device in a manner of a BSR, an SR, a HARQ, or random access.

Optionally, that the first terminal device sends resource request information to the network device includes: The first terminal device sends the resource request information used for new transmission to the network device, or the first terminal device sends the resource request information used for retransmission to the network device.

4. The first terminal device senses, selects, or obtains, through contention, the eleventh resource and/or reserves the eleventh resource.

5. The first terminal device has a resource of the uplink.

Optionally, that the first terminal device has a resource of the uplink includes that the first terminal device has an uplink resource that can accommodate the fifth information.

Optionally, before the first terminal device sends the fifth information to the network device, the first terminal device determines that the priority of the eleventh resource is higher than the priority of the second resource when a tenth condition is met. The tenth condition includes any one or more of the following content:

1. A priority of sidelink transmission for the first mode is lower than a priority of sidelink transmission for the second mode.

2. A priority of uplink transmission is lower than the priority of the sidelink transmission for the second mode.

3. A priority of downlink transmission is lower than the priority of the sidelink transmission for the second mode.

4. A priority of the service or the data transmitted on the eleventh resource is lower than a priority of the service or the data transmitted on the twelfth resource.

5. The priority information of the service or the data transmitted on the eleventh resource is greater than or less than a second threshold.

6. The priority information of the service or the data transmitted on the twelfth resource is greater than or less than a third threshold.

7. The priority of the eleventh resource is higher than the priority of the twelfth resource.

8. A measurement result for the second mode of the sidelink is higher than a measurement result for the first mode of the sidelink.

9. A measurement result of the uplink is lower than the measurement result for the second mode of the sidelink.

10. A measurement result of the downlink is lower than the measurement result for the second mode of the sidelink.

11. The measurement result for the first mode of the sidelink is greater than or equal to or is less than or equal to a fourth threshold.

12. The measurement result of the uplink is greater than or equal to or is less than or equal to the fourth threshold.

13. The measurement result of the downlink is greater than or equal to or is less than or equal to the fourth threshold.

14. The measurement result for the second mode of the sidelink is greater than or equal to or is less than or equal to a fifth threshold.

15. Priority information of the sidelink transmission for the first mode is greater than or equal to or is less than or equal to a sixth threshold.

16. Priority information of the uplink transmission is greater than or equal to or is less than or equal to the sixth threshold.

17. Priority information of the downlink transmission is greater than or equal to or is less than or equal to the sixth threshold.

18. Priority information of the sidelink transmission for the second mode is greater than or equal to or is less than or equal to the sixth threshold.

19. A measurement result of the eleventh resource is higher than a measurement result of the twelfth resource.

20. The measurement result of the eleventh resource is greater than or equal to or is less than or equal to the fourth threshold.

21. The measurement result of the eleventh resource is greater than or equal to or is less than or equal to the fifth threshold.

22. A start time domain position of the eleventh resource is before or after a start time domain position of the twelfth resource.

23. The eleventh resource includes a periodic ninth time-frequency resource, the twelfth resource includes a periodic tenth time-frequency resource, and a periodicity of the ninth time-frequency resource is greater than or less than a periodicity of the tenth time-frequency resource.

24. The eleventh resource includes the periodic ninth time-frequency resource, the twelfth resource includes the periodic tenth time-frequency resource, and a time interval between two adjacent ninth time-frequency resources is greater than or less than a time interval between two adjacent tenth time-frequency resources.

25. A size of the eleventh resource is less than or greater than a size of the twelfth resource.

26. A proportion of an overlapping resource in the eleventh resource to the eleventh resource is greater than or less than a proportion of an overlapping resource in the twelfth resource to the twelfth resource.

The priority rule described in the tenth condition is similar to the priority rule in the second condition in the embodiment shown in FIG. 2K. For details, refer to an example of the priority rule described in the second condition in the embodiment shown in FIG. 2K. Details are not described herein again.

Figure 6B:
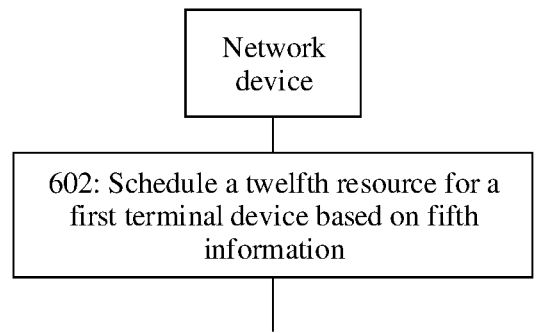
FIG. 6B is a schematic diagram of another embodiment of a communication processing method.

Optionally, when the network device needs to schedule the twelfth resource for the first terminal device, the network device may perform the operation shown in FIG. 6B, which includes the following step.

602: The network device schedules the twelfth resource for the first terminal device based on the fifth information and/or the resource request information sent by the first terminal device to the network device.

Optionally, when scheduling the twelfth resource for the first terminal device, the network device excludes any one or more of the following resources:

1. The eleventh resource.

2. All time domain resources in time domain in which the eleventh resource is located.

3. A subset of the eleventh resource. Optionally, the subset of the eleventh resource may include a resource whose priority is higher than that of the twelfth resource.

4. All time domain resources in time domain in which the subset of the eleventh resource is located.

Figure 6C:
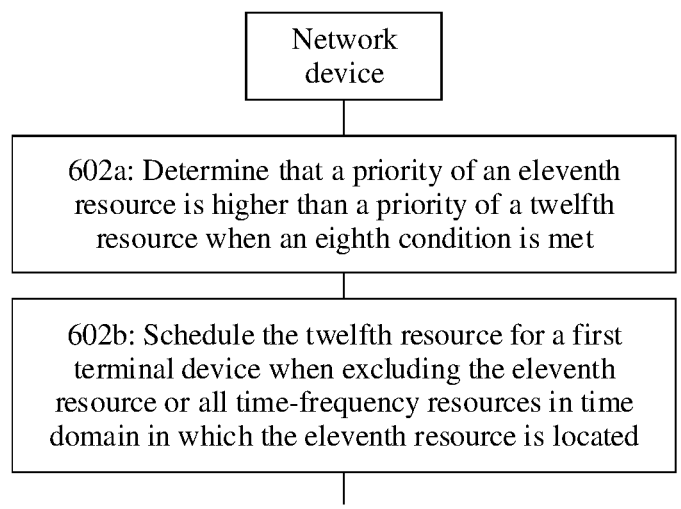
FIG. 6C is a schematic diagram of another embodiment of a communication processing method.

Optionally, a possible selection manner in which the network device schedules the twelfth resource for the first terminal device based on the eleventh resource is described by using FIG. 6C. The method includes the following steps.

602a: The network device determines that a priority of the eleventh resource is higher than the priority of the twelfth resource when an eighth condition is met.

The eighth condition includes any one or more of the following content:

1. A priority of sidelink transmission for the first mode is lower than a priority of sidelink transmission for the second mode.

2. A priority of uplink transmission is lower than the priority of the sidelink transmission for the second mode.

3. A priority of downlink transmission is lower than the priority of the sidelink transmission for the second mode.

4. A priority of the service or the data transmitted on the eleventh resource is lower than a priority of the service or the data transmitted on the twelfth resource.

5. The priority information of the service or the data transmitted on the eleventh resource is greater than or less than a second threshold.

6. The priority information of the service or the data transmitted on the twelfth resource is greater than or less than a third threshold.

7. A measurement result for the second mode of the sidelink is higher than a measurement result for the first mode of the sidelink.

8. A measurement result of the uplink is lower than the measurement result for the second mode of the sidelink.

9. A measurement result of the downlink is lower than the measurement result for the second mode of the sidelink.

10. The measurement result for the first mode of the sidelink is greater than or equal to or is less than or equal to a fourth threshold.

11. The measurement result of the uplink is greater than or equal to or is less than or equal to the fourth threshold.

12. The measurement result of the downlink is greater than or equal to or is less than or equal to the fourth threshold.

13. The measurement result for the second mode of the sidelink is greater than or equal to or is less than or equal to a fifth threshold.

14. Priority information of the sidelink transmission for the first mode is greater than or equal to or is less than or equal to a sixth threshold.

15. Priority information of the uplink transmission is greater than or equal to or is less than or equal to the sixth threshold.

16. Priority information of the downlink transmission is greater than or equal to or is less than or equal to the sixth threshold.

17. Priority information of the sidelink transmission for the second mode is greater than or equal to or is less than or equal to the sixth threshold.

18. A measurement result of the eleventh resource is higher than a measurement result of the twelfth resource.

19. The measurement result of the eleventh resource is greater than or equal to or is less than or equal to the fourth threshold.

20. The measurement result of the eleventh resource is greater than or equal to or is less than or equal to the fifth threshold.

21. A start time domain position of the eleventh resource is before or after a start time domain position of the twelfth resource.

22. The eleventh resource includes a periodic ninth time-frequency resource, the twelfth resource includes a periodic tenth time-frequency resource, and a periodicity of the ninth time-frequency resource is greater than or less than a periodicity of the tenth time-frequency resource.

23. The eleventh resource includes the periodic ninth time-frequency resource, the twelfth resource includes the periodic tenth time-frequency resource, and a time interval between two adjacent ninth time-frequency resources is less than a time interval between two adjacent tenth time-frequency resources.

24. A size of the eleventh resource is less than or greater than a size of the twelfth resource.

The priority rule described in the eighth condition is similar to the priority rule in the second condition in the embodiment shown in FIG. 2K. For details, refer to an example of the priority rule described in the second condition in the embodiment shown in FIG. 2K. Details are not described herein again.

602b: The network device schedules the twelfth resource for the first terminal device when excluding the eleventh resource or any time-frequency resource in time domain in which the eleventh resource is located.

It is determined in step 602a that the priority of the eleventh resource is higher than the priority of the twelfth resource. In this case, the first terminal device may schedule the twelfth resource for the first terminal device when excluding the eleventh resource or any time domain resource in time domain in which the eleventh resource is located.

The twelfth resource does not include the eleventh resource or any time-frequency resource in time domain in which the eleventh resource is located.

It should be noted that a manner in which the network device schedules the twelfth resource for the first terminal device is described by using an example in which the priority of the eleventh resource is higher than the priority of the twelfth resource. During actual application, a priority of a subset of the eleventh resource (that is, a part of the eleventh resource) may alternatively be higher than the priority of the twelfth resource. The first terminal device determines the priority of the subset of the eleventh resource and the priority of the twelfth resource. Then, the network device may schedule the twelfth resource for the first terminal device when excluding the eleventh resource or any time-frequency resource in time domain in which the subset of the eleventh resource is located.

Figure 7A:
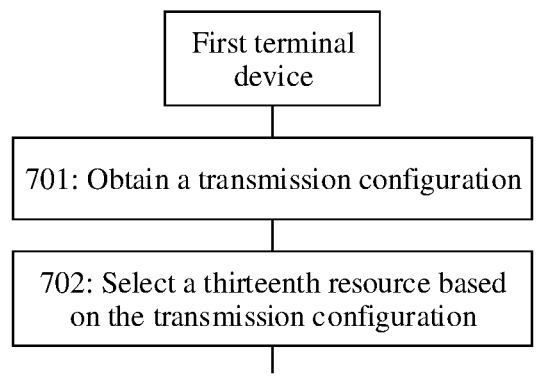
FIG. 7A is a schematic diagram of another embodiment of a communication processing method.

FIG. 7A is a schematic diagram of another embodiment of a communication processing method according to an embodiment. In FIG. 7A, the method includes the following steps.

701: A first terminal device obtains a transmission configuration.

Optionally, the transmission configuration includes any one or more of a first dedicated time domain resource configuration, a second dedicated time domain resource configuration, an eighth dedicated time domain resource configuration, a ninth dedicated time domain resource configuration, a tenth dedicated time domain resource configuration, and an eleventh dedicated time domain resource configuration. The first dedicated time domain resource configuration includes a time domain resource configuration dedicated to a first mode for a sidelink, the second dedicated time domain resource configuration includes a time domain resource configuration dedicated to a second mode for the sidelink, the eighth dedicated time domain resource configuration includes a time domain resource configuration dedicated to sidelink sending for the first mode, the ninth dedicated time domain resource configuration includes a time domain resource configuration dedicated to sidelink sending for the second mode, the tenth dedicated time domain resource configuration includes a time domain resource configuration dedicated to sidelink receiving for the first mode, and the eleventh dedicated time domain resource configuration includes a time domain resource configuration dedicated to sidelink receiving for the second mode. The sidelink is a wireless direct communication link between the first terminal device and a second terminal device.

It should be noted that a time domain resource configured in the transmission configuration may be a frame level, a subframe level, a slot level, or a symbol level.

Optionally, the time domain resource may be configured in the transmission configuration in a form of a formula or may be configured in a form of a proportion or a percentage.

For example, for the first dedicated time domain resource configuration, it may be configured that a resource whose slot is X may be used for sidelink communication for the first mode, where X mod 3=0, that is, a resource whose slot number is an integer multiple of 3 may be used for the sidelink communication for the first mode.

For example, for the first dedicated time domain resource configuration, it may be configured that the first half or the last half of resource in each slot may be used for the sidelink communication for the first mode. In other words, a resource in the first half slot or the last half slot of each slot may be used for the sidelink communication for the first mode.

Optionally, the transmission configuration may further include any one or more of a twelfth dedicated time domain resource configuration, a thirteenth dedicated time domain resource configuration, a fourteenth dedicated time domain resource configuration, a fifteenth dedicated time domain resource configuration, a sixteenth dedicated time domain resource configuration, a seventeenth dedicated time domain resource configuration, an eighteenth dedicated time domain resource configuration, a nineteenth dedicated time domain resource configuration, a twentieth dedicated time domain resource configuration, a twenty-first dedicated time domain resource configuration, a twenty-second dedicated time domain resource configuration, and a twenty-third dedicated time domain resource configuration. The twelfth dedicated time domain resource configuration includes a time domain resource configuration dedicated to transmission on a configured grant resource of the sidelink, the thirteenth dedicated time domain resource configuration includes a time domain resource configuration dedicated to transmission on a first-type configured grant resource of the sidelink, the fourteenth dedicated time domain resource configuration includes a time domain resource configuration dedicated to transmission on a second-type configured grant resource of the sidelink, the fifteenth dedicated time domain resource configuration includes a time domain resource configuration dedicated to transmission on a dynamic grant resource of the sidelink, the sixteenth dedicated time domain resource configuration includes a time domain resource configuration dedicated to sending on the configured grant resource of the sidelink, the seventeenth dedicated time domain resource configuration includes a time domain resource configuration dedicated to sending on the first-type configured grant resource of the sidelink, the eighteenth dedicated time domain resource configuration includes a time domain resource configuration dedicated to sending on the second-type configured grant resource of the sidelink, the nineteenth dedicated time domain resource configuration includes a time domain resource configuration dedicated to sending on the dynamic grant resource of the sidelink, the twentieth dedicated time domain resource configuration includes a time domain resource configuration dedicated to receiving on the configured grant resource of the sidelink, the twenty-first dedicated time domain resource configuration includes a time domain resource configuration dedicated to receiving on the first-type configured grant resource of the sidelink, the twenty-second dedicated time domain resource configuration includes a time domain resource configuration dedicated to receiving on the second-type configured grant resource of the sidelink, and the twenty-third dedicated time domain resource configuration includes a time domain resource configuration dedicated to receiving on the dynamic grant resource of the sidelink.

Optionally, the first dedicated time domain resource configuration is used for any one or more of the following content: sidelink transmission for the first mode, sidelink sending for the first mode, and sidelink receiving for the first mode. The second dedicated time domain resource configuration is used for any one or more of the following content: sidelink transmission for the second mode, sidelink sending for the second mode, and sidelink receiving for the second mode.

An example in which a slot-level time domain resource is configured is used below for description.

For example, as shown in FIG. 7B, for a solution in which only a time domain resource dedicated to the first mode for the sidelink is configured in the transmission configuration, in a transmission configuration 1, a first dedicated time domain resource configuration in which a slot 0 to a slot 4 and a slot 6 are in the first mode is configured. A network device may schedule a first-mode resource of the sidelink in these slots, and the first terminal device cannot select a second-mode resource of the sidelink in these slots and cannot perform transmission in these slots by using the second-mode resource of the sidelink. In this way, overlap between the first-mode resource of the sidelink and the second-mode resource of the sidelink in time domain is avoided or reduced.

For example, as shown in FIG. 7B, for a solution in which only a time domain resource dedicated to the second mode for the sidelink is configured in the transmission configuration, in a transmission configuration 2, a second dedicated time domain resource configuration in which the slot 0, the slot 1, and the slot 4 to a slot 7 are in the second mode for the sidelink is configured. The first terminal device may select the second-mode resource of the sidelink in these slots, the first terminal device cannot perform sidelink transmission for the first mode in these slots, and the network device cannot schedule the first-mode resource of the sidelink in these slots.

For example, as shown in FIG. 7B, for a solution in which both a time domain resource dedicated to the first mode for the sidelink and a time domain resource dedicated to the second mode for the sidelink are configured in the transmission configuration, in a transmission configuration 3, a first dedicated time domain resource configuration in which the slot 0, the slot 1, and the slot 6 are in the first mode for the sidelink and a second dedicated time domain resource configuration in which the slot 2, the slot 4, the slot 5, and the slot 7 are in the second mode for the sidelink are configured. Time at which the network device can schedule the first-mode resource of the sidelink and time at which the first terminal device can select the second-mode resource of the sidelink are staggered, to avoid overlap between the first-mode resource of the sidelink and the second-mode resource of the sidelink in time domain.

For example, as shown in FIG. 7B, for a solution in which only a time domain resource dedicated to sidelink sending for the first mode is configured in the transmission configuration, in a transmission configuration 10, an eighth dedicated time domain resource configuration in which the slot 0, the slot 1, the slot 5, the slot 7, and a slot 9 are used for sidelink sending for the first mode is configured. The network device may schedule, in these slots, a resource used for the sidelink sending for the first mode, and the first terminal device cannot select the second-mode resource of the sidelink in these slots and cannot perform sidelink receiving for the first mode in these slots. In this way, overlap between the first-mode resource of the sidelink and the second-mode resource of the sidelink in time domain is avoided or reduced.

For example, as shown in FIG. 7B, for a solution in which only a time domain resource dedicated to sidelink sending for the second mode is configured in the transmission configuration, in a transmission configuration 11, a ninth dedicated time domain resource configuration in which the slot 2 and the slot 5 to the slot 7 are used for sidelink sending for the second mode is configured. The first terminal device may select, in these slots, a resource used for the sidelink sending for the second mode, the first terminal device cannot perform sidelink transmission for the first mode in these slots, and the network device cannot schedule the first-mode resource of the sidelink in these slots.

For example, as shown in FIG. 7B, for a solution in which only a time domain resource dedicated to sidelink receiving for the first mode is configured in the transmission configuration, in a transmission configuration 12, a tenth dedicated time domain resource configuration in which the slot 0, the slot 1, the slot 3, and the slot 5 are used for sidelink receiving for the first mode is configured. The network device may schedule, in these slots, a resource used for the sidelink receiving for the first mode, and the first terminal device cannot select the second-mode resource of the sidelink in these slots and cannot perform sidelink sending for the first mode in these slots. In this way, overlap between the first-mode resource of the sidelink and the second-mode resource of the sidelink in time domain is avoided or reduced.

For example, as shown in FIG. 7B, for a solution in which only a time domain resource dedicated to sidelink receiving for the second mode is configured in the transmission configuration, in a transmission configuration 13, an eleventh dedicated time domain resource configuration in which the slot 1, the slot 2, the slot 4, and the slot 9 are used for sidelink receiving for the second mode is configured. The first terminal device may select, in these slots, a resource used for the sidelink receiving for the second mode, the first terminal device cannot perform sidelink transmission for the first mode in these slots, and the network device cannot schedule the first-mode resource of the sidelink in these slots. In this way, overlap between the first-mode resource of the sidelink and the second-mode resource of the sidelink in time domain is avoided or reduced.

Optionally, the transmission configuration may further include any one or more of a third dedicated time domain resource configuration, a fourth dedicated time domain resource configuration, a fifth dedicated time domain resource configuration, a sixth dedicated time domain resource configuration, and a seventh dedicated time domain resource configuration. The third dedicated time domain resource configuration includes a time domain resource configuration dedicated to sidelink transmission, the fourth dedicated time domain resource configuration includes a time domain resource configuration dedicated to sidelink sending, the fifth dedicated time domain resource configuration includes a time domain resource configuration dedicated to sidelink receiving, the sixth dedicated time domain resource configuration includes a time domain resource configuration dedicated to uplink transmission, the seventh dedicated time domain resource configuration includes a time domain resource configuration dedicated to downlink transmission, the uplink transmission is transmission of an uplink for communication between the first terminal device and the network device, and the downlink transmission is transmission of a downlink for communication between the first terminal device and the network device.

The following uses FIG. 7B as an example for description. An example in which any one of the third dedicated time domain resource configuration, the fourth dedicated time domain resource configuration, the fifth dedicated time domain resource configuration, the sixth dedicated time domain resource configuration, and the seventh dedicated time domain resource configuration is further configured in the transmission configuration when the first dedicated time domain resource configuration of the first mode for the sidelink and the second dedicated time domain resource configuration of the second mode for the sidelink are configured in the transmission configuration is used for description. When the time domain resource dedicated to the first mode for the sidelink or the time domain resource dedicated to the second mode for the sidelink is configured in the transmission configuration, solutions in which any one or more of the third dedicated time domain resource configuration, the fourth dedicated time domain resource configuration, the fifth dedicated time domain resource configuration, the sixth dedicated time domain resource configuration, and the seventh dedicated time domain resource configuration are further configured in the transmission configuration are also similar. Examples are not provided for description herein one by one. Refer to FIG. 7B.

1. In a transmission configuration 4, the third dedicated time domain resource configuration is the slot 0, the slot 4, and the slot 5, that is, the slot 0, the slot 4, and the slot 5 are dedicated time domain resources used for sidelink transmission. The slot 3 and the slot 9 are the first dedicated time domain resource configuration used for the first mode for the sidelink, the slot 6 to a slot 8 are the second dedicated time domain resource configuration used for the second mode for the sidelink, and the slot 1 and the slot 2 are time domain resources that are not configured.

2. In a transmission configuration 5, the fourth dedicated time domain resource configuration is the slot 5 and the slot 6, that is, the slot 5 and the slot 6 are dedicated time domain resources used for sidelink sending. The slot 0, the slot 1, and the slot 7 are the dedicated time domain resource configuration used for the second mode for the sidelink, and the slot 2, the slot 3, the slot 8, and the slot 9 are the first dedicated time domain resource configuration used for the first mode for the sidelink.

3. In a transmission configuration 6, the fifth dedicated time domain resource configuration is the slot 0 and the slot 1, that is, the slot 0 and the slot 1 are dedicated time domain resources used for sidelink receiving. The slot 2, the slot 4, and the slot 6 are the first dedicated time domain resource configuration used for the first mode for the sidelink, and the slot 3, the slot 5, and the slot 7 are the second dedicated time domain resource configuration used for the second mode for the sidelink.

4. In a transmission configuration 7, the sixth dedicated time domain resource configuration is the slot 2, the slot 3, the slot 5, the slot 8, and the slot 9, that is, dedicated time domain resources used for uplink transmission is the slot 2, the slot 3, the slot 5, the slot 8, and the slot 9. The slot 0, the slot 1, and the slot 4 are the first dedicated time domain resource configuration used for the first mode for the sidelink, and the slot 6 and the slot 7 are the second dedicated time domain resource configuration used for the second mode for the sidelink.

5. In a transmission configuration 8, the seventh dedicated time domain resource configuration is the slot 4, the slot 5, and the slot 9, that is, dedicated time domain resources used for downlink transmission are the slot 4, the slot 5, and the slot 9. The slot 0, the slot 3, and the slot 6 are the first dedicated time domain resource configuration used for the first mode for the sidelink, and the slot 1, the slot 2, the slot 7, and the slot 8 are the second dedicated time domain resource configuration used for the second mode for the sidelink.

Optionally, the transmission configuration may further include a shared time domain resource configuration, and a time domain resource configured in the shared time domain resource configuration may be used for any one or more of the following content: sidelink transmission for the first mode, sidelink transmission for the second mode, sidelink sending for the first mode, sidelink sending for the second mode, sidelink receiving for the first mode, sidelink receiving for the second mode, sidelink transmission, sidelink sending, sidelink receiving, uplink transmission, downlink transmission, transmission on the configured grant resource of the sidelink, transmission on the first-type configured grant resource of the sidelink, transmission on the second-type configured grant resource of the sidelink, transmission on the dynamic grant resource of the sidelink, sending on the configured grant resource of the sidelink, sending on the first-type configured grant resource of the sidelink, sending on the second-type configured grant resource of the sidelink, sending on the dynamic grant resource of the sidelink, receiving on the configured grant resource of the sidelink, receiving on the first-type configured grant resource of the sidelink, receiving on the second-type configured grant resource of the sidelink, and a time domain resource configuration received on the dynamic grant resource of the sidelink.

The following uses FIG. 7B as an example for description. An example in which the shared time domain resource configuration is further configured in the transmission configuration when the first dedicated time domain resource configuration of the first mode for the sidelink and the second dedicated time domain resource configuration of the second mode for the sidelink are configured in the transmission configuration is used for description. Refer to FIG. 7B. In a transmission configuration 9, the slot 1, the slot 8, and the slot 9 are the shared slot time domain configuration, the slot 0, the slot 2, the slot 4, and the slot 6 are the first dedicated time domain resource configuration used for the first mode for the sidelink, and the slot 3, the slot 5, and the slot 7 are the second dedicated time domain resource configuration used for the second mode for the sidelink.

Optionally, a manner of obtaining the transmission configuration includes any one of the following:
a. The transmission configuration is specified in a communication protocol.
b. The transmission configuration is determined by the first terminal device according to a preset rule.
c. The transmission configuration is configured by the network device.
d. The transmission configuration is agreed on by the network device and the first terminal device in advance.
e. The transmission configuration is sent by the network device to the first terminal device. Based on this manner, there are two possible implementations:
  1. The first terminal device receives the transmission configuration sent by the network device.
  2. The first terminal device receives sixth information sent by the network device. The sixth information carries information about the transmission configuration.
f. The transmission configuration is sent by another terminal device to the first terminal device. Based on this manner, there are two possible implementations:
  1. The first terminal device receives the transmission configuration sent by the another terminal device.
  2. The first terminal device receives seventh information sent by the another terminal device.

The seventh information carries information about the transmission configuration.

Optionally, the terminal device may receive transmission configuration-related information sent by the network device. The network device may send the transmission configuration-related information to the terminal device by using any one of RRC signaling, MAC signaling, and physical layer signaling.

Optionally, the first terminal device may receive transmission configuration-related information sent by the another terminal device. The another terminal device may send the transmission configuration-related information to the first terminal device by using any one of RRC signaling, MAC signaling, and physical layer signaling.

In a possible implementation, as shown in FIG. 7B, the sixth information carries a sequence number of the transmission configuration, and the sequence number is 1. In this case, the first terminal device may determine a corresponding transmission configuration 1 based on the sequence number.

It should be noted that the network device may configure the transmission configuration or may configure a plurality of transmission configurations. Each transmission configuration may have a corresponding sequence number. A relationship between a sequence number and a transmission configuration may be specified in a communication protocol or may be agreed on by the network device and the first terminal device in advance or may be sent by the network device to the first terminal device.

702: The first terminal device selects a thirteenth resource based on the transmission configuration.

The thirteenth resource includes the second-mode resource of the sidelink.

For example, the transmission configuration is the transmission configuration 1 in FIG. 7B, and the slot 0 to the slot 4 and the slot 6 are the first dedicated time domain resource configuration used for the first mode for the sidelink. Therefore, when selecting the thirteenth resource for the second mode for the sidelink, the first terminal device cannot select resources at positions of the slot 0 to the slot 4 and the slot 6, and the first terminal device may select the thirteenth resource from any one or more of the slot 5, the slot 7, the slot 8, and the slot 9, to avoid or reduce overlap between a time domain resource used for the second mode for the sidelink and a time domain resource used for the first mode for the sidelink.

Figure 8A:
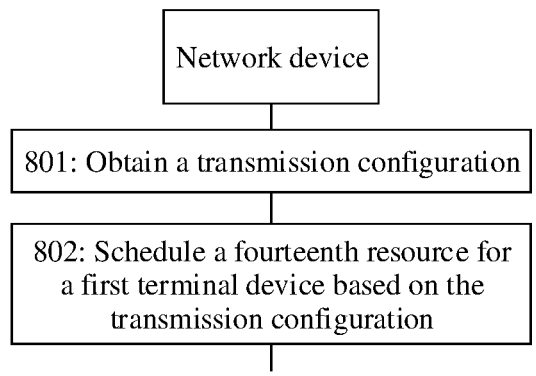
FIG. 8A is a schematic diagram of another embodiment of a communication processing method.

Alternatively, the network device may schedule a fourteenth resource for the first terminal device based on the transmission configuration, which is described by using the embodiment shown in FIG. 8A. FIG. 8A is a schematic diagram of another embodiment of a communication processing method according to an embodiment. In FIG. 8A, the method includes the following steps.

801: A network device obtains a transmission configuration.

Step 801 is similar to step 701 in FIG. 7A. For details, refer to the related descriptions of step 701 in FIG. 7A. Details are not described herein again.

Optionally, a manner of obtaining the transmission configuration includes any one of the following:
a. The transmission configuration is specified in a communication protocol.
b. The transmission configuration is determined by the network device according to a preset rule.
c. The transmission configuration is configured by a first terminal device.
d. The transmission configuration is agreed on by the network device and the first terminal device in advance.
e. The transmission configuration is sent by the first terminal device to the network device. Based on this manner, there are two possible implementations:
  1. The network device receives the transmission configuration sent by the first terminal device.
  2. The network device receives eighth information sent by the first terminal device. The eighth information carries information about the transmission configuration.

Optionally, the network device may receive transmission configuration-related information sent by the first terminal device. The first terminal device may send the transmission configuration-related information to the network device by using any one of RRC signaling, MAC signaling, and physical layer signaling.

802: The network device schedules a fourteenth resource for the first terminal device based on the transmission configuration.

The fourteenth resource includes a first-mode resource of a sidelink.

For example, the transmission configuration is the transmission configuration 1 in FIG. 7B, and the slot 0 to the slot 4 and the slot 6 are time domain resources dedicated to a first mode for the sidelink. Because the slot 0 to the slot 4 and the slot 6 are the time domain resources dedicated to the first mode for the sidelink, the network device may schedule resources in the slot 0 to the slot 4 and the slot 6 to the first terminal device, and the first terminal device cannot select a second-mode resource of the sidelink from the slot 0 to the slot 4 and the slot 6. In this way, a probability that a first-mode resource of the sidelink overlaps the second-mode resource of the sidelink can be avoided or reduced.

In this embodiment, the first terminal device obtains the transmission configuration, where the transmission configuration includes a first dedicated time domain resource configuration used for the first mode for the sidelink and/or a second dedicated time domain resource configuration used for the second mode for the sidelink. Then, the first terminal device may select a thirteenth resource based on that the transmission configuration is in the second mode for the sidelink. The network device may also schedule the fourteenth resource for the first terminal device based on the transmission configuration, and configure the first dedicated time domain resource configuration used for the first mode for the sidelink and/or the second dedicated time domain resource configuration used for the second mode for the sidelink, to avoid or reduce overlap between the thirteenth resource selected by the first terminal device and the fourteenth resource scheduled by the network device.

Figure 9:
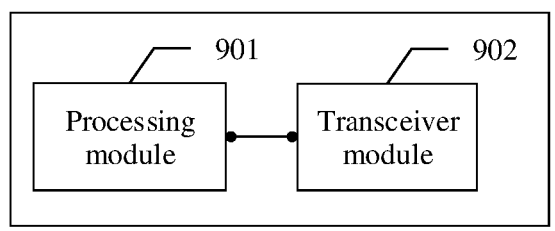
FIG. 9 is a schematic diagram of a structure of a communication processing apparatus according to an embodiment.

The following describes a communication processing apparatus provided in the embodiments. Refer to FIG. 9. An embodiment of the communication processing apparatus is provided. The communication processing apparatus is configured to perform steps performed by the first terminal device in the embodiments shown in FIG. 2A and FIG. 2K. Reference may be made to related descriptions in the foregoing embodiments. The communication processing apparatus includes:

a processing module 901, configured to generate first information; and a transceiver module 902, configured to send the first information to a network device, where the first information is used to indicate any one or more of the following content:

information indicating that the first terminal device releases a first resource;

the first resource released by the first terminal device; and information indicating that the first terminal device requests a second resource from the network device.

In a possible implementation, the first resource and/or the second resource include/includes any one or more of the following content:

a resource of a sidelink;
a first-mode resource of the sidelink;
a configured grant resource of the sidelink;
a first-type configured grant resource of the sidelink;
a second-type configured grant resource of the sidelink;
a dynamic grant resource of the sidelink;
a resource of an uplink;
a configured grant resource of the uplink;
a first-type configured grant resource of the uplink;
a second-type configured grant resource of the uplink;
a dynamic grant resource of the uplink;
a resource of a downlink;
a semi-persistently allocated resource of the downlink; and
a dynamically allocated resource of the downlink, where the sidelink is a wireless direct communication link between the first terminal device and a second terminal device, the uplink and the downlink are links for communication between the first terminal device and the network device, the first-type configured grant resource includes a sidelink resource and/or an uplink resource that are/is provided by the network device by using RRC signaling, the second-type configured grant resource means that the network device provides a resource periodicity for the sidelink and/or a resource periodicity for the uplink by using RRC signaling and then activates the sidelink resource and/or the uplink resource by using a PDCCH or DCI, the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink.

In another possible implementation, the transceiver module 902 is configured to:

send the first information to the network device when a first condition is met, where the first condition includes any one or more of the following content:

the first resource overlaps a third resource in time domain, where the first resource includes any one or more of the following content: the resource of the sidelink, the resource of the uplink, and the resource of the downlink, the third resource includes a second-mode resource of the sidelink, the resource of the uplink includes a resource of an uplink between the first terminal device and the network device, the resource of the downlink includes a resource of a downlink between the first terminal device and the network device, the sidelink is the wireless direct communication link between the first terminal device and the second terminal device, and the second-mode resource of the sidelink includes a sidelink resource selected, contended for, or sensed by the first terminal device;

the first resource periodically overlaps the third resource in time domain;

the first resource overlaps the third resource for N times in time domain, where N is an integer greater than 0;

the first resource is to overlap the third resource in time domain;

the first resource is to periodically overlap the third resource in time domain;

the first resource is to overlap the third resource for N times in time domain;
the third resource overrides the first resource or the first resource overrides the third resource;
the third resource periodically overrides the first resource or the first resource periodically overrides the third resource;
the third resource overrides the first resource for N times or the first resource overrides the third resource for N times;
the third resource is to override the first resource or the first resource is to override the third resource;
the third resource is to periodically override the first resource or the first resource is to periodically override the third resource;
the third resource is to override the first resource for N times or the first resource is to override the third resource for N times;
first duration is greater than or equal to a first threshold, where the first duration is a time difference between a time domain position of the first resource and a moment at which the first terminal device releases the first resource, or is a time difference between a time domain position of the first resource and a time domain position at which the first terminal device sends the first information;
the first resource includes a dedicated resource of the first terminal device;
the first resource includes a periodic time-frequency resource; and
the first terminal device has a resource of the uplink.

In another possible implementation, the first information includes any one or more of the following content:
an indication that the first terminal device releases the first resource, where the first resource includes any one or more of the following content: the resource of the sidelink, the resource of the uplink, and the resource of the downlink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device;
information about the first resource;
resource type information of the first resource;
time domain information of the first resource;
time domain position information of the first resource;
time domain length information of the first resource;
frequency domain information of the first resource;
frequency domain position information of the first resource;
frequency domain bandwidth information of the first resource;
a periodicity or an interval of the first resource;
duration of the first resource;
time information of releasing the first resource by the first terminal device;
information about releasing the $1^{st}$ time-frequency resource of the first resource by the first terminal device;
time domain information of releasing the $1^{st}$ time-frequency resource of the first resource by the first terminal device;
frequency domain information of releasing the $1^{st}$ time-frequency resource of the first resource by the first terminal device;
a time interval between time at which the first terminal device releases the first resource and time at which the first terminal device sends the first information;
an indication that the first terminal device senses, selects, or obtains, through contention, the third resource, where the third resource includes the second-mode resource of the sidelink, and the third resource includes a resource selected, contended for, or sensed by the first terminal device and/or a resource reserved by the first terminal device;
an indication that the first terminal device reserves the third resource;
an indication that the first resource overlaps the third resource in time domain;
information about the third resource;
resource type information of the third resource;
time domain information of the third resource;
time domain length information of the third resource;
time domain position information of the third resource;
frequency domain information of the third resource;
frequency domain bandwidth information of the third resource;
frequency domain position information of the third resource;
a periodicity or a time interval of the third resource;
duration of the third resource;
a periodicity or a time interval of a service or data transmitted on the first resource;
a periodicity or a time interval of a service or data transmitted on the third resource;
a time offset of the time domain position of the first resource relative to the time domain position at which the first terminal device sends the first information;
a time offset of a time domain position of the third resource relative to the time domain position at which the first terminal device sends the first information;
priority information of the service or the data transmitted on the first resource;
priority information of the service or the data transmitted on the third resource;
priority information of the first resource;
priority information of the third resource;
an indication that a priority of the first resource is lower than a priority of the third resource;
information about an overlapping resource in the first resource and the third resource;
time domain information of the first resource overlapping the third resource;
information about a time domain offset of the first resource relative to the third resource;
information about a resource that does not overlap the third resource;
an indication that the first terminal device requests the second resource from the network device;
information about the second resource;
resource type information of the second resource;
time domain information of the second resource;
frequency domain information of the second resource;
a periodicity or an interval of the second resource;
information about a time domain offset of the second resource relative to the third resource;
the information about the frequency domain offset of the first resource relative to the third resource;
an indication that the first terminal device has resource reservation;
information about a resource reserved by the first terminal device;

an indication that the first terminal device may perform retransmission;

a quantity of retransmission times or a maximum quantity of retransmission times of the first terminal device;

a time interval between initial transmission and retransmission of the first terminal device; and frequency domain information of the initial transmission and frequency domain information of the retransmission of the first terminal device.

In another possible implementation, the transceiver module 902 is configured to: send the first information to the network device by using any one of RRC signaling, MAC signaling, and physical layer signaling.

In another possible implementation, the processing module 901 is further configured to:

determine that the priority of the first resource is lower than the priority of the third resource when a second condition is met, where the first resource includes any one or more of the following content: the resource of the sidelink, the resource of the uplink, and the resource of the downlink, the third resource includes the second-mode resource of the sidelink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device; and determine to release the first resource.

In another possible implementation, the second condition includes any one or more of the following content:

a priority of sidelink transmission for the first mode is lower than a priority of sidelink transmission for the second mode;

a priority of uplink transmission is lower than the priority of the sidelink transmission for the second mode;

a priority of downlink transmission is lower than the priority of the sidelink transmission for the second mode;

a priority of the service or the data transmitted on the first resource is lower than the priority information of the service or the data transmitted on the third resource;

the priority information of the service or the data transmitted on the first resource is greater than or equal to or is less than or equal to a second threshold;

the priority information of the service or the data transmitted on the third resource is greater than or equal to or is less than or equal to a third threshold;

the priority of the first resource is lower than the priority of the third resource;

a measurement result for the first mode of the sidelink is lower than a measurement result for the second mode of the sidelink;

a measurement result of the uplink is lower than the measurement result for the second mode of the sidelink;

a measurement result of the downlink is lower than the measurement result for the second mode of the sidelink;

the measurement result for the first mode of the sidelink is greater than or equal to or is less than or equal to a fourth threshold;

the measurement result of the uplink is greater than or equal to or is less than or equal to the fourth threshold;

the measurement result of the downlink is greater than or equal to or is less than or equal to the fourth threshold;

the measurement result for the second mode of the sidelink is greater than or equal to or is less than or equal to a fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

a measurement result of the first resource is lower than a measurement result of the third resource;

the measurement result of the first resource is greater than or equal to or is less than or equal to the fourth threshold;

the measurement result of the third resource is greater than or equal to or is less than or equal to the fifth threshold;

the first resource includes a resource shared by the first terminal device and another terminal device, where the resource shared by the first terminal device and the another terminal device includes a first-type configured grant resource, and the first-type configured grant includes a sidelink resource and/or an uplink resource provided by the network device by using RRC signaling;

a start time domain position of the first resource is after or before a start time domain position of the third resource;

the first resource includes a periodic first time-frequency resource, the second resource includes a periodic second time-frequency resource, and a periodicity of the first time-frequency resource is greater than or less than a periodicity of the second time-frequency resource;

the first resource includes the periodic first time-frequency resource, the second resource includes the periodic second time-frequency resource, and a time interval between two adjacent first time-frequency resources is greater than or less than a time interval between two adjacent second time-frequency resources;

a size of the first resource is greater than or less than a size of the third resource; and a proportion of an overlapping resource in the first resource to the first resource is greater than or less than a proportion of an overlapping resource in the third resource to the third resource.

In another possible implementation, the transceiver module is further configured to:

send second information to a third terminal device, where the second information is used to indicate that the first terminal device releases the first resource and/or indicate the first resource released by the first terminal device.

In this embodiment, the processing module 901 generates the first information. Then, the transceiver module 902 sends the first information to the network device, where the first information is used to indicate any one or more of the following content: the information indicating that the first terminal device releases the first resource; the first resource released by the first terminal device; and the information indicating that the first terminal device requests the second resource from the network device. Therefore, when the communication processing apparatus determines to release the first resource, the transceiver module 902 may send the first information to the network device, so that the network device determines the first resource released by the first terminal device. In this way, the network device may allocate the first resource to another terminal device, to improve resource utilization.

Figure 10:
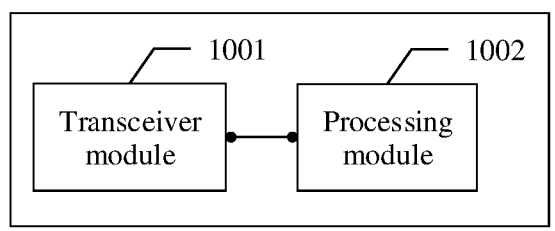
FIG. 10 is a schematic diagram of another structure of a communication processing apparatus according to an embodiment.

The following describes a communication processing apparatus provided in the embodiments. Refer to FIG. 10. An embodiment of the communication processing apparatus is provided. The communication processing apparatus is configured to perform steps performed by the network device in the embodiment shown in FIG. 2A. Reference may be made to related descriptions in the foregoing embodiment. The communication processing apparatus includes:

a transceiver module 1001, configured to receive first information sent by first terminal device, where the first information is used to indicate any one or more of the following content: information indicating that the first terminal device releases a first resource; the first resource released by the first terminal device; and information indicating that the first terminal device requests a second resource from the network device.

In a possible implementation, the first resource and/or the second resource include/includes any one or more of the following content:

a resource of a sidelink;
a first-mode resource of the sidelink;
a configured grant resource of the sidelink;
a first-type configured grant resource of the sidelink;
a second-type configured grant resource of the sidelink;
a dynamic grant resource of the sidelink;
a resource of an uplink;
a configured grant resource of the uplink;
a first-type configured grant resource of the uplink;
a second-type configured grant resource of the uplink;
a dynamic grant resource of the uplink;
a resource of a downlink;
a semi-persistently allocated resource of the downlink; and
a dynamically allocated resource of the downlink, where the sidelink is a wireless direct communication link between the first terminal device and a second terminal device, the uplink and the downlink are links for communication between the first terminal device and the network device, the first-type configured grant resource includes a sidelink resource and/or an uplink resource that are/is provided by the network device by using RRC signaling, the second-type configured grant resource means that the network device provides a resource periodicity for the sidelink and/or a resource periodicity for the uplink by using RRC signaling and then activates the sidelink resource and/or the uplink resource by using a PDCCH or DCI, the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink.

In another possible implementation, the first information includes any one or more of the following content:

an indication that the first terminal device releases the first resource, where the first resource includes any one or more of the following content: the resource of the sidelink, the resource of the uplink, and the resource of the downlink, the resource of the uplink includes the resource of the uplink between the first terminal device and the network device, the resource of the downlink includes the resource of the downlink between the first terminal device and the network device, and the sidelink is the wireless direct communication link between the first terminal device and the second terminal device;
information about the first resource;
resource type information of the first resource;
time domain information of the first resource;
time domain position information of the first resource;
time domain length information of the first resource;
frequency domain information of the first resource;
frequency domain position information of the first resource;
frequency domain bandwidth information of the first resource;
a periodicity or an interval of the first resource;
duration of the first resource;
time information of releasing the first resource by the first terminal device;
information about releasing the $1^{st}$ time-frequency resource of the first resource by the first terminal device;
time domain information of releasing the $1^{st}$ time-frequency resource of the first resource by the first terminal device;
frequency domain information of releasing the $1^{st}$ time-frequency resource of the first resource by the first terminal device;
a time interval between time at which the first terminal device releases the first resource and time at which the first terminal device sends the first information;
an indication that the first terminal device senses, selects, or obtains, through contention, the third resource, where the third resource includes the second-mode resource of the sidelink, and the third resource includes a resource selected, contended for, or sensed by the first terminal device and/or a resource reserved by the first terminal device;
an indication that the first terminal device reserves the third resource;
an indication that the first resource overlaps the third resource in time domain;
information about the third resource;
resource type information of the third resource;
time domain information of the third resource;
time domain length information of the third resource;
time domain position information of the third resource;
frequency domain information of the third resource;
frequency domain bandwidth information of the third resource;
frequency domain position information of the third resource;
a periodicity or a time interval of the third resource;

duration of the third resource;
a periodicity or a time interval of a service or data transmitted on the first resource;
a periodicity or a time interval of a service or data transmitted on the third resource;
a time offset of the time domain position of the first resource relative to the time domain position at which the first terminal device sends the first information;
a time offset of a time domain position of the third resource relative to the time domain position at which the first terminal device sends the first information;
priority information of the service or the data transmitted on the first resource;
priority information of the service or the data transmitted on the third resource;
priority information of the first resource;
priority information of the third resource;
an indication that a priority of the first resource is lower than a priority of the third resource;
information about an overlapping resource in the first resource and the third resource; time domain information of the first resource overlapping the third resource;
information about a time domain offset of the first resource relative to the third resource;
information about a resource that does not overlap the third resource;
an indication that the first terminal device requests the second resource from the network device;
information about the second resource;
resource type information of the second resource;
time domain information of the second resource;
frequency domain information of the second resource;
a periodicity or an interval of the second resource;
information about a time domain offset of the second resource relative to the third resource;
the information about the frequency domain offset of the first resource relative to the third resource;
an indication that the first terminal device has resource reservation;
information about a resource reserved by the first terminal device;
an indication that the first terminal device may perform retransmission;
a quantity of retransmission times or a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the transceiver module 1001 is configured to:
receive, by using any one of RRC signaling, MAC signaling, and physical layer signaling, the first information sent by the first terminal device.

In this embodiment, when the first terminal device determines to release the first resource, the transceiver module 1001 may receive the first information sent by the first terminal device, so that the processing module 1002 determines the first resource released by the first terminal device. In this way, the processing module 1002 may allocate the first resource to another terminal device, to improve resource utilization.

Optionally, the communication processing apparatus shown in FIG. 9 may be further configured to perform steps performed by the first terminal device in the embodiments shown in FIG. 3A and FIG. 3C. Reference may be made to related descriptions in the foregoing embodiments. The communication processing apparatus includes:
a processing module 901, configured to reselect a fourth resource when a third condition is met, where the fourth resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device.

In a possible implementation, the third condition includes any one or more of the following content:
a fifth resource overlaps a sixth resource in time domain, where the fifth resource includes any one or more of the following content: a resource of the sidelink, a resource of an uplink, and a resource of a downlink, the sixth resource includes a second-mode resource of the sidelink, the resource of the uplink includes a resource of an uplink between the first terminal device and a network device, and the resource of the downlink includes a resource of a downlink between the first terminal device and the network device;
the fifth resource periodically overlaps the sixth resource in time domain;
the fifth resource overlaps the sixth resource for N times in time domain, where N is an integer greater than 0;
the fifth resource is to overlap the sixth resource in time domain;
the fifth resource is to periodically overlap the sixth resource in time domain;
the fifth resource is to overlap the sixth resource for N times in time domain;
the sixth resource overrides the fifth resource or the sixth resource overrides the fifth resource;
the sixth resource periodically overrides the fifth resource or the fifth resource periodically overrides the sixth resource;
the sixth resource overrides the fifth resource for N times or the fifth resource overrides the sixth resource for N times;
the sixth resource is to override the fifth resource or the fifth resource is to override the sixth resource;
the sixth resource is to periodically override the fifth resource or the fifth resource is to periodically override the sixth resource;
the sixth resource is to override the fifth resource for N times or the fifth resource is to override the sixth resource for N times;
second duration is greater than a seventh threshold, where the second duration is a time difference between a time domain position of the sixth resource and a moment at which the first terminal device releases the sixth resource; and
the sixth resource includes a periodic time-frequency resource.

In another possible implementation, the communication processing apparatus further includes a transceiver module 902.
The transceiver module 902 is configured to:
send third information to a third terminal device, where the third information is used to indicate that the first terminal device releases a sixth resource, and the sixth resource includes the second-mode resource of the sidelink.

In another possible implementation, the transceiver module 902 is configured to:

send the third information to the third terminal device by using any one of SCI, RRC signaling, MAC signaling, and physical layer signaling.

In another possible implementation, the third information includes at least one of the following:

an indication that the first terminal device releases the sixth resource, where the sixth resource includes the second-mode resource of the sidelink;
information about the sixth resource;
resource type information of the sixth resource;
time domain information of the sixth resource;
time domain position information of the sixth resource;
time domain length information of the sixth resource;
frequency domain information of the sixth resource;
frequency domain position information of the sixth resource;
frequency domain bandwidth information of the sixth resource;
a periodicity or an interval of the sixth resource;
duration of the sixth resource;
time information of releasing the sixth resource by the first terminal device;
information about releasing the $1^{st}$ time-frequency resource of the sixth resource by the first terminal device;
time domain information of releasing the $1^{st}$ time-frequency resource of the sixth resource by the first terminal device;
frequency domain information of releasing the $1^{st}$ time-frequency resource of the sixth resource by the first terminal device;
a time interval between time at which the first terminal device releases the sixth resource and a moment at which the first terminal device sends the third information;
an indication that the first terminal device senses, selects, or obtains, through contention, the sixth resource, where the sixth resource includes a resource selected, contended for, or sensed by the first terminal device and/or a resource reserved by the first terminal device;
an indication that the first terminal device reserves the sixth resource;
an indication that the fifth resource overlaps the sixth resource in time domain, where the fifth resource includes any one or more of the following content: the resource of the sidelink, the resource of the uplink, and the resource of the downlink, and the sixth resource includes the second-mode resource of the sidelink;
information about the fifth resource;
resource type information of the fifth resource;
time domain information of the fifth resource;
time domain length information of the fifth resource;
time domain position information of the fifth resource;
frequency domain information of the fifth resource;
frequency domain bandwidth information of the fifth resource;
frequency domain position information of the fifth resource;
a periodicity or a time interval of the fifth resource;
duration of the fifth resource;
a periodicity or a time interval of a service transmitted on the fifth resource;
a periodicity or a time interval of a service transmitted on the sixth resource;
a time offset of a time domain position of the fifth resource relative to a time domain position at which the first terminal device sends the third information;
priority information of a service or data transmitted on the fifth resource;
priority information of a service or data transmitted on the sixth resource;
priority information of the fifth resource;
priority information of the sixth resource;
an indication that a priority of the sixth resource is lower than a priority of the fifth resource;
time domain information of the fifth resource overlapping the sixth resource;
information about a time domain offset of the sixth resource relative to the fifth resource;
information about a resource that does not overlap the fifth resource;
an indication that the first terminal device has resource reservation;
information about a resource reserved by the first terminal device;
an indication that the first terminal device may perform retransmission;
a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the processing module 902 is further configured to:

determine that a priority of the sixth resource is lower than a priority of the fifth resource when a fourth condition is met, where the fifth resource includes any one or more of the following content: the resource of the sidelink, the resource of the uplink, and the resource of the downlink, and the sixth resource includes the second-mode resource of the sidelink; and
determine to release the sixth resource.

In another possible implementation, the fourth condition includes any one or more of the following content:

a priority of sidelink transmission for the first mode is higher than a priority of sidelink transmission for the second mode;
a priority of uplink transmission is higher than the priority of the sidelink transmission for the second mode;
a priority of downlink transmission is higher than the priority of the sidelink transmission for the second mode;
a priority of a service or data transmitted on the fifth resource is higher than a priority of a service or data transmitted on the sixth resource;
priority information of the service or the data transmitted on the fifth resource is greater than or equal to or is less than or equal to a second threshold;
priority information of the service or the data transmitted on the sixth resource is greater than or equal to or is less than or equal to a third threshold;
a priority of the fifth resource is higher than a priority of the sixth resource;
a measurement result for the first mode of the sidelink is higher than a measurement result for the second mode of the sidelink;
a measurement result of the uplink is higher than the measurement result for the second mode of the sidelink;

a measurement result of the downlink is higher than the measurement result for the second mode of the sidelink;

the measurement result for the first mode of the sidelink is greater than or equal to or is less than or equal to a fourth threshold;

the measurement result of the uplink is greater than or equal to or is less than or equal to the fourth threshold;

the measurement result of the downlink is greater than or equal to or is less than or equal to the fourth threshold;

the measurement result for the second mode of the sidelink is greater than or less than a fifth threshold;

a measurement result of the fifth resource is higher than a measurement result of the sixth resource;

the measurement result of the fifth resource is greater than or equal to or is less than or equal to the fourth threshold;

a measurement result of the sixth resource is greater than or equal to or is less than or equal to the fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

the fifth resource includes a resource shared by the first terminal device and another terminal device, where the resource shared by the first terminal device and the another terminal device includes a first-type configured grant resource and/or a second-mode resource of the sidelink, and the first-type configured grant includes a sidelink resource and/or an uplink resource provided by the network device by using RRC signaling;

the fifth resource includes a dedicated resource of the first terminal device;

a start time domain position of the fifth resource is before a start time domain position of the sixth resource;

the fifth resource includes a periodic third time-frequency resource, the sixth resource includes a periodic fourth time-frequency resource, and a periodicity of the third time-frequency resource is greater than or less than a periodicity of the fourth time-frequency resource;

the fifth resource includes the periodic third time-frequency resource, the sixth resource includes the periodic fourth time-frequency resource, and a time interval between two adjacent third time-frequency resources is greater than or less than a time interval between two adjacent fourth time-frequency resources;

a size of the fifth source is greater than or less than a size of the sixth resource; and a proportion of an overlapping resource in the sixth resource to the sixth resource is greater than or less than a proportion of an overlapping resource in the fifth resource to the fifth resource.

In this embodiment, the processing module 901 reselects the fourth resource used for a second mode for the sidelink when the third condition is met, where the sidelink is the wireless direct communication link between the first terminal device and the second terminal device. Triggering the communication processing apparatus to reselect the fourth resource used for the second mode for the sidelink may be set, for example, when any one or more of a first-mode resource of the sidelink, the resource of the uplink, and the resource of the downlink overlap a selected or reserved sixth resource used for the second mode for the sidelink, the processing module 901 may reselect the fourth resource used for the second mode for the sidelink in this case, to improve transmission performance of sidelink transmission for the first mode, uplink transmission, downlink transmission, and sidelink transmission for the second mode.

Optionally, the communication processing apparatus shown in FIG. 9 may be further configured to perform steps performed by the first terminal device in the embodiments shown in FIG. 4A and FIG. 4D. Reference may be made to related descriptions in the foregoing embodiments. The communication processing apparatus includes:

a transceiver module 902, configured to send fourth information to a third terminal device, where the fourth information is used to indicate that the first terminal device releases a seventh resource and/or indicate the seventh resource released by the first terminal device, the seventh resource includes a resource of a sidelink, and the sidelink is a wireless direct communication link between the first terminal device and a second terminal device.

In a possible implementation, the transceiver module 902 is configured to:

send the fourth information to the third terminal device when a fifth condition is met, where the fifth condition includes at least one of the following conditions:

the seventh resource overlaps an eighth resource in time domain, where the seventh resource includes a first-mode resource of the sidelink and/or a second-mode resource of the sidelink, the eighth resource includes any one or more of the following content: the first-mode resource of the sidelink, the second-mode resource of the sidelink, a resource of an uplink, and a resource of a downlink, the first-mode resource of the sidelink includes a resource scheduled by a network device for the first terminal device, the second-mode resource of the sidelink includes a resource selected, contended for, or sensed by the first terminal device and/or a resource reserved by the first terminal device, the resource of the uplink includes a resource of an uplink between the first terminal device and the network device, and the resource of the downlink includes a resource of a downlink between the first terminal device and the network device;

the seventh resource periodically overlaps the eighth resource in time domain;

the seventh resource overlaps the eighth resource for N times in time domain, where N is an integer greater than 0;

the seventh resource is to overlap the eighth resource in time domain;

the seventh resource is to periodically overlap the eighth resource in time domain;

the seventh resource is to overlap the eighth resource for N times in time domain;

the seventh resource overrides the eighth resource or the eighth resource overrides the seventh resource;

the eighth resource periodically overrides the seventh resource or the seventh resource periodically overrides the eighth resource;

the eighth resource overrides the seventh resource for N times or the seventh resource overrides the eighth resource for N times;

the eighth resource is to override the seventh resource or the seventh resource is to override the eighth resource;

the eighth resource is to periodically override the seventh resource or the seventh resource is to periodically override the eighth resource;

the eighth resource is to override the seventh resource for N times or the seventh resource is to override the eighth resource for N times;

third duration is greater than an eighth threshold, where the third duration is a time difference between a time domain resource of the seventh resource and a moment at which the first terminal device releases the seventh resource, or is a time difference between a time domain position of the seventh resource and a time domain position at which the first terminal device sends the fourth information to the third terminal device;

the eighth resource includes a dedicated resource of the first terminal device;

the seventh resource includes a periodic time-frequency resource; and the first terminal device has a resource of the sidelink.

In another possible implementation, the transceiver module 902 is configured to: send the fourth information to the third terminal device by using any one of SCI, RRC signaling, MAC signaling, and physical layer signaling.

In another possible implementation, the fourth information includes at least one of the following:

an indication that the first terminal device releases the seventh resource;

information about the seventh resource;

resource type information of the seventh resource;

time domain information of the seventh resource;

time domain position information of the seventh resource;

time domain length information of the seventh resource;

frequency domain information of the seventh resource;

frequency domain position information of the seventh resource;

frequency domain bandwidth information of the seventh resource;

a periodicity or an interval of the seventh resource;

duration of the seventh resource;

time information of releasing the seventh resource by the first terminal device;

information about releasing the $1^{st}$ time domain resource of the seventh resource by the first terminal device;

time domain information of releasing the $1^{st}$ time-frequency resource of the first resource by the first terminal device;

frequency domain information of releasing the $1^{st}$ time-frequency resource of the first resource by the first terminal device;

a time interval between time at which the first terminal device releases the seventh resource and a moment at which the first terminal device sends the fourth information;

an indication that the first terminal device senses, selects, or obtains, through contention, the seventh resource;

an indication that the first terminal device reserves the seventh resource;

an indication that the eighth resource overlaps the seventh resource in time domain, where the eighth resource includes any one or more of the following content: the first-mode resource of the sidelink, the second-mode resource of the sidelink, the resource of the uplink, and the resource of the downlink, the resource of the uplink includes the resource of the uplink between the first terminal device and the network device, and the resource of the downlink includes the resource of the downlink between the first terminal device and the network device;

information about the eighth resource;

resource type information of the eighth resource;

time domain information of the eighth resource;

time domain length information of the eighth resource;

time domain position information of the eighth resource;

frequency domain information of the eighth resource;

frequency domain bandwidth information of the eighth resource;

frequency domain position information of the eighth resource;

a periodicity or a time interval of the eighth resource;

duration of the eighth resource;

a periodicity or a time interval of a service transmitted on the seventh resource;

a periodicity or a time interval of a service transmitted on the eighth resource;

a time offset of the time domain position of the seventh resource relative to a time domain position at which the first terminal device sends the fourth information;

a time offset of a time domain position of the eighth resource relative to the time domain position at which the first terminal device sends the fourth information;

priority information of the service transmitted on the seventh resource;

priority information of the service transmitted on the eighth resource;

priority information of the seventh resource;

priority information of the eighth resource;

an indication that a priority of the seventh resource is lower than a priority of the eighth resource;

time domain information of the seventh resource overlapping the eighth resource;

information about a time domain offset of the seventh resource relative to the eighth resource;

information about a resource that does not overlap the eighth resource;

an indication that the first terminal device has resource reservation;

information about a resource reserved by the first terminal device;

an indication that the first terminal device may perform retransmission;

a quantity of retransmission times and/or a maximum quantity of retransmission times of the first terminal device;

a time interval between initial transmission and retransmission of the first terminal device; and frequency domain information of the initial transmission and frequency domain information of the retransmission of the first terminal device.

In another possible implementation, the communication processing apparatus further includes a processing module, where the processing module 901 is configured to:

determine that the priority of the seventh resource is lower than the priority of the eighth resource when a sixth condition is met, where the seventh resource includes the first-mode resource of the sidelink and/or the second-mode resource of the sidelink, the eighth resource includes any one or more of the following content: the resource of the sidelink, the resource of the uplink, and the resource of the downlink, the resource of the uplink includes the resource of the uplink between the first terminal device and the network device, and the resource of the downlink includes the resource of the downlink between the first terminal device and the network device; and determine to release the seventh resource.

In another possible implementation, the sixth condition includes any one or more of the following content:
- a priority of sidelink transmission for the first mode is higher than a priority of sidelink transmission for the second mode;
- a priority of uplink transmission is higher than the priority of the sidelink transmission for the second mode;
- a priority of downlink transmission is higher than the priority of the sidelink transmission for the second mode;
- a priority of a service or data transmitted on the eighth resource is higher than a priority of a service or data transmitted on the seventh resource;
- priority information of the service or the data transmitted on the seventh resource is greater than or equal to or is less than or equal to a second threshold;
- priority information of the service or the data transmitted on the eighth resource is greater than or equal to or is less than or equal to a third threshold;
- the priority of the eighth resource is higher than the priority of the seventh resource;
- a measurement result for the first mode of the sidelink is higher than a measurement result for the second mode of the sidelink;
- a measurement result of the uplink is higher than the measurement result for the second mode of the sidelink;
- a measurement result of the downlink is higher than the measurement result for the second mode of the sidelink;
- the measurement result for the first mode of the sidelink is greater than or equal to or is less than or equal to a fourth threshold;
- the measurement result of the uplink is greater than or equal to or is less than or equal to the fourth threshold;
- the measurement result of the downlink is greater than or equal to or is less than or equal to the fourth threshold;
- the measurement result for the second mode of the sidelink is greater than or less than a fifth threshold;
- a measurement result of the eighth resource is higher than a measurement result of the seventh resource;
- a measurement result of the seventh resource is greater than or equal to or is less than or equal to the fourth threshold;
- a measurement result of the eighth resource is greater than or equal to or is less than or equal to the fifth threshold;
- priority information of the sidelink transmission for the first mode is greater than or equal to or is less than or equal to a sixth threshold;
- priority information of the uplink transmission is greater than or equal to or is less than or equal to the sixth threshold;
- priority information of the downlink transmission is greater than or equal to or is less than or equal to the sixth threshold;
- priority information of the sidelink transmission for the second mode is greater than or equal to or is less than or equal to the sixth threshold;
- the eighth resource includes a resource shared by the first terminal device and another terminal device, where the resource shared by the first terminal device and the another terminal device includes a first-type configured grant resource and/or the second-mode resource of the sidelink, and the first-type configured grant includes a sidelink resource and/or an uplink resource provided by the network device by using RRC signaling;
- a start time domain position of the eighth resource is before or after a start time domain position of the seventh resource;
- the eighth resource includes a periodic fifth time-frequency resource, the seventh resource includes a periodic sixth time-frequency resource, and a periodicity of the fifth time-frequency resource is greater than or less than a periodicity of the sixth time-frequency resource;
- the eighth resource includes the periodic fifth time-frequency resource, the seventh resource includes the periodic sixth time-frequency resource, and a time interval between two adjacent fifth time-frequency resources is greater than or less than a time interval between two adjacent sixth time-frequency resources;
- a size of the eighth resource is less than or greater than a size of the seventh resource;
- a proportion of an overlapping resource in the seventh resource to the seventh resource is greater than or less than a proportion of an overlapping resource in the eighth resource to the eighth resource.

In this embodiment, the transceiver module 902 sends the fourth information to the third terminal device, where the fourth information is used to indicate that the first terminal device releases the seventh resource of the sidelink, and the sidelink is the wireless direct communication link between the first terminal device and the second terminal device. It can be learned that, after the communication processing apparatus determines to release the seventh resource of the sidelink, the transceiver module 902 may send the fourth information to a surrounding terminal device, to notify the surrounding terminal device of information about the seventh resource released by the first terminal device. In this way, the surrounding terminal device may select the seventh resource, to avoid or reduce waste of the seventh resource and improve resource utilization.

Optionally, the communication processing apparatus shown in FIG. 9 may be further configured to perform steps performed by the first terminal device in the embodiments shown in FIG. 5A, FIG. 5B, and FIG. 5F. Reference may be made to related descriptions in the foregoing embodiments. The communication processing apparatus includes:
- a processing module 901, configured to: determine a ninth resource, where the ninth resource is used for any one or more of the following content: sidelink transmission, uplink transmission, and downlink transmission, a sidelink is a wireless direct communication link between the first terminal device and a second terminal device, the uplink transmission is transmission of an uplink between the first terminal device and a network device, and the downlink transmission is transmission of a downlink between the first terminal device and the network device; and select a tenth resource based on the ninth resource, where the tenth resource includes a second-mode resource of the sidelink, and the second-mode resource of the sidelink includes a resource selected, contended for, or sensed by the first terminal device and/or a resource reserved by the first terminal device.

In a possible implementation, the tenth resource does not include any one of the following content:
- the ninth resource;
- all time-frequency resources in time domain in which the ninth resource is located;

a subset of the ninth resource; and all time-frequency resources in time domain in which the subset of the ninth resource is located.

In another possible implementation, the subset of the ninth resource includes a resource whose priority is higher than that of the tenth resource.

In another possible implementation, the processing module 901 is configured to:

determine that a priority of the ninth resource is higher than the priority of the tenth resource when a seventh condition is met; and select the tenth resource when excluding the ninth resource or any time domain resource in time domain in which the ninth resource is located.

In another possible implementation, the seventh condition includes any one or more of the following content:

a priority of sidelink transmission for the first mode is higher than a priority of sidelink transmission for the second mode;

a priority of the uplink transmission is higher than the priority of the sidelink transmission for the second mode;

a priority of the downlink transmission is higher than the priority of the sidelink transmission for the second mode;

a priority of a service or data transmitted on the ninth resource is higher than a priority of a service or data transmitted on the tenth resource;

priority information of the service or the data transmitted on the ninth resource is greater than or equal to or is less than or equal to a second threshold;

priority information of the service or the data transmitted on the tenth resource is greater than or equal to or is less than or equal to a third threshold;

the priority of the ninth resource is higher than the priority of the tenth resource;

a measurement result for the first mode of the sidelink is higher than a measurement result for the second mode of the sidelink;

a measurement result of the uplink is higher than the measurement result for the second mode of the sidelink;

a measurement result of the downlink is higher than the measurement result for the second mode of the sidelink;

the measurement result for the first mode of the sidelink is greater than or equal to or is less than or equal to a fourth threshold;

the measurement result of the uplink is greater than or equal to or is less than or equal to the fourth threshold;

the measurement result of the downlink is greater than or equal to or is less than or equal to the fourth threshold;

the measurement result for the second mode of the sidelink is greater than or equal to or is less than or equal to a fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

a measurement result of the ninth resource is higher than a measurement result of the tenth resource;

the measurement result of the ninth resource is greater than or equal to or is less than or equal to the fourth threshold;

the measurement result of the tenth resource is greater than or equal to or is less than or equal to the fifth threshold;

the ninth resource includes a resource shared by the first terminal device and another terminal device, where the resource shared by the first terminal device and the another terminal device includes a first-type configured grant resource and/or the second-mode resource of the sidelink, and the first-type configured grant includes a sidelink resource and/or an uplink resource provided by the network device by using RRC signaling;

the ninth resource includes a dedicated resource of the first terminal device;

a start time domain position of the ninth resource is before or after a start time domain position of the tenth resource;

the ninth resource includes a periodic seventh time-frequency resource, the tenth resource includes a periodic eighth time-frequency resource, and a periodicity of the seventh time-frequency resource is greater than or less than a periodicity of the eighth time-frequency resource;

the ninth resource includes the periodic seventh time-frequency resource, the tenth resource includes the periodic eighth time-frequency resource, and a time interval between two adjacent seventh time-frequency resources is greater than or less than a time interval between two adjacent eighth time-frequency resources;

a size of the ninth resource is greater than a size of the tenth resource; and a proportion of an overlapping resource in the ninth resource to the ninth resource is greater than or less than a proportion of an overlapping resource in the tenth resource to the tenth resource.

In another possible implementation, the ninth resource includes any one or more of the following content:

a resource of the sidelink;

a first-mode resource of the sidelink;

a configured grant resource of the sidelink;

a first-type configured grant resource of the sidelink;

a second-type configured grant resource of the sidelink;

a dynamic grant resource of the sidelink;

a resource of the uplink;

a configured grant resource of the uplink;

a first-type configured grant resource of the uplink;

a second-type configured grant resource of the uplink;

a dynamic grant resource of the uplink;

a resource of the downlink;

a semi-persistently allocated resource of the downlink; and a dynamically allocated resource of the downlink, where the first-type configured grant includes a sidelink resource and/or an uplink resource that are/is provided by the network device by using RRC signaling, the second-type configured grant means that the network device provides a resource periodicity for the sidelink and/or a resource periodicity for the uplink by using RRC signaling and then activates the sidelink resource and/or the uplink resource by using a PDCCH or DCI, the dynamic grant resource includes a sidelink resource and/or an uplink resource that are/is scheduled by the network device by using a PDCCH or DCI, the semi-persistently allocated resource means that the network device provides a periodicity of the downlink resource by using RRC signaling and then activates the downlink resource by using a PDCCH or DCI, the dynamically allocated resource includes a downlink resource scheduled by the network device by using a PDCCH or DCI, the first-mode resource of the sidelink includes a sidelink resource scheduled by the network device for the terminal device, the first-mode resource of the sidelink includes the configured grant resource of the sidelink and/or the dynamic grant resource of the sidelink, and the configured grant resource of the sidelink includes the first-type configured grant resource of the sidelink and/or the second-type configured grant resource of the sidelink; and the tenth resource includes a resource selected, contended for, or sensed by the first terminal device and/or a resource reserved by the first terminal device.

In another possible implementation, the processing module 901 is configured to:

receive, before a sensing window ends, scheduling information sent by the network device, where a resource scheduled by the network device by using the scheduling information exists in a selection window; and determine, based on the scheduling information, the ninth resource scheduled by the network device for the first terminal device.

In this embodiment, the processing module 901 may determine the ninth resource. Then, the processing module 901 selects the tenth resource based on the ninth resource, where the tenth resource includes the second-mode resource of the sidelink. The processing module 901 may select the tenth resource with reference to a selection status of the scheduled ninth resource. In this way, a problem that the ninth resource overlaps the tenth resource in time domain can be avoided or reduced.

Optionally, the communication processing apparatus shown in FIG. 9 may be further configured to perform steps performed by the first terminal device in the embodiment shown in FIG. 6A. Reference may be made to related descriptions in the foregoing embodiment. The communication processing apparatus includes:

a transceiver module 902, configured to send fifth information to a network device, where the fifth information is used to indicate information about an eleventh resource and/or indicate that the first terminal device requests a twelfth resource from the network device, the eleventh resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device.

In a possible implementation, the transceiver module 902 is configured to:

send the fifth information to the network device when a ninth condition is met, where the ninth condition includes any one or more of the following content:

the first terminal device is in a connected state;

the first terminal device determines that a priority of the eleventh resource is higher than a priority of the twelfth resource, where the twelfth resource includes any one or more of the following content: a first-mode resource of the sidelink, a resource of an uplink, and a resource of a downlink, the first-mode resource of the sidelink includes a resource scheduled by the network device for the first terminal device, the resource of the uplink includes a resource of an uplink between the first terminal device and the network device, and the resource of the downlink includes a resource of a downlink between the first terminal device and the network device;

the first terminal device sends a resource request message to the network device, where the resource request message is used to request the twelfth resource from the network device;

the first terminal device senses, selects, or obtains, through contention, the eleventh resource and/or reserves the eleventh resource; and the first terminal device has a resource of the uplink.

In another possible implementation, the fifth information includes any one or more of the following information:

an indication that the first terminal device senses, selects, or obtains, through contention, the eleventh resource;

an indication that the first terminal device reserves the eleventh resource;

the information about the eleventh resource;

resource type information of the eleventh resource;

time domain information of the eleventh resource;

time domain length information of the eleventh resource;

time domain position information of the eleventh resource;

frequency domain information of the eleventh resource;

frequency domain bandwidth information of the eleventh resource;

frequency domain position information of the eleventh resource;

a periodicity or a time interval of the eleventh resource;

duration of the eleventh resource;

a periodicity or a time interval of a service or data transmitted on the eleventh resource;

a time offset of a time domain position of the eleventh resource relative to a time domain position at which the first terminal device sends the fifth information;

a time offset of a time domain position of the twelfth resource relative to the time domain position at which the first terminal device sends the fifth information;

priority information of the service or the data transmitted on the eleventh resource;

priority information of the eleventh resource;

information about a resource that does not overlap the eleventh resource;

an indication that the first terminal device requests the twelfth resource from the network device;

information about the twelfth resource;

resource type information of the twelfth resource;

time domain information of the twelfth resource;

time domain length information of the twelfth resource;

time domain position information of the twelfth resource;

frequency domain information of the twelfth resource;

frequency domain bandwidth information of the twelfth resource;

frequency domain position information of the twelfth resource;

a periodicity or an interval of the twelfth resource;

information about a time domain offset of the twelfth resource relative to the eleventh resource;

an indication that the first terminal device has resource reservation;

information about a resource reserved by the first terminal device;

an indication that the first terminal device may perform retransmission;

a maximum quantity of retransmission times of the first terminal device;

a time interval between initial transmission and retransmission of the first terminal device; and frequency domain information of the initial transmission and frequency domain information of the retransmission of the first terminal device.

In another possible implementation, the transceiver module 902 is configured to:

send the fifth information to the network device by using RRC signaling, MAC signaling, and physical layer signaling.

In another possible implementation, the transceiver module 902 is configured to:

determine that the priority of the eleventh resource is higher than the priority of the twelfth resource when a tenth condition is met; and send the fifth information to the network device, where the ninth condition includes any one or more of the following content:

a priority of sidelink transmission for the first mode is lower than a priority of sidelink transmission for the second mode;

a priority of uplink transmission is lower than the priority of the sidelink transmission for the second mode;

a priority of downlink transmission is lower than the priority of the sidelink transmission for the second mode;

a priority of the service or the data transmitted on the eleventh resource is higher than a priority of the service or the data transmitted on the twelfth resource;

priority information of the service or the data transmitted on the eleventh resource is greater than or less than a second threshold;

priority information of the service or the data transmitted on the twelfth resource is greater than or less than a third threshold;

the priority of the eleventh resource is higher than the priority of the sixth resource;

a measurement result for the second mode of the sidelink is higher than a measurement result for the first mode of the sidelink;

a measurement result of the uplink is lower than the measurement result for the second mode of the sidelink;

a measurement result of the downlink is lower than the measurement result for the second mode of the sidelink;

the measurement result for the second mode of the sidelink is greater than or equal to or is less than or equal to a fourth threshold;

the measurement result of the uplink is greater than or equal to or is less than or equal to the fourth threshold;

the measurement result of the downlink is greater than or equal to or is less than or equal to the fourth threshold;

the measurement result for the first mode of the sidelink is greater than or less than a fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

a measurement result of the eleventh resource is higher than a measurement result of the twelfth resource;

the measurement result of the eleventh resource is greater than or equal to or is less than or equal to the fourth threshold;

the measurement result of the eleventh resource is greater than or equal to or is less than or equal to the fifth threshold;

a start time domain position of the eleventh resource is before or after a start time domain position of the twelfth resource;

the eleventh resource includes a periodic ninth time-frequency resource, the twelfth resource includes a periodic tenth time-frequency resource, and a periodicity of the ninth time-frequency resource is greater than or less than a periodicity of the tenth time-frequency resource;

the eleventh resource includes the periodic ninth time-frequency resource, the twelfth resource includes the periodic tenth time-frequency resource, and a time interval between two adjacent ninth time-frequency resources is greater than or less than a time interval between two adjacent tenth time-frequency resources;

a size of the eleventh resource is less than a size of the twelfth resource; and a proportion of an overlapping resource in the eleventh resource to the eleventh resource is greater than or less than a proportion of an overlapping resource in the twelfth resource to the twelfth resource.

In this embodiment, the transceiver module 902 may send the fifth information to the network device, where the fifth information is used to indicate the information about the eleventh resource used for the second mode for the sidelink and/or indicate that the first terminal device requests the twelfth resource from the network device. In this way, when scheduling a resource for the first terminal device, the network device may schedule the resource for the first terminal device with reference to a selection status of the eleventh resource used for the second mode for the sidelink, to avoid or reduce overlap between the resource scheduled by the network device for the first terminal device and the eleventh resource.

Optionally, the communication processing apparatus shown in FIG. 10 may be further configured to perform steps performed by the network device in the embodiments shown in FIG. 6A, FIG. 6B, and FIG. 6C. Reference may be made to related descriptions in the foregoing embodiments. The communication processing apparatus includes:

a transceiver module 1001, configured to receive fifth information sent by a first terminal device, where the fifth information is used to indicate information about an eleventh resource and/or indicate that the first terminal device requests a twelfth resource from the network device, the eleventh resource includes a second-mode resource of a sidelink, the second-mode resource of the sidelink includes a resource selected, contended for, or sensed by the first terminal device and/or a resource reserved by the first terminal device, and the sidelink is a wireless direct communication link between the first terminal device and a second terminal device.

In a possible implementation, the communication processing apparatus further includes a processing module 1002, where the processing module 1002 is configured to:

schedule the twelfth resource for the first terminal device based on the fifth information, where the twelfth resource includes any one or more of the following content: a first-mode resource of the sidelink, a resource of an uplink, and a resource of a downlink, the resource of the uplink is a resource of an uplink between the first terminal device and the network device, and the resource of the downlink is a resource of a downlink between the first terminal device and the network device.

In another possible implementation, the twelfth resource does not include any one of the following content:

the eleventh resource;
all time-frequency resources in time domain in which the eleventh resource is located;
a subset of the eleventh resource; and
all time-frequency resources in time domain in which the subset of the eleventh resource is located.

In another possible implementation, the subset of the eleventh resource includes a resource whose priority is higher than that of the twelfth resource.

In another possible implementation, the processing module 1002 is configured to:

determine that a priority of the eleventh resource is higher than the priority of the twelfth resource when an eighth condition is met; and
schedule the twelfth resource for the first terminal device when excluding the eleventh resource or any time-frequency resource in time domain in which the eleventh resource is located.

In another possible implementation, the eighth condition includes any one or more of the following content:

a priority of sidelink transmission for the first mode is lower than a priority of sidelink transmission for the second mode;
a priority of uplink transmission is lower than the priority of the sidelink transmission for the second mode;
a priority of downlink transmission is lower than the priority of the sidelink transmission for the second mode;
a priority of a service or data transmitted on the eleventh resource is higher than a priority of a service or data transmitted on the twelfth resource;
priority information of the service or the data transmitted on the eleventh resource is greater than or less than a second threshold;
priority information of the service or the data transmitted on the twelfth resource is greater than or less than a third threshold;
the priority of the eleventh resource is higher than the priority of the sixth resource;
a measurement result for the second mode of the sidelink is higher than a measurement result for the first mode of the sidelink;
a measurement result of the uplink is lower than the measurement result for the second mode of the sidelink;
a measurement result of the downlink is lower than the measurement result for the second mode of the sidelink;
the measurement result for the second mode of the sidelink is greater than or equal to or is less than or equal to a fourth threshold;
the measurement result of the uplink is greater than or equal to or is less than or equal to the fourth threshold;
the measurement result of the downlink is greater than or equal to or is less than or equal to the fourth threshold;
the measurement result for the first mode of the sidelink is greater than or less than a fifth threshold;
priority information of the sidelink transmission for the first mode is greater than or equal to or is less than or equal to a sixth threshold;
priority information of the uplink transmission is greater than or equal to or is less than or equal to the sixth threshold;
priority information of the downlink transmission is greater than or equal to or is less than or equal to the sixth threshold;
priority information of the sidelink transmission for the second mode is greater than or equal to or is less than or equal to the sixth threshold;
a measurement result of the eleventh resource is higher than a measurement result of the twelfth resource;
the measurement result of the eleventh resource is greater than or equal to or is less than or equal to the fourth threshold;
the measurement result of the eleventh resource is greater than or equal to or is less than or equal to the fifth threshold;
a start time domain position of the eleventh resource is before or after a start time domain position of the twelfth resource;
the eleventh resource includes a periodic ninth time-frequency resource, the twelfth resource includes a periodic tenth time-frequency resource, and a periodicity of the ninth time-frequency resource is greater than or less than a periodicity of the tenth time-frequency resource;
the eleventh resource includes the periodic ninth time-frequency resource, the twelfth resource includes the periodic tenth time-frequency resource, and a time interval between two adjacent ninth time-frequency resources is greater than or less than a time interval between two adjacent tenth time-frequency resources;
a size of the eleventh resource is less than a size of the twelfth resource; and
a proportion of an overlapping resource in the eleventh resource to the eleventh resource is greater than or less than a proportion of an overlapping resource in the twelfth resource to the twelfth resource.

In another possible implementation, the fifth information includes any one or more of the following information:

an indication that the first terminal device senses, selects, or obtains, through contention, the eleventh resource;
an indication that the first terminal device reserves the eleventh resource;
the information about the eleventh resource;
resource type information of the eleventh resource;
time domain information of the eleventh resource;
time domain length information of the eleventh resource;
time domain position information of the eleventh resource;
frequency domain information of the eleventh resource;
frequency domain bandwidth information of the eleventh resource;
frequency domain position information of the eleventh resource;
a periodicity or a time interval of the eleventh resource;
duration of the eleventh resource;

a periodicity or a time interval of a service or data transmitted on the eleventh resource;
a time offset of a time domain position of the eleventh resource relative to a time domain position at which the first terminal device sends the fifth information;
a time offset of a time domain position of the twelfth resource relative to the time domain position at which the first terminal device sends the fifth information;
priority information of the service or the data transmitted on the eleventh resource;
priority information of the eleventh resource;
information about a resource that does not overlap the eleventh resource;
an indication that the first terminal device requests the twelfth resource from the network device;
information about the twelfth resource;
resource type information of the twelfth resource;
time domain information of the twelfth resource;
time domain length information of the twelfth resource;
time domain position information of the twelfth resource;
frequency domain information of the twelfth resource;
frequency domain bandwidth information of the twelfth resource;
frequency domain position information of the twelfth resource;
a periodicity or an interval of the twelfth resource;
information about a time domain offset of the twelfth resource relative to the eleventh resource;
an indication that the first terminal device has resource reservation;
information about a resource reserved by the first terminal device;
an indication that the first terminal device may perform retransmission;
a maximum quantity of retransmission times of the first terminal device;
a time interval between initial transmission and retransmission of the first terminal device; and
frequency domain information of the initial transmission and frequency domain information of the retransmission of the first terminal device.

In another possible implementation, the transceiver module 1001 is configured to:
receive, by using any one of RRC signaling, MAC signaling, and physical layer signaling, the fifth information sent by the first terminal device.

In this embodiment, the transceiver module 1001 may receive the fifth information sent by the first terminal device, where the fifth information is used to indicate the information about the eleventh resource used for the second mode for the sidelink and/or indicate the first terminal device requests the twelfth resource from the network device. In this way, when scheduling a resource for the first terminal device, the communication processing apparatus may schedule the resource for the first terminal device with reference to a selection status of the eleventh resource used for the second mode for the sidelink, to avoid or reduce overlap between the resource scheduled by the communication processing apparatus for the first terminal device and the eleventh resource.

Optionally, the communication processing apparatus shown in FIG. 9 may be further configured to perform steps performed by the first terminal device in the embodiment shown in FIG. 7A. Reference may be made to related descriptions in the foregoing embodiment. The communication processing apparatus includes:

a processing module 901, configured to: obtain a transmission configuration, where the transmission configuration includes any one or more of a first dedicated time domain resource configuration, a second dedicated time domain resource configuration, an eighth dedicated time domain resource configuration, a ninth dedicated time domain resource configuration, a tenth dedicated time domain resource configuration, and an eleventh dedicated time domain resource configuration, the first dedicated time domain resource configuration includes a time domain resource configuration dedicated to a first mode for a sidelink, the second dedicated time domain resource configuration includes a time domain resource configuration dedicated to a second mode for the sidelink, the eighth dedicated time domain resource configuration includes a time domain resource configuration dedicated to sidelink sending for the first mode, the ninth dedicated time domain resource configuration includes a time domain resource configuration dedicated to sidelink sending for the second mode, the tenth dedicated time domain resource configuration includes a time domain resource configuration dedicated to sidelink receiving for the first mode, the eleventh dedicated time domain resource configuration includes a time domain resource configuration dedicated to sidelink receiving for the second mode, and the sidelink is a wireless direct communication link between the first terminal device and a second terminal device; and select a thirteenth resource based on the transmission configuration, where the thirteenth resource includes a second-mode resource of the sidelink, and the second-mode resource of the sidelink includes a resource selected, contended for, or sensed by the first terminal device and/or a resource reserved by the first terminal device.

In a possible implementation, the transmission configuration further includes any one or more of a third dedicated time domain resource configuration, a fourth dedicated time domain resource configuration, a fifth dedicated time domain resource configuration, a sixth dedicated time domain resource configuration, and a seventh dedicated time domain resource configuration;
the third dedicated time domain resource configuration is used for transmission of the sidelink;
the fourth dedicated time domain resource configuration is used for sending of the sidelink;
the fifth dedicated time domain resource configuration is used for receiving of the sidelink;
the sixth dedicated time domain resource configuration is used for uplink transmission; and
the seventh dedicated time domain resource configuration is used for downlink transmission, where the uplink transmission is uplink transmission for communication between the first terminal device and a network device, and the downlink transmission is downlink transmission for communication between the first terminal device and the network device.

In another possible implementation, the transmission configuration further includes a shared time domain resource configuration, and the shared time domain resource configuration is used for any one or more of the following content:
sidelink transmission for the first mode;
sidelink transmission for the second mode;
sidelink sending for the first mode;
sidelink sending for the second mode;
sidelink receiving for the first mode;
sidelink receiving for the second mode;

transmission of the sidelink;
sending of the sidelink;
receiving of the sidelink;
the uplink transmission; and
the downlink transmission, where the uplink transmission is the uplink transmission for communication between the first terminal device and the network device, and the downlink transmission is the downlink transmission for communication between the first terminal device and the network device.

In another possible implementation, the transmission configuration is specified in a communication protocol. The processing module 901 is configured to:
receive the transmission configuration sent by the network device;
receive sixth information sent by the network device, where the sixth information carries information about the transmission configuration; or
determine the transmission configuration according to a preset rule.

In this embodiment, the processing module 901 obtains the transmission configuration. Then, the first processing module 901 may select the thirteenth resource based on the transmission configuration, where the thirteenth resource includes the second-mode resource of the sidelink. A schedulable resource of the communication processing apparatus and a schedulable resource of the network device may be staggered as much as possible in time domain, so that a probability of overlap between the thirteenth resource selected by the communication processing apparatus and a resource scheduled by the network device for the communication processing apparatus can be avoided or reduced.

Optionally, the communication processing apparatus shown in FIG. 10 may be further configured to perform steps performed by the network device in the embodiment shown in FIG. 8A. Reference may be made to related descriptions in the foregoing embodiment. The communication processing apparatus includes:
a processing module 1002, configured to: obtain a transmission configuration, where the transmission configuration includes any one or more of a first dedicated time domain resource configuration, a second dedicated time domain resource configuration, an eighth dedicated time domain resource configuration, a ninth dedicated time domain resource configuration, a tenth dedicated time domain resource configuration, and an eleventh dedicated time domain resource configuration, the first dedicated time domain resource configuration includes a time domain resource configuration dedicated to a first mode for a sidelink, the second dedicated time domain resource configuration includes a time domain resource configuration dedicated to a second mode for the sidelink, the eighth dedicated time domain resource configuration includes a time domain resource configuration dedicated to sidelink sending for the first mode, the ninth dedicated time domain resource configuration includes a time domain resource configuration dedicated to sidelink sending for the second mode, the tenth dedicated time domain resource configuration includes a time domain resource configuration dedicated to sidelink receiving for the first mode, the eleventh dedicated time domain resource configuration includes a time domain resource configuration dedicated to sidelink receiving for the second mode, and the sidelink is a wireless direct communication link between a first terminal device and a second terminal device; and
select a fourteenth resource for the first terminal device based on the transmission configuration.

In a possible implementation, the transmission configuration further includes any one or more of a third dedicated time domain resource configuration, a fourth dedicated time domain resource configuration, a fifth dedicated time domain resource configuration, a sixth dedicated time domain resource configuration, and a seventh dedicated time domain resource configuration;
the third dedicated time domain resource configuration is used for transmission of the sidelink;
the fourth dedicated time domain resource configuration is used for sending of the sidelink;
the fifth dedicated time domain resource configuration is used for receiving of the sidelink;
the sixth dedicated time domain resource configuration is used for uplink transmission; and
the seventh dedicated time domain resource configuration is used for downlink transmission, where the uplink transmission is uplink transmission for communication between the first terminal device and a network device, and the downlink transmission is downlink transmission for communication between the first terminal device and the network device.

In another possible implementation, the transmission configuration further includes a shared time domain resource configuration, and the shared time domain resource configuration is used for any one or more of the following content:
sidelink transmission for the first mode;
sidelink transmission for the second mode;
sidelink sending for the first mode;
sidelink sending for the second mode;
sidelink receiving for the first mode;
sidelink receiving for the second mode;
transmission of the sidelink;
sending of the sidelink;
receiving of the sidelink;
the uplink transmission; and
the downlink transmission, where the uplink transmission is the uplink transmission for communication between the first terminal device and the network device, and the downlink transmission is the downlink transmission for communication between the first terminal device and the network device.

In another possible implementation, the transmission configuration is specified in a communication protocol, or the processing module 1002 is configured to:
determine the transmission configuration according to a preset rule.

In another possible implementation, the communication processing apparatus further includes a transceiver module 1001. The transceiver module 1001 is configured to:
send sixth information to the first terminal device, where the sixth information is used to carry information about the transmission configuration.

In this embodiment, the processing module 1002 obtains the transmission configuration, and the processing module 1002 may schedule the fourteenth resource for the first terminal device based on the transmission configuration. A schedulable resource of the communication processing apparatus and the thirteenth resource selected by the first terminal device may be staggered as much as possible in time domain, so that a probability of overlap between the fourteenth resource scheduled by the communication processing apparatus for the first terminal device and the thirteenth resource selected by the first terminal device can be avoided or reduced.

Figure 11:
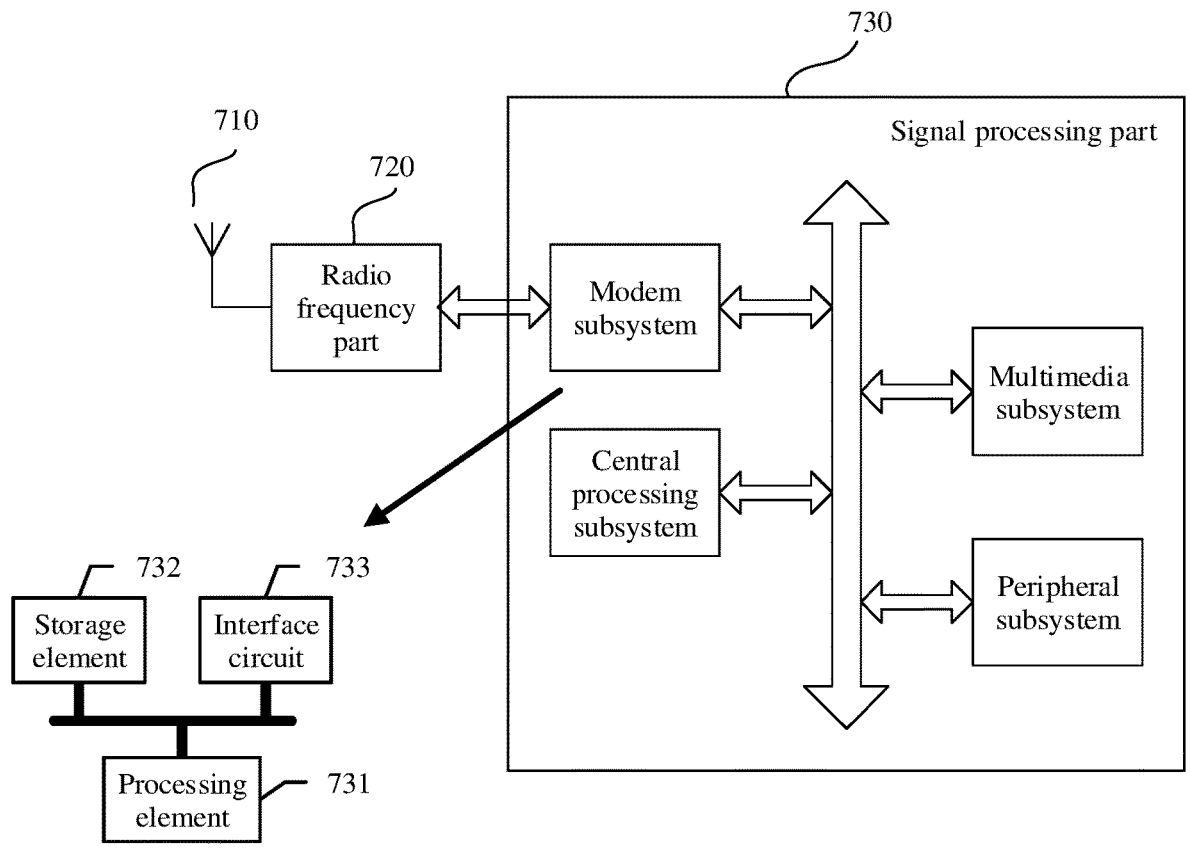
FIG. 11 is a schematic diagram of a structure of a first terminal device according to an embodiment.

FIG. 11 is a schematic diagram of a structure of a first terminal device according to an embodiment. The first terminal device may be the first terminal device in the foregoing embodiments and is configured to implement operations of the first terminal device in the foregoing embodiments. As shown in FIG. 11, the first terminal device includes an antenna 710, a radio frequency part 720, and a signal processing part 730. The antenna 710 is connected to the radio frequency part 720. In a downlink direction, the radio frequency part 720 receives, through the antenna 710, information sent by a network device, and sends, to the signal processing part 730 for processing, the information sent by the network device. In an uplink direction, the signal processing part 730 processes information from the first terminal device and sends the information to the radio frequency part 720. The radio frequency part 720 processes the information from the first terminal device, and then sends processed information to the network device through the antenna 710.

The signal processing part 730 may include a modem subsystem, configured to process data at each communication protocol layer. The signal processing part 730 may further include a central processing subsystem, configured to process an operating system and an application layer of the first terminal device. In addition, the signal processing part 730 may further include another subsystem such as a multimedia subsystem or a peripheral subsystem. The multimedia subsystem is configured to control a camera or a screen display of the terminal side. The peripheral subsystem is configured to connect to another device. The modem subsystem may be a separately disposed chip. Optionally, the foregoing apparatus used for the first terminal device may be located in the modem subsystem.

The modem subsystem may include one or more processing elements 731, for example, include one main control CPU and another integrated circuit. In addition, the modem subsystem may further include a storage element 732 and an interface circuit 733. The storage element 732 is configured to store data and a program. However, a program used to perform the methods performed by first the terminal device in the foregoing methods may not be stored in the storage element 732 but is stored in a memory outside the modem subsystem and is loaded and used by the modem subsystem when to be used. The interface circuit 733 is configured to communicate with another subsystem. The foregoing apparatus used for the first terminal device may be located in the modem subsystem, and the modem subsystem may be implemented by a chip. The chip includes at least one processing element and interface circuit. The processing element is configured to perform the steps of any one of the methods performed by the first terminal device. The interface circuit is configured to communicate with another apparatus. In an implementation, units of the first terminal device that implement the steps of the foregoing methods may be implemented by a program invoked by a processing element. For example, the apparatus used for the first terminal device includes a processing element and a storage element. The processing element invokes a program stored in the storage element, to perform the methods performed by the first terminal device in the foregoing method embodiments. The storage element may be a storage element located on a same chip as the processing element, that is, an on-chip storage element.

In another implementation, a program used to perform the methods performed by the first terminal device in the foregoing methods may be in a storage element located on a different chip from the processing element, that is, an off-chip storage element. In this case, the processing element invokes or loads the program from the off-chip storage element to the on-chip storage element, to invoke and perform the methods performed by the first terminal device in the foregoing method embodiments.

In still another implementation, units of the first terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated to form a chip.

The units of the first terminal device that implement the steps in the foregoing methods may be integrated together and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the first terminal device. Alternatively, at least one integrated circuit may be integrated into the chip, to implement the foregoing methods performed by the first terminal device. Alternatively, with reference to the foregoing implementations, functions of some units may be implemented by a program invoked by the processing element, and functions of some units may be implemented by the integrated circuit.

It can be learned that the foregoing apparatus used for the first terminal device may include at least one processing element and interface circuit. The at least one processing element is configured to perform any one of the methods that are provided in the foregoing method embodiments and performed by the first terminal device. The processing element may perform some or all steps performed by the first terminal device, in a first manner, by invoking the program stored in the storage element; or may perform some or all steps performed by the first terminal device, in a second manner, by using a hardware integrated logic circuit in the processor element in combination with instructions; or may perform, by combining the first manner and the second manner, some or all steps performed by the first terminal device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be a memory, or a general name of a plurality of storage elements.

Figure 12:
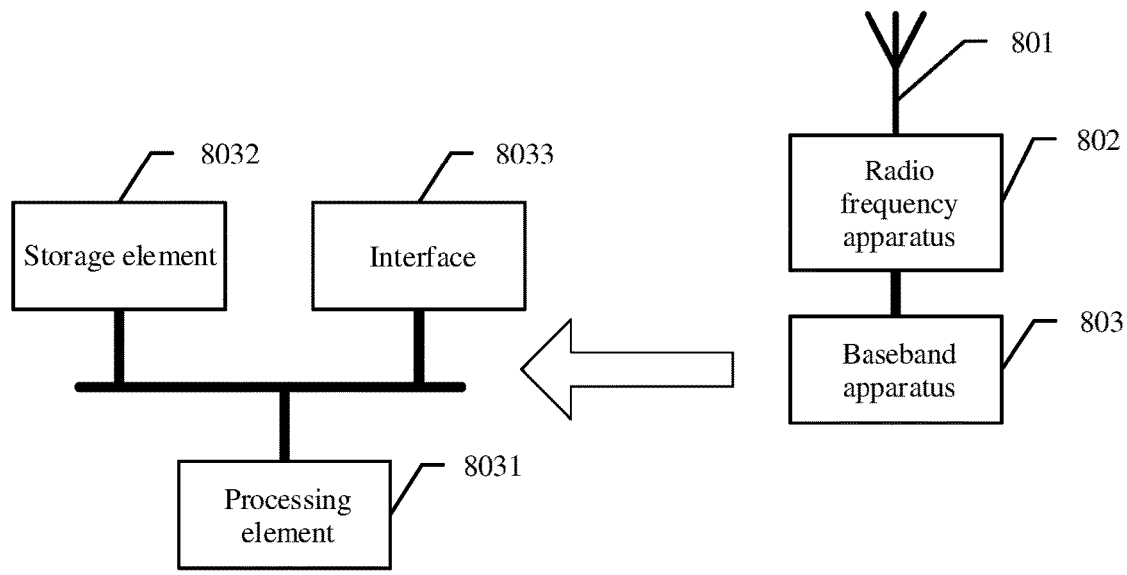
FIG. 12 is a schematic diagram of a structure of a network device according to an embodiment.
Figure 13:
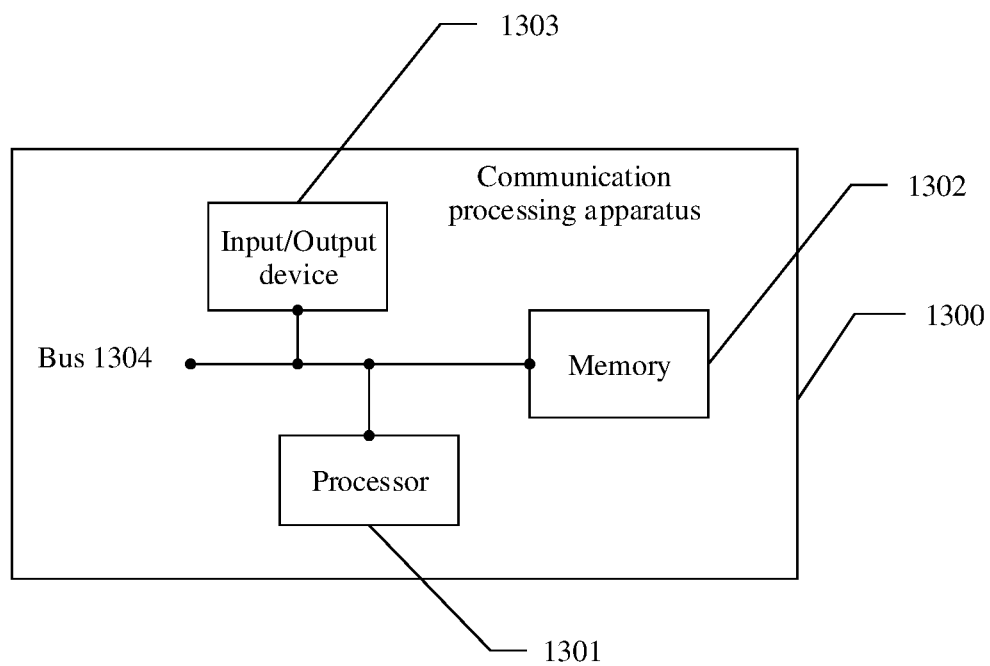
FIG. 13 is a schematic diagram of another structure of a communication processing apparatus according to an embodiment.

FIG. 12 is a schematic diagram of a structure of a network device according to an embodiment. The network device is configured to implement operations of the network device in the foregoing embodiments. As shown in FIG. 12, the network device includes an antenna 801, a radio frequency apparatus 802, and a baseband apparatus 803. The antenna 801 is connected to the radio frequency apparatus 802. In an uplink direction, the radio frequency apparatus 802 receives, through the antenna 801, information sent by a first terminal device, and sends, to the baseband apparatus 803 for processing, the information sent by the first terminal device. In a downlink direction, the baseband apparatus 803 processes information from the first terminal device and sends the information to the radio frequency apparatus 802. The radio frequency apparatus 802 processes the information from the first terminal device, and then sends processed information to the first terminal device through the antenna 801.

The baseband apparatus 803 may include one or more processing elements 8031, for example, include one main control CPU and another integrated circuit. In addition, the baseband apparatus 803 may further include a storage element 8032 and an interface 8033. The storage element 8032 is configured to store a program and data. The interface 8033 is configured to exchange information with the radio frequency apparatus 802. The interface is, for example, a common public radio interface (CPRI). The foregoing apparatus used for the network device may be located in the baseband apparatus 803. For example, the foregoing apparatus used for the network device may be a chip on the baseband apparatus 803. The chip includes at least one processing element and interface circuit. The processing element is configured to perform the steps of any one of the methods performed by the network device. The interface circuit is configured to communicate with another apparatus. In an implementation, units of the network device that implement the steps in the foregoing methods may be implemented by a program invoked by a processing element. For example, the apparatus used for the network device includes a processing element and a storage element. The processing element invokes a program stored in the storage element, to perform the methods performed by the network device in the foregoing method embodiments. The storage element may be a storage element located on a same chip as the processing element, that is, an on-chip storage element, or may be a storage element located on a different chip from the processing element, that is, an off-chip storage element.

In another implementation, units of the network device that implement the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated to form a chip.

The units of the network device that implement the steps in the foregoing methods may be integrated together and implemented in a form of a system-on-a-chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by a program invoked by the processing element, and functions of some units may be implemented by the integrated circuit.

The foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, by invoking the program stored in the storage element; or may perform some or all steps performed by the network device, in a second manner, by using a hardware integrated logic circuit in the processor element in combination with instructions; or may perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be a memory, or a general name of a plurality of storage elements.

An embodiment further provides a communication processing apparatus. The communication processing apparatus 1300 includes a processor 1301, a memory 1302, an input/output device 1303, and a bus 1304.

In a possible implementation, the processor 1301, the memory 1302, and the input/output device 1303 are separately connected to the bus 1304, and the memory stores computer instructions.

The processing module 1002 in the foregoing embodiment in FIG. 10 may be the processor 1301 in this embodiment. Therefore, a implementation of the processor 1301 is not described again. The transceiver module 1001 in the foregoing embodiment in FIG. 10 may be the input/output device 1303 in this embodiment. Therefore, a implementation of the input/output device 1303 is not described again.

Figure 14:
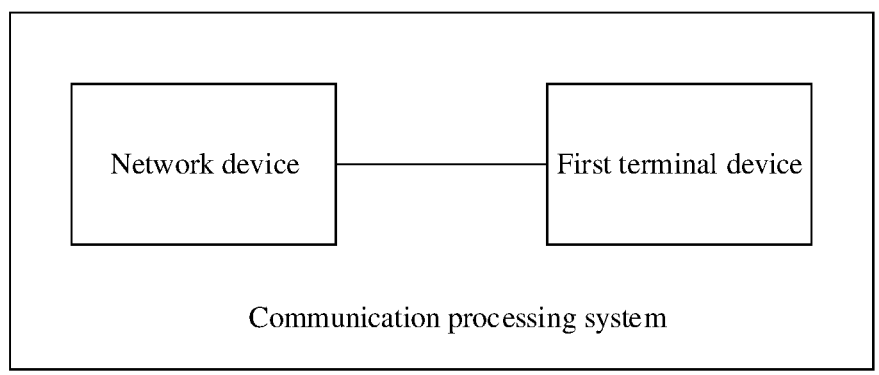
FIG. 14 is a schematic diagram of a communication processing system according to an embodiment.

An embodiment further provides a communication processing system. FIG. 14 is a schematic diagram of a structure of a communication processing system according to an embodiment. As shown in FIG. 14, the communication processing system may include a network device and a first terminal device. The first terminal device may be the communication processing apparatus shown in FIG. 9 and is configured to perform an action of the first terminal device in the foregoing method embodiments. The network device may be the communication processing apparatus shown in FIG. 10 and is configured to perform an action of the network device in the foregoing method embodiments.

It should be noted that, the processor in the embodiments may be an integrated circuit chip and has a signal processing capability. In an implementation process, the steps in the foregoing method embodiments may be completed by using a hardware integrated logic circuit in the processor, or by using instructions in a form of software. The processor may be a general-purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform the methods, the steps, and logical block diagrams in the embodiments. The general-purpose processor may be a microprocessor, or the processor may be any conventional processor or the like. Steps of the methods with reference to the embodiments may be directly performed and completed by a hardware decoding processor or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps of the foregoing methods in combination with the hardware of the processor.

It may be understood that the memory in the embodiments may be a volatile memory or a nonvolatile memory or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described include but are not limited to these memories and any memory of another suitable type.

An embodiment further provides a computer-readable medium. The computer-readable medium stores a computer program. When the computer program is executed by a computer, the communication method in any one of the foregoing method embodiments is implemented.

An embodiment further provides a computer program product. When the computer program product is executed by a computer, the communication method in any one of the foregoing method embodiments is implemented.

An embodiment further provides a processing apparatus, including a processor and an input/output port. The processor is configured to perform a processing function in the communication processing method in any one of the foregoing method embodiments. The input/output port is configured to perform a transceiver function in the communication processing method in any one of the foregoing method embodiments.

It should be understood that the processing apparatus may be a chip. The processor may be implemented by hardware or may be implemented by software. When implemented by the hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently.

It should be understood that "one embodiment" or "an embodiment" means that particular features, structures, or characteristics related to the embodiment are included in at least one embodiment. Therefore, "in one embodiment" or "in an embodiment" appearing does not refer to a same embodiment. In addition, these particular features, structures, or characteristics may be combined in one or more embodiments in any appropriate manner. It should be understood that sequence numbers of the foregoing processes do not mean execution sequences in various embodiments. The execution sequences of the processes should be determined based on functions and internal logic of the processes and should not be construed as any limitation on the implementation processes of the embodiments.

In addition, the terms "system" and "network" may be used interchangeably. It should be understood that in the embodiments, "B corresponding to A" indicates that B is associated with A, and B may be determined according to A. However, it should further be understood that determining B based on A does not mean that B is determined based on only A. B may also be alternatively determined based on A and/or other information.

A person of ordinary skill in the art may be aware that, in combination with the examples described in the embodiments, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on constraint conditions. A person skilled in the art may use different methods to implement the described functions, but it should not be considered that the implementation goes beyond the scope.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments, it should be understood that the system, apparatus, and method may be implemented in other manners. For example, the described apparatus embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments may be integrated into one processing unit, each of the units may exist alone physically, or two or more units may be integrated into one unit. The integrated unit may be implemented in a form of hardware or may be implemented in a form of a software functional unit.

With descriptions of the foregoing implementations, a person skilled in the art may clearly understand that the embodiments may be implemented by hardware, firmware, or a combination thereof. When implemented by software, the foregoing functions may be stored in a computer-readable medium or transmitted as one or more instructions or code in the computer-readable medium. The computer-readable medium includes a computer storage medium and a communication medium. The communication medium includes any medium that facilitates transmission of a computer program from one place to another. The storage medium may be any available medium accessible to a computer. The following provides an example but does not impose a limitation: The computer-readable medium may include a RAM, a ROM, an EEPROM, a CD-ROM, another compact disc storage or magnetic disk storage medium, another magnetic storage device, or any other medium that can carry or store expected program code in a form of instructions or a data structure and can be accessed by the computer. In addition, any connection may be properly defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, the optical fiber/cable, the twisted pair, the DSL or the wireless technologies such as infrared ray, radio and microwave are included in fixation of a medium to which they belong. A disk and disc may include a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, the embodiments, are not intended as limiting. Any modification, equivalent replacement, or improvement made without departing from the spirit and principle shall fall in the scope of the embodiments.

What is claimed is:

1. A communication processing method, comprising:
   generating, by a first terminal device, first information;
   sending, by the first terminal device, the first information to a network device, wherein the first information is used to indicate the following content:
      information indicating that the first terminal device releases a first resource, wherein the first resource overlaps a third resource for N times in a time domain, wherein N is an integer greater than zero; and
      information indicating that the first terminal device requests a second resource from the network device;
   comparing a priority of the first resource to a priority of the third resource to determine whether to release the first resource, wherein an overlapping part of the first resource and the third resource is selectively released.

2. The communication processing method according to claim 1, wherein the first resource and/or the second resource comprises any one or more of the following content:
   a resource of a sidelink;
   a first-mode resource of the sidelink;
   a configured grant resource of the sidelink;
   a first-type configured grant resource of the sidelink;
   a second-type configured grant resource of the sidelink;
   a dynamic grant resource of the sidelink;
   a resource of an uplink;
   a configured grant resource of the uplink;
   a first-type configured grant resource of the uplink;
   a second-type configured grant resource of the uplink;
   a dynamic grant resource of the uplink;
   a resource of a downlink;
   a semi-persistently allocated resource of the downlink; and
   a dynamically allocated resource of the downlink, wherein
   the sidelink is a wireless direct communication link between the first terminal device and a second terminal device, and the uplink and the downlink are links for communication between the first terminal device and the network device.

3. The communication processing method according to claim 1, wherein the sending, by the first terminal device, the first information to the network device comprises:
   sending, by the first terminal device, the first information to the network device when a first condition is met, wherein the first condition comprises any one or more of the following content:
   wherein the first resource comprises any one or more of the following content: the resource of the sidelink, the resource of the uplink, and the resource of the downlink, the third resource comprises a second-mode resource of the sidelink, the resource of the uplink is a resource of an uplink between the first terminal device and the network device, the resource of the downlink is a resource of a downlink between the first terminal device and the network device, the sidelink is the wireless direct communication link between the first terminal device and the second terminal device, and the second-mode resource of the sidelink comprises a sidelink resource selected, contended for, or sensed by the first terminal device;
   the third resource overrides the first resource or the first resource overrides the third resource;
   the third resource periodically overrides the first resource or the first resource periodically overrides the third resource;
   the third resource overrides the first resource for N times or the first resource overrides the third resource for N times;
   the third resource is to override the first resource or the first resource is to override the third resource;
   the third resource is to periodically override the first resource or the first resource is to periodically override the third resource;
   the third resource is to override the first resource for N times or the first resource is to override the third resource for N times;
   first duration is greater than or equal to a first threshold, wherein the first duration is a time difference between a time domain position of the first resource and a moment at which the first terminal device releases the first resource, or is a time difference between a time domain position of the first resource and a time domain position at which the first terminal device sends the first information;
   the first resource comprises a dedicated resource of the first terminal device;
   the first resource comprises a periodic time-frequency resource; and
   the first terminal device has a resource of the uplink.

4. The communication processing method according to claim 1, wherein the first information comprises any one or more of the following content:
   an indication that the first terminal device releases the first resource, wherein the first resource comprises any one or more of the following content: the resource of the sidelink, the resource of the uplink, and the resource of the downlink, the resource of the uplink is the resource of the uplink between the first terminal device and the network device, the resource of the downlink is the resource of the downlink between the first terminal device and the network device, and the sidelink is the wireless direct communication link between the first terminal device and the second terminal device;
   information about the first resource;
   resource type information of the first resource;
   time domain information of the first resource;
   time domain position information of the first resource;
   time domain length information of the first resource;
   frequency domain information of the first resource;

frequency domain position information of the first resource;
frequency domain bandwidth information of the first resource;
a periodicity or an interval of the first resource;
duration of the first resource;
time information of releasing the first resource by the first terminal device;
information about releasing the $1^{st}$ time-frequency resource of the first resource by the first terminal device;
time domain information of releasing the $1^{st}$ time-frequency resource of the first resource by the first terminal device;
frequency domain information of releasing the $1^{st}$ time-frequency resource of the first resource by the first terminal device;
a time interval between time at which the first terminal device releases the first resource and time at which the first terminal device sends the first information;
an indication that the first terminal device senses, selects, or obtains, through contention, the third resource, wherein the third resource comprises the second-mode resource of the sidelink, and the third resource comprises a resource selected, contended for, or sensed by the first terminal device and/or a resource reserved by the first terminal device;
an indication that the first terminal device reserves the third resource;
information about the third resource;
resource type information of the third resource;
time domain information of the third resource;
time domain length information of the third resource;
time domain position information of the third resource;
frequency domain information of the third resource;
frequency domain bandwidth information of the third resource;
frequency domain position information of the third resource;
a periodicity or a time interval of the third resource;
duration of the third resource;
a periodicity or a time interval of a service or data transmitted on the first resource;
a periodicity or a time interval of a service or data transmitted on the third resource;
a time offset of the time domain position of the first resource relative to the time domain position at which the first terminal device sends the first information;
a time offset of a time domain position of the third resource relative to the time domain position at which the first terminal device sends the first information;
an indication that a priority of the first resource is lower than a priority of the third resource;
information about a time domain offset of the first resource relative to the third resource;
information about a resource that does not overlap the third resource;
an indication that the first terminal device requests the second resource from the network device;
information about the second resource;
resource type information of the second resource;
time domain information of the second resource;
frequency domain information of the second resource;
a periodicity or an interval of the second resource;
information about a time domain offset of the second resource relative to the third resource;
the information about the frequency domain offset of the first resource relative to the third resource;
an indication that the first terminal device has resource reservation;
information about a resource reserved by the first terminal device;
an indication that the first terminal device may perform retransmission;
a quantity of retransmission times or a maximum quantity of retransmission times of the first terminal device;
a time interval between initial transmission and retransmission of the first terminal device; and
frequency domain information of the initial transmission and frequency domain information of the retransmission of the first terminal device.

5. The communication processing method according to claim 1, wherein before the sending, by the first terminal device, the first information to the network device, the method further comprises:
determining, by the first terminal device, that the priority of the first resource is lower than the priority of the third resource when a second condition is met, wherein the first resource comprises any one or more of the following content: the resource of the sidelink, the resource of the uplink, and the resource of the downlink, the third resource comprises the second-mode resource of the sidelink, the resource of the uplink is the resource of the uplink between the first terminal device and the network device, the resource of the downlink is the resource of the downlink between the first terminal device and the network device, and the sidelink is the wireless direct communication link between the first terminal device and the second terminal device; and
determining, by the first terminal device, to release the first resource.

6. The communication processing method according to claim 5, wherein the second condition comprises any one or more of the following content:
a priority of sidelink transmission for a first mode is lower than a priority of sidelink transmission for a second mode;
a priority of uplink transmission is lower than the priority of the sidelink transmission for the second mode;
a priority of downlink transmission is lower than the priority of the sidelink transmission for the second mode;
a priority of the service or the data transmitted on the first resource is lower than the priority information of the service or the data transmitted on the third resource;
the priority information of the service or the data transmitted on the first resource is greater than or equal to or is less than or equal to a second threshold;
the priority information of the service or the data transmitted on the third resource is greater than or equal to or is less than or equal to a third threshold;
the priority of the first resource is lower than the priority of the third resource;
a measurement result for the first mode of the sidelink is lower than a measurement result for the second mode of the sidelink;
a measurement result of the uplink is lower than the measurement result for the second mode of the sidelink;
a measurement result of the downlink is lower than the measurement result for the second mode of the sidelink;

the measurement result for the first mode of the sidelink is greater than or equal to or is less than or equal to a fourth threshold;

the measurement result of the uplink is greater than or equal to or is less than or equal to the fourth threshold;

the measurement result of the downlink is greater than or equal to or is less than or equal to the fourth threshold;

the measurement result for the second mode of the sidelink is greater than or equal to or is less than or equal to a fifth threshold;

priority information of the sidelink transmission for the first mode is greater than or equal to or is less than or equal to a sixth threshold;

priority information of the uplink transmission is greater than or equal to or is less than or equal to the sixth threshold;

priority information of the downlink transmission is greater than or equal to or is less than or equal to the sixth threshold;

priority information of the sidelink transmission for the second mode is greater than or equal to or is less than or equal to the sixth threshold;

a measurement result of the first resource is lower than a measurement result of the third resource;

the measurement result of the first resource is greater than or equal to or is less than or equal to the fourth threshold;

the measurement result of the third resource is greater than or equal to or is less than or equal to the fifth threshold;

the first resource comprises a resource shared by the first terminal device and another terminal device, wherein the resource shared by the first terminal device and the another terminal device comprises a first-type configured grant resource, and the first-type configured grant comprises a sidelink resource and/or an uplink resource provided by the network device by using radio resource control RRC (RRC) signaling;

a start time domain position of the first resource is after or before a start time domain position of the third resource;

the first resource comprises a periodic first time-frequency resource, the second resource comprises a periodic second time-frequency resource, and a periodicity of the first time-frequency resource is greater than or less than a periodicity of the second time-frequency resource;

the first resource comprises the periodic first time-frequency resource, the second resource comprises the periodic second time-frequency resource, and a time interval between two adjacent first time-frequency resources is greater than or less than a time interval between two adjacent second time-frequency resources;

a size of the first resource is greater than or less than a size of the third resource; and a proportion of an overlapping resource in the first resource to the first resource is greater than or less than a proportion of an overlapping resource in the third resource to the third resource.

7. The communication processing method of claim 3, comprising:

reselecting, by a first terminal device, a fourth resource when a third condition is met, wherein the fourth resource comprises a second-mode resource of a sidelink, the second-mode resource of the sidelink comprises a resource selected, contended for, or sensed by the first terminal device and/or a resource reserved by the first terminal device, and the sidelink is a wireless direct communication link between the first terminal device and a second terminal device.

8. The communication processing method according to claim 7, wherein the third condition comprises any one or more of the following content:

a fifth resource overlaps a sixth resource in time domain, wherein the fifth resource comprises any one or more of the following content: a resource of the sidelink, a resource of an uplink, and a resource of a downlink, the sixth resource comprises a second-mode resource of the sidelink, the resource of the uplink is a resource of an uplink between the first terminal device and a network device, and the resource of the downlink is a resource of a downlink between the first terminal device and the network device;

the fifth resource periodically overlaps the sixth resource in time domain;

the fifth resource overlaps the sixth resource for N times in time domain, wherein N is an integer greater than 0;

the fifth resource is to overlap the sixth resource in time domain;

the fifth resource is to periodically overlap the sixth resource in time domain;

the fifth resource is to overlap the sixth resource for N times in time domain;

the sixth resource overrides the fifth resource or the sixth resource overrides the fifth resource;

the sixth resource periodically overrides the fifth resource or the fifth resource periodically overrides the sixth resource;

the sixth resource overrides the fifth resource for N times or the fifth resource overrides the sixth resource for N times;

the sixth resource is to override the fifth resource or the fifth resource is to override the sixth resource;

the sixth resource is to periodically override the fifth resource or the fifth resource is to periodically override the sixth resource;

the sixth resource is to override the fifth resource for N times or the fifth resource is to override the sixth resource for N times;

second duration is greater than a seventh threshold, wherein the second duration is a time difference between a time domain position of the sixth resource and a moment at which the first terminal device releases the sixth resource; and the sixth resource comprises a periodic time-frequency resource.

9. The communication processing method according to claim 7, wherein before the reselecting, by the first terminal device, the fourth resource used for the second mode for the sidelink when the third condition is met, the method further comprises:

determining, by the first terminal device, that a priority of the sixth resource is lower than a priority of the fifth resource when a fourth condition is met, wherein the fifth resource comprises any one or more of the following content: the resource of the sidelink, the resource of the uplink, and the resource of the downlink, and the sixth resource comprises the second-mode resource of the sidelink; and determining, by the first terminal device, to release the sixth resource.

10. The communication processing method according to claim 9, wherein the fourth condition comprises any one or more of the following content:
- a priority of sidelink transmission for a first mode is higher than a priority of sidelink transmission for the second mode;
- a priority of uplink transmission is higher than the priority of the sidelink transmission for the second mode;
- a priority of downlink transmission is higher than the priority of the sidelink transmission for the second mode;
- a priority of a service or data transmitted on the fifth resource is higher than a priority of a service or data transmitted on the sixth resource;
- priority information of the service or the data transmitted on the fifth resource is greater than or equal to or is less than or equal to a second threshold;
- priority information of the service or the data transmitted on the sixth resource is greater than or equal to or is less than or equal to a third threshold;
- a priority of the fifth resource is higher than a priority of the sixth resource;
- a measurement result for the first mode of the sidelink is higher than a measurement result for the second mode of the sidelink;
- a measurement result of the uplink is higher than the measurement result for the second mode of the sidelink;
- a measurement result of the downlink is higher than the measurement result for the second mode of the sidelink;
- the measurement result for the first mode of the sidelink is greater than or equal to or is less than or equal to a fourth threshold;
- the measurement result of the uplink is greater than or equal to or is less than or equal to the fourth threshold;
- the measurement result of the downlink is greater than or equal to or is less than or equal to the fourth threshold;
- the measurement result for the second mode of the sidelink is greater than or less than a fifth threshold;
- a measurement result of the fifth resource is higher than a measurement result of the sixth resource;
- the measurement result of the fifth resource is greater than or equal to or is less than or equal to the fourth threshold;
- a measurement result of the sixth resource is greater than or equal to or is less than or equal to the fifth threshold;
- priority information of the sidelink transmission for the first mode is greater than or equal to or is less than or equal to a sixth threshold;
- priority information of the uplink transmission is greater than or equal to or is less than or equal to the sixth threshold;
- priority information of the downlink transmission is greater than or equal to or is less than or equal to the sixth threshold;
- priority information of the sidelink transmission for the second mode is greater than or equal to or is less than or equal to the sixth threshold;
- the fifth resource comprises a resource shared by the first terminal device and another terminal device, wherein the resource shared by the first terminal device and the another terminal device comprises a first-type configured grant resource and/or a second-mode resource of the sidelink, and the first-type configured grant comprises a sidelink resource and/or an uplink resource provided by the network device by using radio resource control (RRC) signaling;
- the fifth resource comprises a dedicated resource of the first terminal device;
- a start time domain position of the fifth resource is before or after a start time domain position of the sixth resource;
- the fifth resource comprises a periodic third time-frequency resource, the sixth resource comprises a periodic fourth time-frequency resource, and a periodicity of the third time-frequency resource is greater than or less than a periodicity of the fourth time-frequency resource;
- the fifth resource comprises the periodic third time-frequency resource, the sixth resource comprises the periodic fourth time-frequency resource, and a time interval between two adjacent third time-frequency resources is greater than or less than a time interval between two adjacent fourth time-frequency resources;
- a size of the fifth source is greater than or less than a size of the sixth resource; and
- a proportion of an overlapping resource in the sixth resource to the sixth resource is greater than or less than a proportion of an overlapping resource in the fifth resource to the fifth resource.

11. The communication processing method of claim 8, comprising:
sending, by a first terminal device, fourth information to a third terminal device, wherein the fourth information is used to indicate that the first terminal device releases a seventh resource and/or indicate the seventh resource released by the first terminal device, the seventh resource comprises a resource of a sidelink, and the sidelink is a wireless direct communication link between the first terminal device and a second terminal device.

12. The communication processing method according to claim 11, wherein the sending, by the first terminal device, fourth information to the third terminal device comprises:
sending, by the first terminal device, the fourth information to the third terminal device when a fifth condition is met, wherein
the fifth condition comprises at least one of the following conditions:
the seventh resource overlaps an eighth resource in time domain, wherein the seventh resource comprises a first-mode resource of the sidelink and/or a second-mode resource of the sidelink, the eighth resource comprises any one or more of the following content: the first-mode resource of the sidelink, the second-mode resource of the sidelink, a resource of an uplink, and a resource of a downlink, the first-mode resource of the sidelink comprises a resource scheduled by a network device for the first terminal device, the second-mode resource of the sidelink comprises a resource selected, contended for, or sensed by the first terminal device and/or a resource reserved by the first terminal device, the resource of the uplink is a resource of an uplink between the first terminal device and the network device, and the resource of the downlink is a resource of a downlink between the first terminal device and the network device;
the seventh resource periodically overlaps the eighth resource in time domain;

the seventh resource overlaps the eighth resource for N times in time domain, wherein N is an integer greater than 0;
the seventh resource is to overlap the eighth resource in time domain;
the seventh resource is to periodically overlap the eighth resource in time domain;
the seventh resource is to overlap the eighth resource for N times in time domain;
the seventh resource overrides the eighth resource or the eighth resource overrides the seventh resource;
the eighth resource periodically overrides the seventh resource or the seventh resource periodically overrides the eighth resource;
the eighth resource overrides the seventh resource for N times or the seventh resource overrides the eighth resource for N times;
the eighth resource is to override the seventh resource or the seventh resource is to override the eighth resource;
the eighth resource is to periodically override the seventh resource or the seventh resource is to periodically override the eighth resource;
the eighth resource is to override the seventh resource for N times or the seventh resource is to override the eighth resource for N times;
third duration is greater than an eighth threshold, wherein the third duration is a time difference between a time domain resource of the seventh resource and a moment at which the first terminal device releases the seventh resource, or is a time difference between a time domain position of the seventh resource and a time domain position at which the first terminal device sends the fourth information to the third terminal device;
the eighth resource comprises a dedicated resource of the first terminal device;
the seventh resource comprises a periodic time-frequency resource; and
the first terminal device has a resource of the sidelink.

13. The communication processing method according to claim 11, wherein the fourth information comprises at least one of the following:
an indication that the first terminal device releases the seventh resource;
information about the seventh resource;
resource type information of the seventh resource;
time domain information of the seventh resource;
time domain position information of the seventh resource;
time domain length information of the seventh resource;
frequency domain information of the seventh resource;
frequency domain position information of the seventh resource;
frequency domain bandwidth information of the seventh resource;
a periodicity or an interval of the seventh resource;
duration of the seventh resource;
time information of releasing the seventh resource by the first terminal device;
information about releasing the $1^{st}$ time domain resource of the seventh resource by the first terminal device;
time domain information of releasing the $1^{st}$ time-frequency resource of the seventh resource by the first terminal device;
frequency domain information of releasing the $1^{st}$ time-frequency resource of the first resource by the first terminal device;
a time interval between time at which the first terminal device releases the seventh resource and a moment at which the first terminal device sends the fourth information;
an indication that the first terminal device senses, selects, or obtains, through contention, the seventh resource;
an indication that the first terminal device reserves the seventh resource;
an indication that the eighth resource overlaps the seventh resource in time domain, wherein the eighth resource comprises any one or more of the following content: the first-mode resource of the sidelink, the second-mode resource of the sidelink, the resource of the uplink, and the resource of the downlink, the resource of the uplink is the resource of the uplink between the first terminal device and the network device, and the resource of the downlink is the resource of the downlink between the first terminal device and the network device;
information about the eighth resource;
resource type information of the eighth resource;
time domain information of the eighth resource;
time domain length information of the eighth resource;
time domain position information of the eighth resource;
frequency domain information of the eighth resource;
frequency domain bandwidth information of the eighth resource;
frequency domain position information of the eighth resource;
a periodicity or a time interval of the eighth resource;
duration of the eighth resource;
a periodicity or a time interval of a service transmitted on the seventh resource;
a periodicity or a time interval of a service transmitted on the eighth resource;
a time offset of the time domain position of the seventh resource relative to a time domain position at which the first terminal device sends the fourth information;
a time offset of a time domain position of the eighth resource relative to the time domain position at which the first terminal device sends the fourth information;
priority information of the service transmitted on the seventh resource;
priority information of the service transmitted on the eighth resource;
priority information of the seventh resource;
priority information of the eighth resource;
an indication that a priority of the seventh resource is lower than a priority of the eighth resource;
time domain information of the seventh resource overlapping the eighth resource;
information about a time domain offset of the seventh resource relative to the eighth resource;
information about a resource that does not overlap the eighth resource;
an indication that the first terminal device has resource reservation;
information about a resource reserved by the first terminal device;
an indication that the first terminal device may perform retransmission;
a quantity of retransmission times and/or a maximum quantity of retransmission times of the first terminal device;
a time interval between initial transmission and retransmission of the first terminal device; and frequency domain information of the initial transmission and frequency domain information of the retransmission of the first terminal device.

14. The communication processing method according to claim 11, wherein before the sending, by the first terminal device, fourth information to the third terminal device, the method further comprises:
  determining, by the first terminal device, that the priority of the seventh resource is lower than the priority of the eighth resource when a sixth condition is met, wherein the seventh resource comprises the first-mode resource of the sidelink and/or the second-mode resource of the sidelink, the eighth resource comprises any one or more of the following content: the resource of the sidelink, the resource of the uplink, and the resource of the downlink, the resource of the uplink is the resource of the uplink between the first terminal device and the network device, and the resource of the downlink is the resource of the downlink between the first terminal device and the network device; and
  determining, by the first terminal device, to release the seventh resource.

15. The communication processing method according to claim 14, wherein the sixth condition comprises any one or more of the following content:
  a priority of sidelink transmission for a first mode is higher than a priority of sidelink transmission for a second mode;
  a priority of uplink transmission is higher than the priority of the sidelink transmission for the second mode;
  a priority of downlink transmission is higher than the priority of the sidelink transmission for the second mode;
  a priority of a service or data transmitted on the eighth resource is higher than a priority of a service or data transmitted on the seventh resource;
  priority information of the service or the data transmitted on the seventh resource is greater than or equal to or is less than or equal to a second threshold;
  priority information of the service or the data transmitted on the eighth resource is greater than or equal to or is less than or equal to a third threshold;
  the priority of the eighth resource is higher than the priority of the seventh resource;
  a measurement result for the first mode of the sidelink is higher than a measurement result for the second mode of the sidelink;
  a measurement result of the uplink is higher than the measurement result for the second mode of the sidelink;
  a measurement result of the downlink is higher than the measurement result for the second mode of the sidelink;
  the measurement result for the first mode of the sidelink is greater than or equal to or is less than or equal to a fourth threshold;
  the measurement result of the uplink is greater than or equal to or is less than or equal to the fourth threshold;
  the measurement result of the downlink is greater than or equal to or is less than or equal to the fourth threshold;
  the measurement result for the second mode of the sidelink is greater than or less than a fifth threshold;
  a measurement result of the eighth resource is higher than a measurement result of the seventh resource;
  a measurement result of the seventh resource is greater than or equal to or is less than or equal to the fourth threshold;
  a measurement result of the eighth resource is greater than or equal to or is less than or equal to the fifth threshold;
  priority information of the sidelink transmission for the first mode is greater than or equal to or is less than or equal to a sixth threshold;
  priority information of the uplink transmission is greater than or equal to or is less than or equal to the sixth threshold;
  priority information of the downlink transmission is greater than or equal to or is less than or equal to the sixth threshold;
  priority information of the sidelink transmission for the second mode is greater than or equal to or is less than or equal to the sixth threshold;
  the eighth resource comprises a resource shared by the first terminal device and another terminal device, wherein the resource shared by the first terminal device and the another terminal device comprises a first-type configured grant resource and/or the second-mode resource of the sidelink, and the first-type configured grant comprises a sidelink resource and/or an uplink resource provided by the network device by using radio resource control radio resource control (RRC) signaling;
  a start time domain position of the eighth resource is before or after a start time domain position of the seventh resource;
  the eighth resource comprises a periodic fifth time-frequency resource, the seventh resource comprises a periodic sixth time-frequency resource, and a periodicity of the fifth time-frequency resource is greater than or less than a periodicity of the sixth time-frequency resource;
  the eighth resource comprises the periodic fifth time-frequency resource, the seventh resource comprises the periodic sixth time-frequency resource, and a time interval between two adjacent fifth time-frequency resources is greater than or less than a time interval between two adjacent sixth time-frequency resources;
  a size of the eighth resource is less than or greater than a size of the seventh resource; and
  a proportion of an overlapping resource in the seventh resource to the seventh resource is greater than or less than a proportion of an overlapping resource in the eighth resource to the eighth resource.

16. A communication processing apparatus, comprising:
one or more processors;
a non-transitory memory coupled to the one or more processors, wherein the non-transitory memory stores a program to be executed by the one or more processors, the program including instructions for:
generating, by a first terminal device, first information;
sending, by the first terminal device, the first information to a network device, wherein the first information is used to indicate the following content:
  information indicating that the first terminal device releases a first resource, wherein the first resource overlaps a third resource for N times in a time domain, wherein N is an integer greater than zero; and
  information indicating that the first terminal device requests a second resource from the network device; and
comparing a priority of the first resource to a priority of the third resource to determine whether to release the first resource, wherein an overlapping part of the first resource and the third resource is selectively released.

17. The communication processing method according to claim 12, further comprising:
  determining, by the apparatus, that a priority of a ninth resource is higher than the priority of a tenth resource when a seventh condition is met; and
  selecting, by the apparatus, the tenth resource when excluding the ninth resource or any time domain resource in time domain in which the ninth resource is located.

18. The communication processing method according to claim 17, wherein the seventh condition comprises any one or more of the following content:
  a priority of sidelink transmission for a first mode is higher than a priority of sidelink transmission for a second mode;
  a priority of the uplink transmission is higher than the priority of the sidelink transmission for the second mode;
  a priority of the downlink transmission is higher than the priority of the sidelink transmission for the second mode;
  a priority of a service or data transmitted on the ninth resource is higher than a priority of a service or data transmitted on the tenth resource;
  priority information of the service or the data transmitted on the ninth resource is greater than or equal to or is less than or equal to a second threshold;
  priority information of the service or the data transmitted on the tenth resource is greater than or equal to or is less than or equal to a third threshold;
  the priority of the ninth resource is higher than the priority of the tenth resource;
  a measurement result for the first mode of the sidelink is higher than a measurement result for the second mode of the sidelink;
  a measurement result of the uplink is higher than the measurement result for the second mode of the sidelink;
  a measurement result of the downlink is higher than the measurement result for the second mode of the sidelink;
  the measurement result for the first mode of the sidelink is greater than or equal to or is less than or equal to a fourth threshold;
  the measurement result of the uplink is greater than or equal to or is less than or equal to the fourth threshold;
  the measurement result of the downlink is greater than or equal to or is less than or equal to the fourth threshold;
  the measurement result for the second mode of the sidelink is greater than or equal to or is less than or equal to a fifth threshold;
  priority information of the sidelink transmission for the first mode is greater than or equal to or is less than or equal to a sixth threshold;
  priority information of the uplink transmission is greater than or equal to or is less than or equal to the sixth threshold;
  priority information of the downlink transmission is greater than or equal to or is less than or equal to the sixth threshold;
  priority information of the sidelink transmission for the second mode is greater than or equal to or is less than or equal to the sixth threshold;
  a measurement result of the ninth resource is higher than a measurement result of the tenth resource;
  the measurement result of the ninth resource is greater than or equal to or is less than or equal to the fourth threshold;
  the measurement result of the tenth resource is greater than or equal to or is less than or equal to the fifth threshold;
  the ninth resource comprises a resource shared by the apparatus and another terminal device, wherein the resource shared by the apparatus and the another terminal device comprises a first-type configured grant resource and/or the second-mode resource of the sidelink, and the first-type configured grant comprises a sidelink resource and/or an uplink resource provided by the network device by using radio resource control radio resource control (RRC) signaling;
  the ninth resource comprises a dedicated resource of the apparatus;
  a start time domain position of the ninth resource is before or after a start time domain position of the tenth resource;
  the ninth resource comprises a periodic seventh time-frequency resource, the tenth resource comprises a periodic eighth time-frequency resource, and a periodicity of the seventh time-frequency resource is greater than or less than a periodicity of the eighth time-frequency resource;
  the ninth resource comprises the periodic seventh time-frequency resource, the tenth resource comprises the periodic eighth time-frequency resource, and a time interval between two adjacent seventh time-frequency resources is greater than or less than a time interval between two adjacent eighth time-frequency resources;
  a size of the ninth resource is greater than a size of the tenth resource; and
  a proportion of an overlapping resource in the ninth resource to the ninth resource is greater than or less than a proportion of an overlapping resource in the tenth resource to the tenth resource.

* * * * *